US012711702B2

(12) United States Patent
Kopp et al.

(10) Patent No.: US 12,711,702 B2
(45) Date of Patent: Aug. 18, 2026

(54) AUGMENTED VIDEO GENERATION WITH DENTAL MODIFICATIONS

(71) Applicant: Align Technology, Inc., San Jose, CA (US)

(72) Inventors: Philipp Kopp, Zürich (CH); Dmitry Yurievich Chekh, Moscow (RU); Niko Benjamin Huber, Zug (CH); Shipra Jain, Zürich (CH); Christopher E. Cramer, Durham, NC (US); Chad Clayton Brown, Cary, NC (US); Vladislav Andreevich Miryaha, Dolgoprudniy (RU); Boris Aleksandrovich Vysokanov, Moscow (RU); Eric Paul Meyer, Zürich (CH); Maik Gerth, Seeheim-Jugenheim (DE); Sinan Ibrahim Bayraktar, Zürich (CH); Michael Seeber, Zürich (CH); Ritika Chakraborty, Kirchdorf (CH); Andreea Maria Radoescu, Baden (CH); Doruk Cetin, Zürich (CH)

(73) Assignee: Align Technology, Inc., San Jose, CA (US)

( * ) Notice: Subject to any disclaimer, the term of this patent is extended or adjusted under 35 U.S.C. 154(b) by 78 days.

(21) Appl. No.: 18/525,530

(22) Filed: Nov. 30, 2023

(65) Prior Publication Data

US 2024/0185518 A1 Jun. 6, 2024

Related U.S. Application Data

(60) Provisional application No. 63/587,831, filed on Oct. 4, 2023, provisional application No. 63/429,484, filed on Dec. 1, 2022.

(51) Int. Cl.
*G06T 17/00* (2006.01)
*G06T 7/00* (2017.01)
(Continued)

(52) U.S. Cl.
CPC ............ *G06T 17/00* (2013.01); *G06T 7/0012* (2013.01); *G06T 7/11* (2017.01); *G06T 7/13* (2017.01);
(Continued)

(58) Field of Classification Search
CPC ......... G06T 17/00; G06T 7/0012; G06T 7/11; G06T 7/13; G06T 7/174; G06T 7/90;
(Continued)

(56) References Cited

U.S. PATENT DOCUMENTS 5,975,893 A 11/1999 Chishti et al.
6,227,850 B1 5/2001 Chishti et al.
(Continued)

FOREIGN PATENT DOCUMENTS

CN 115004236 A 9/2022

OTHER PUBLICATIONS

S. Liu, Y. Zhang, X. Yang, D. Shi and J. J. Zhang, "Robust facial landmark detection and tracking across poses and expressions for in-the-wild monocular video," in Computational Visual Media, vol. 3, No. 1, pp. 33-47, Mar. 2017, doi: 10.1007/s41095-016-0068-y. (Year: 2017).*

(Continued)

*Primary Examiner* — Daniel F Hajnik
*Assistant Examiner* — Thomas John Foster
(74) *Attorney, Agent, or Firm* — Lowenstein Sandler LLP

(57) ABSTRACT

A method includes receiving a video comprising a face of an individual, the video comprising a current condition of a dental site of the individual. The method includes determining or receiving an altered condition of the dental site and modifying the video by replacing the current condition of the dental site with the altered condition of the dental site in the video.

20 Claims, 31 Drawing Sheets

(51) Int. Cl.
*G06T 7/11* (2017.01)
*G06T 7/13* (2017.01)
*G06T 7/174* (2017.01)
*G06T 7/90* (2017.01)
*G06T 11/00* (2006.01)
*G06T 19/20* (2011.01)

(52) U.S. Cl.
CPC ................ *G06T 7/174* (2017.01); *G06T 7/90* (2017.01); *G06T 11/00* (2013.01); *G06T 19/20* (2013.01); *G06T 2207/10016* (2013.01); *G06T 2207/20081* (2013.01); *G06T 2207/30036* (2013.01); *G06T 2207/30168* (2013.01); *G06T 2219/2012* (2013.01); *G06T 2219/2016* (2013.01)

(58) Field of Classification Search
CPC ..................... G06T 11/00; G06T 19/20; G06T 2207/10016; G06T 2207/20081; G06T 2207/30036; G06T 2207/30168; G06T 2219/2012; G06T 2219/2016
See application file for complete search history.

(56) References Cited

U.S. PATENT DOCUMENTS 6,227,851 B1 5/2001 Chishti et al.
6,299,440 B1 10/2001 Phan et al.
6,318,994 B1 11/2001 Chishti et al.
6,371,761 B1 4/2002 Cheang et al.
6,386,878 B1 5/2002 Pavlovskaia et al.
6,406,292 B1 6/2002 Chishti et al.
6,409,504 B1 6/2002 Jones et al.
6,457,972 B1 10/2002 Chishti et al.
6,488,499 B1 12/2002 Miller
6,514,074 B1 2/2003 Chishti et al.
6,554,611 B2 4/2003 Chishti et al.
6,582,229 B1 6/2003 Miller et al.
6,602,070 B2 8/2003 Miller et al.
6,621,491 B1 9/2003 Baumrind et al.
6,688,886 B2 2/2004 Hughes et al.
6,726,478 B1 4/2004 Isiderio et al.
6,729,876 B2 5/2004 Chishti et al.
6,739,869 B1 5/2004 Taub et al.
6,767,208 B2 7/2004 Kaza
6,783,360 B2 8/2004 Chishti
7,040,896 B2 5/2006 Pavlovskaia et al.
7,063,532 B1 6/2006 Jones et al.
7,074,038 B1 7/2006 Miller
7,074,039 B2 7/2006 Kopelman et al.
7,077,647 B2 7/2006 Choi et al.
7,108,508 B2 9/2006 Hedge et al.
7,134,874 B2 11/2006 Chishti et al.
7,156,661 B2 1/2007 Choi et al.
7,160,107 B2 1/2007 Kopelman et al.
7,241,142 B2 7/2007 Abolfathi et al.
7,293,988 B2 11/2007 Wen
7,309,230 B2 12/2007 Wen
7,357,634 B2 4/2008 Knopp
7,555,403 B2 6/2009 Kopelman et al.
7,637,740 B2 12/2009 Knopp
7,689,398 B2 3/2010 Cheng et al.
7,736,147 B2 6/2010 Kaza et al.
7,746,339 B2 6/2010 Matov et al.
7,844,356 B2 11/2010 Matov et al.
7,844,429 B2 11/2010 Matov et al.
7,865,259 B2 1/2011 Kuo et al.
7,878,804 B2 2/2011 Korytov et al.
7,880,751 B2 2/2011 Kuo et al.
7,904,308 B2 3/2011 Arnone et al.
7,930,189 B2 4/2011 Kuo
7,942,672 B2 5/2011 Kuo
7,970,627 B2 6/2011 Kuo et al.
7,970,628 B2 6/2011 Kuo et al.
8,038,444 B2 10/2011 Kitching et al.
8,044,954 B2 10/2011 Kitching et al.
8,075,306 B2 12/2011 Kitching et al.
8,092,215 B2 * 1/2012 Stone-Collonge ..... G16H 30/40 433/24
8,099,268 B2 1/2012 Kitching et al.
8,108,189 B2 1/2012 Chelnokov et al.
8,126,726 B2 2/2012 Matov et al.
8,260,591 B2 9/2012 Kass et al.
8,275,180 B2 9/2012 Kuo
8,401,826 B2 3/2013 Cheng et al.
8,439,672 B2 5/2013 Matov et al.
8,562,338 B2 10/2013 Kitching et al.
8,591,225 B2 11/2013 Wu et al.
8,788,285 B2 7/2014 Kuo
8,843,381 B2 9/2014 Kuo et al.
8,874,452 B2 10/2014 Kuo
8,896,592 B2 11/2014 Boltunov et al.
8,930,219 B2 1/2015 Trosien et al.
9,037,439 B2 5/2015 Kuo et al.
9,060,829 B2 6/2015 Sterental et al.
9,125,709 B2 9/2015 Matty
9,211,166 B2 12/2015 Kuo et al.
9,220,580 B2 12/2015 Borovinskih et al.
9,364,296 B2 6/2016 Kuo
9,375,300 B2 6/2016 Matov et al.
9,414,897 B2 8/2016 Wu et al.
9,492,245 B2 11/2016 Sherwood et al.
9,642,678 B2 5/2017 Kuo
10,248,883 B2 4/2019 Borovinskih et al.
10,342,638 B2 7/2019 Kitching et al.
10,463,452 B2 11/2019 Matov et al.
10,595,966 B2 3/2020 Carrier, Jr. et al.
10,617,489 B2 4/2020 Grove et al.
10,722,328 B2 7/2020 Velazquez et al.
10,758,322 B2 * 9/2020 Pokotilov ................ A61C 7/08
10,779,718 B2 9/2020 Meyer et al.
10,792,127 B2 10/2020 Kopelman et al.
10,828,130 B2 11/2020 Pokotilov et al.
10,835,349 B2 11/2020 Cramer et al.
10,973,611 B2 4/2021 Pokotilov et al.
10,996,813 B2 5/2021 Makarenkova et al.
10,997,727 B2 5/2021 Xue et al.
11,020,205 B2 6/2021 Li et al.
11,020,206 B2 6/2021 Shi et al.
11,026,766 B2 6/2021 Chekh et al.
11,033,359 B2 6/2021 Velazquez et al.
11,071,608 B2 7/2021 Derakhshan et al.
11,096,763 B2 8/2021 Akopov et al.
11,116,605 B2 9/2021 Nyukhtikov et al.
11,147,652 B2 10/2021 Mason et al.
11,151,753 B2 10/2021 Gao et al.
11,154,381 B2 10/2021 Roschin et al.
11,259,896 B2 3/2022 Matov et al.
11,357,598 B2 6/2022 Cramer
11,395,717 B2 7/2022 Yuryev et al.
11,398,255 B1 * 7/2022 Mann ........................ G06T 5/70
11,432,908 B2 9/2022 Kopelman et al.
11,464,604 B2 10/2022 Makarenkova et al.
11,478,334 B2 10/2022 Matov et al.
11,484,389 B2 11/2022 Sterental et al.
11,521,732 B2 12/2022 Levin et al.
11,534,272 B2 12/2022 Li et al.
11,553,988 B2 1/2023 Mednikov et al.
11,633,268 B2 4/2023 Moalem et al.
11,642,195 B2 5/2023 Gao et al.
11,651,494 B2 5/2023 Brown et al.
11,654,001 B2 5/2023 Roschin et al.
11,707,344 B2 7/2023 Roschin et al.
11,810,271 B2 11/2023 Shi et al.
11,850,111 B2 12/2023 Derakhshan et al.
11,978,547 B2 5/2024 Levin et al.
2003/0008259 A1 1/2003 Kuo et al.
2003/0143509 A1 7/2003 Kopelman et al.
2003/0207227 A1 11/2003 Abolfathi
2004/0137400 A1 7/2004 Chishti et al.
2004/0152036 A1 8/2004 Abolfathi
2004/0197728 A1 10/2004 Abolfathi et al.
2004/0259049 A1 12/2004 Kopelman et al.

(56) References Cited

U.S. PATENT DOCUMENTS

| | | | |
|---|---|---|---|
| 2005/0182654 | A1 | 8/2005 | Abolfathi et al. |
| 2005/0244791 | A1 | 11/2005 | Davis et al. |
| 2006/0127836 | A1 | 6/2006 | Wen |
| 2006/0127852 | A1 | 6/2006 | Wen |
| 2006/0127854 | A1 | 6/2006 | Wen |
| 2006/0275731 | A1 | 12/2006 | Wen et al. |
| 2006/0275736 | A1 | 12/2006 | Wen et al. |
| 2008/0306724 | A1 | 12/2008 | Kitching et al. |
| 2010/0009308 | A1 | 1/2010 | Wen et al. |
| 2010/0068672 | A1 | 3/2010 | Arjomand et al. |
| 2010/0068676 | A1 | 3/2010 | Mason et al. |
| 2010/0092907 | A1 | 4/2010 | Knopp |
| 2010/0167243 | A1 | 7/2010 | Spiridonov et al. |
| 2013/0169834 | A1 | 7/2013 | Herz et al. |
| 2013/0204599 | A1 | 8/2013 | Matov et al. |
| 2013/0315556 | A1* | 11/2013 | Ju .......................... H04N 23/64 386/224 |
| 2014/0371599 | A1 | 12/2014 | Wu et al. |
| 2016/0092751 | A1 | 3/2016 | Zavesky et al. |
| 2017/0273760 | A1 | 9/2017 | John et al. |
| 2018/0280118 | A1 | 10/2018 | Cramer |
| 2018/0360567 | A1* | 12/2018 | Xue .......................... G06T 7/10 |
| 2019/0122411 | A1 | 4/2019 | Sachs et al. |
| 2019/0328488 | A1 | 10/2019 | Levin et al. |
| 2019/0388193 | A1 | 12/2019 | Saphier et al. |
| 2020/0046460 | A1 | 2/2020 | Jang |
| 2020/0066037 | A1 | 2/2020 | Hare et al. |
| 2020/0155274 | A1 | 5/2020 | Pimenov et al. |
| 2020/0297458 | A1 | 9/2020 | Roschin et al. |
| 2020/0306011 | A1 | 10/2020 | Chekhonin et al. |
| 2021/0134436 | A1 | 5/2021 | Meyer et al. |
| 2023/0401804 | A1 | 12/2023 | Lee |

OTHER PUBLICATIONS

Chen, et al., "Orthoaligner: Image-based Teeth Alignment Prediction via Latent Style Manipulation," IEEE Transactions on Visualization and Computer Graphics, Aug. 2023, vol. 29 (8), pp. 3617-3629.

Newell, et al., "Stacked Hourglass Networks for Human Pose Estimation," ArXiv, 2016, pp. 1-17.

Isola, et al. "Image-to-image Translation with Conditional Adversarial Networks." arXiv Preprint (2017).

Reda, et al., "FILM: Frame Interpolation for Large Motion," Computer Vision and Pattern Recognition, 2022, pp. 1-19.

* cited by examiner

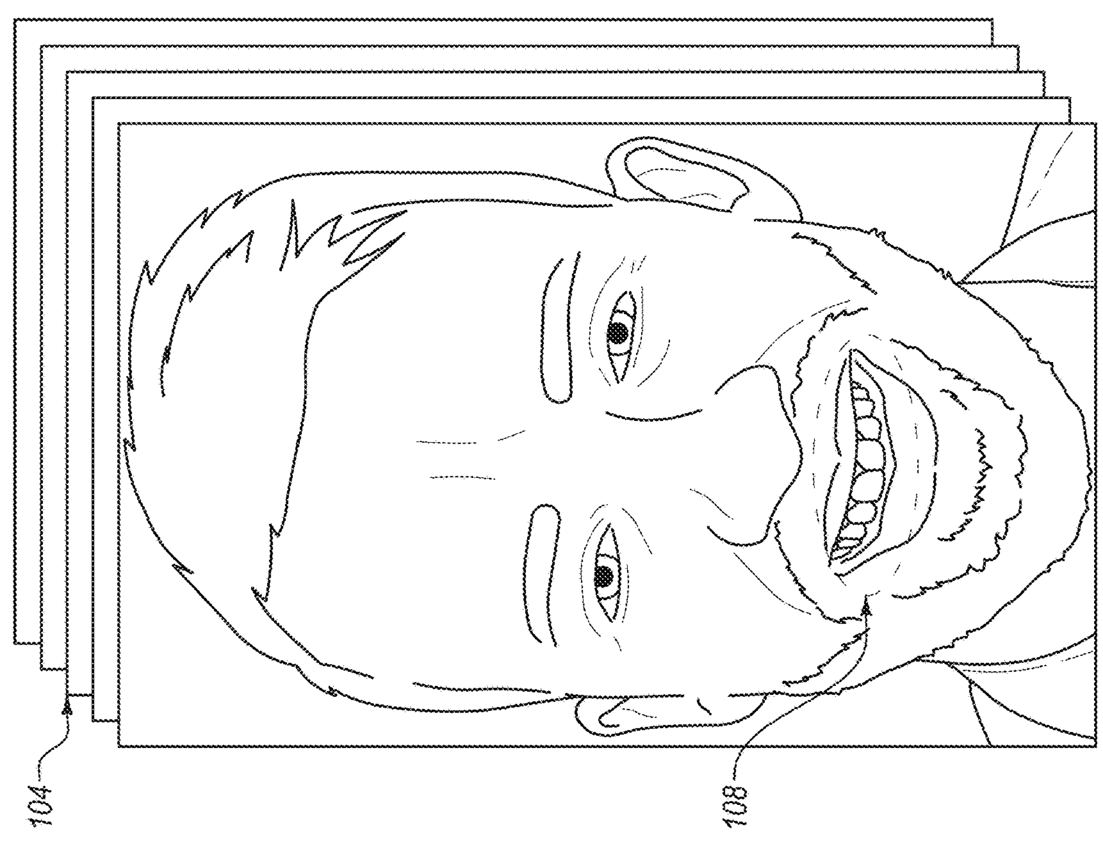
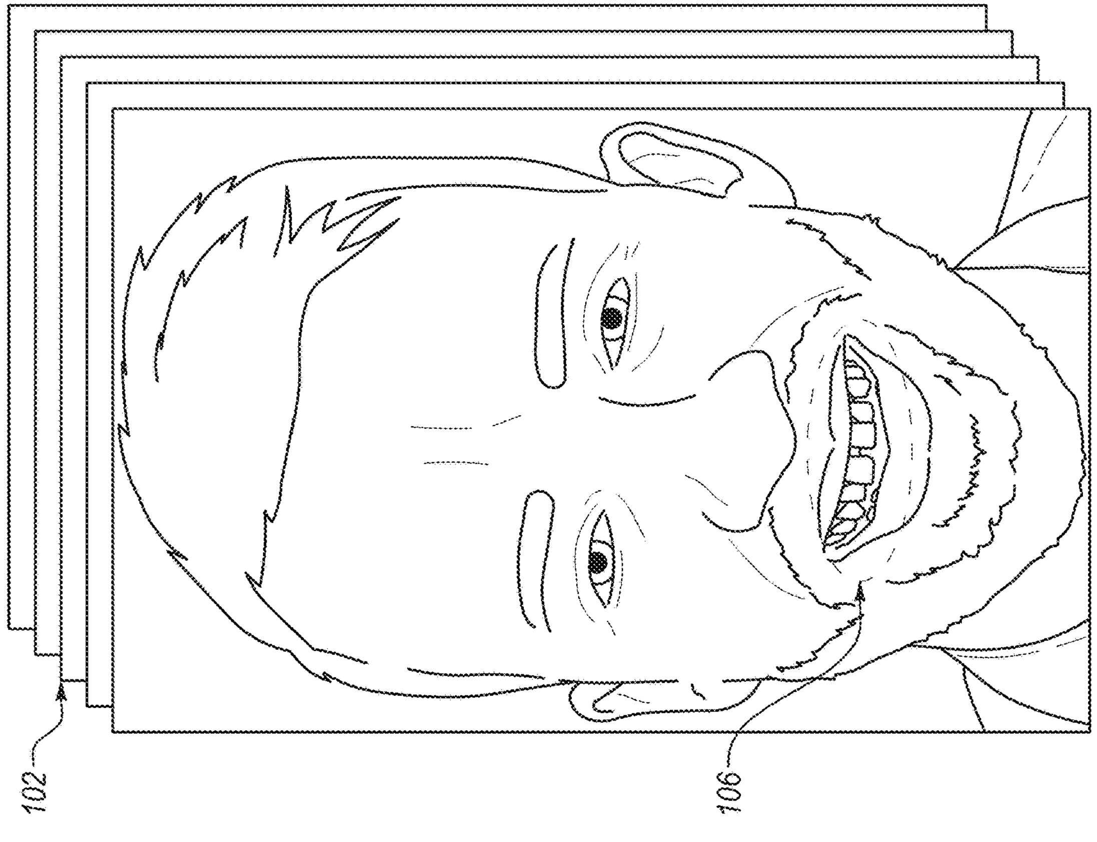
FIG. 1

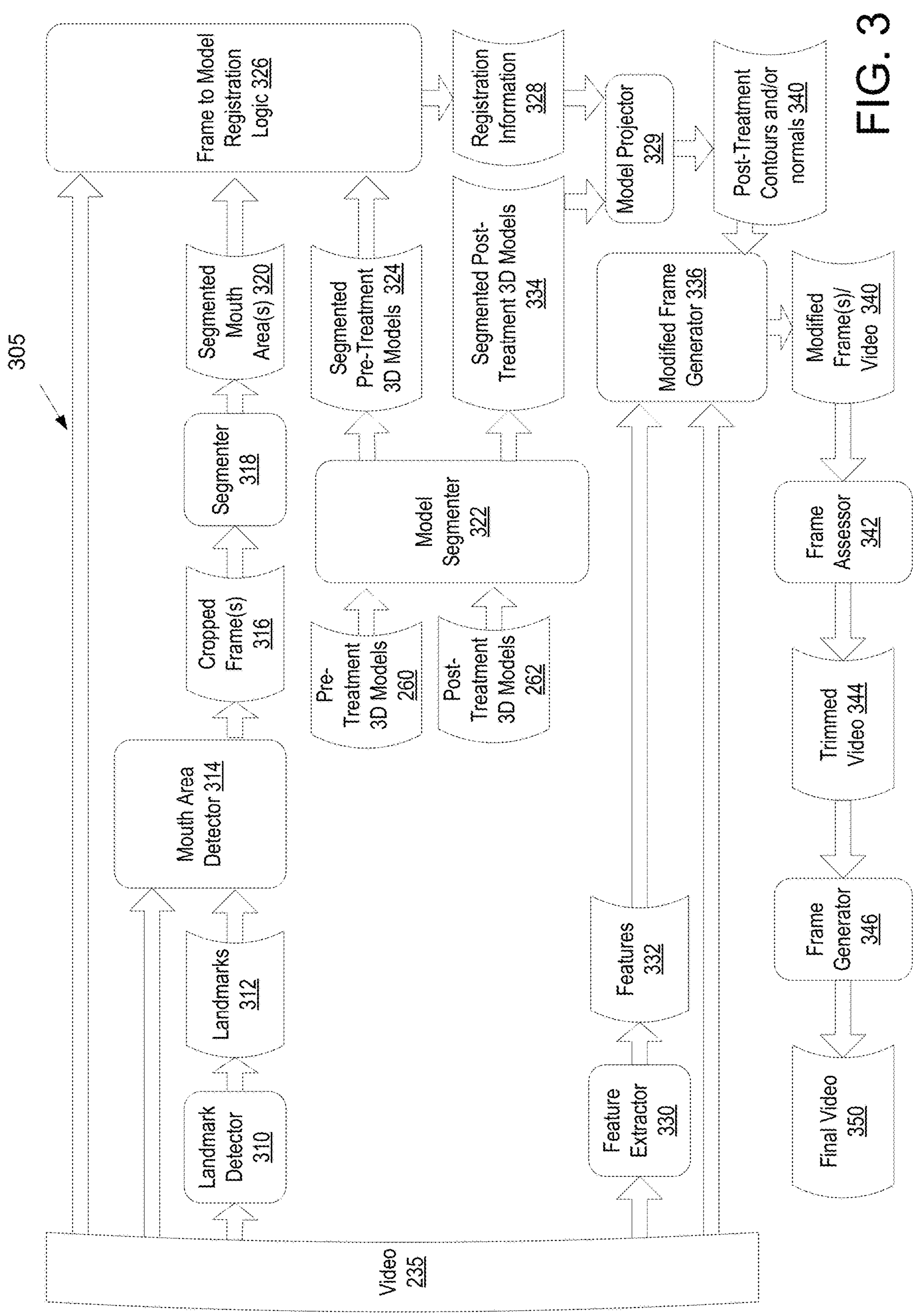
305
Video 235
Landmark Detector 310
Landmarks 312
Mouth Area Detector 314
Cropped Frame(s) 316
Segmenter 318
Segmented Mouth Area(s) 320
Frame to Model Registration Logic 326
Pre-Treatment 3D Models 260
Post-Treatment 3D Models 262
Model Segmenter 322
Segmented Pre-Treatment 3D Models 324
Segmented Post-Treatment 3D Models 334
Registration Information 328
Model Projector 329
Post-Treatment Contours and/or normals 340
Feature Extractor 330
Features 332
Modified Frame Generator 336
Modified Frame(s)/ Video 340
Frame Assessor 342
Trimmed Video 344
Frame Generator 346
Final Video 350
FIG. 3

Figure 19:
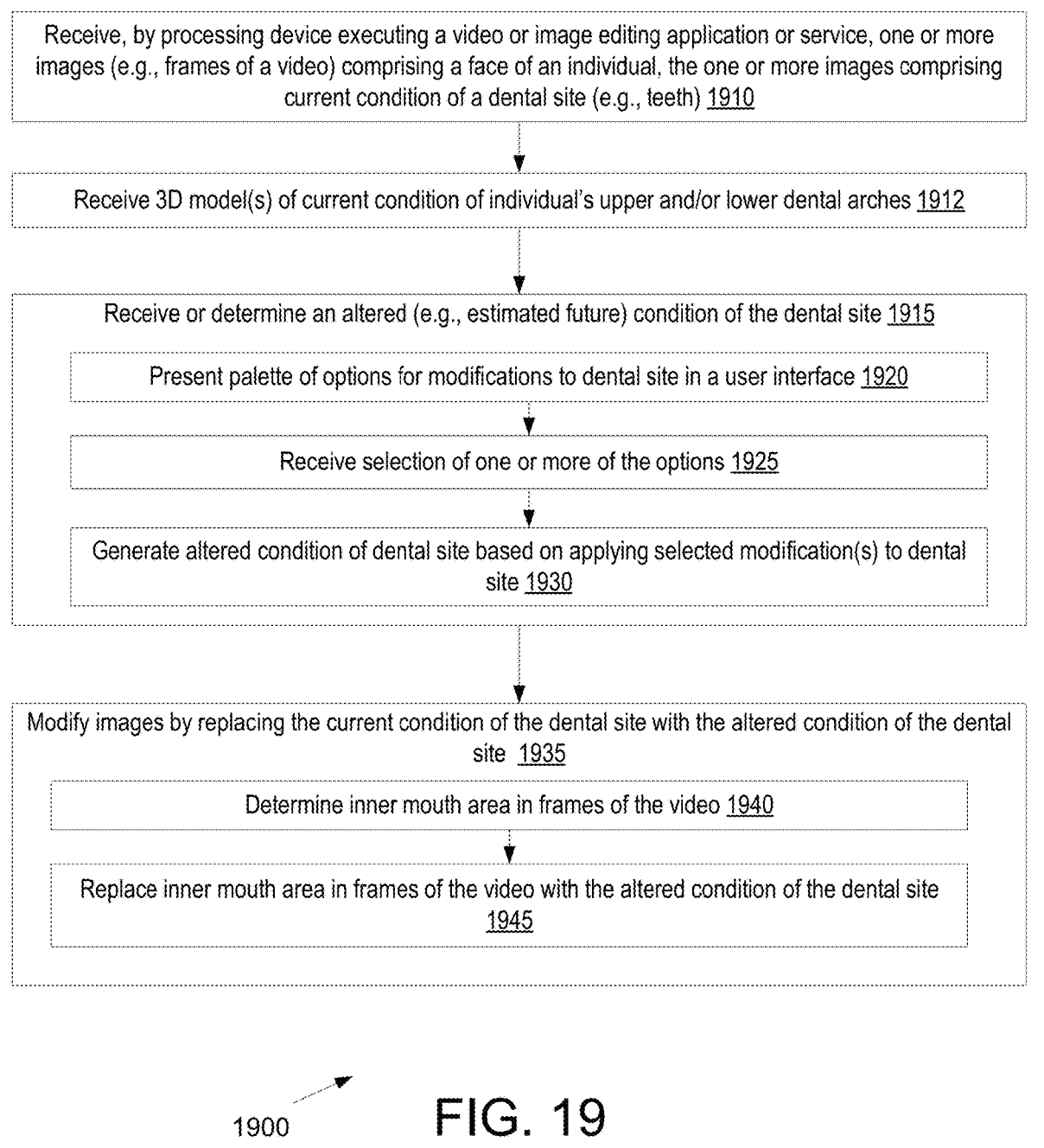

Receive, by processing device executing a video or image editing application or service, one or more images (e.g., frames of a video) comprising a face of an individual, the one or more images comprising current condition of a dental site (e.g., teeth) 1910

Receive 3D model(s) of current condition of individual's upper and/or lower dental arches 1912

Receive or determine an altered (e.g., estimated future) condition of the dental site 1915

Present palette of options for modifications to dental site in a user interface 1920

Receive selection of one or more of the options 1925

Generate altered condition of dental site based on applying selected modification(s) to dental site 1930

Modify images by replacing the current condition of the dental site with the altered condition of the dental site 1935

Determine inner mouth area in frames of the video 1940

Replace inner mouth area in frames of the video with the altered condition of the dental site 1945

AUGMENTED VIDEO GENERATION WITH DENTAL MODIFICATIONS

RELATED APPLICATIONS

This patent application claims the benefit under 35 U.S.C. § 119(e) of U.S. Provisional Application No. 63/429,484, filed Dec. 1, 2022, and further claims the benefit under 35 U.S.C. § 119(e) of U.S. Provisional Application No. 63/587,831, filed Oct. 4, 2023, both of which are incorporated by reference herein.

TECHNICAL FIELD

Embodiments of the present disclosure relate to the field of dentistry and, in particular, to a system and method for generating videos of altered dental conditions from captured video.

BACKGROUND

For both dental practitioners and patients who are considering undergoing orthodontic treatment and/or other dental treatment it can be helpful to generate videos that show what the patients' teeth will look like after treatment is performed. However, at best available techniques generate still images showing post treatment dental conditions.

SUMMARY

In a 1$^{st}$ implementation, a method comprises: receiving a video of a face of an individual, the video comprising a current condition of a dental site of the individual; receiving or determining an estimated future condition of the dental site; and modifying the video by replacing the current condition of the dental site with the estimated future condition of the dental site in the video.

A 2$^{nd}$ implementation may further extend the 1$^{st}$ implementation. In the 2$^{nd}$ implementation, the dental site comprises one or more teeth, and wherein the one or more teeth in the modified video are different from the one or more teeth in an original version of the video and are temporally stable and consistent between frames of the modified video.

A 3$^{rd}$ implementation may further extend the 1$^{st}$ or 2$^{nd}$ implementation. In the 3$^{rd}$ implementation, the method further comprises: identifying one or more frames of the modified video that fail to satisfy one or more image quality criteria; and removing the one or more frames of the modified video that failed to satisfy the one or more image quality criteria.

A 4$^{th}$ implementation may further extend the 3$^{rd}$ implementation. In the 4$^{th}$ implementation, the method further comprises: generating replacement frames for the removed one or more frames of the modified video.

A 5$^{th}$ implementation may further extend the 4$^{th}$ implementation. In the 5$^{th}$ implementation, each replacement frame is generated based on a first frame preceding a removed frame and a second frame following the removed frame and comprises an intermediate state of the dental site between a first state of a first frame and a second state of the second frame.

A 6$^{th}$ implementation may further extend the 5$^{th}$ implementation. In the 6$^{th}$ implementation, the method further comprises: generating one or more synthetic frames for the modified video, wherein each synthetic frame of the one or more synthetic frames is generated based on an original frame of the modified video and a replacement frame of the modified video.

A 7$^{th}$ implementation may further extend any of the 1$^{st}$ through 5$^{th}$ implementations. In the 7$^{th}$ implementation, the altered condition of the dental site comprises an estimated future condition of the dental site, wherein the dental site comprises one or more teeth, wherein determining the estimated future condition of the dental site comprises: generating or receiving a first three-dimensional (3D) model of a dental arch comprising the current condition of the one or more teeth; and generating or receiving a second 3D model of the dental arch comprising a post-treatment condition of the one or more teeth, the second 3D model having been generated based on modifying the first 3D model of the dental arch, wherein the post-treatment condition of the one or more teeth corresponds to the estimated future condition of the one or more teeth.

An 8$^{th}$ implementation may further extend the 7$^{th}$ implementation. In the 8$^{th}$ implementation, the first 3D model of the dental arch is generated from the video.

A 9$^{th}$ implementation may further extend the 8$^{th}$ implementation. In the 9$^{th}$ implementation, the post-treatment condition of the one or more teeth is determined based on applying one or more dental modification rules to the first 3D model of the dental arch.

A 10$^{th}$ implementation may further extend any of the 7$^{th}$ through 9$^{th}$ implementations. In the 10$^{th}$ implementation, the first 3D model of the dental arch was generated from a plurality of intraoral scans captured by an intraoral scanner.

An 11$^{th}$ implementation may further extend the 10$^{th}$ implementation. In the 11$^{th}$ implementation, the post-treatment condition of the one or more teeth is clinically accurate and was determined based on input from a dental practitioner.

A 12$^{th}$ implementation may further extend any of the 1$^{st}$ through 11$^{th}$ implementations. In the 12$^{th}$ implementation, receiving the video of the face of the individual comprises capturing the video using one or more image sensor while the individual views a display, the method further comprising: outputting the modified video to a display while the individual views the display.

A 13$^{th}$ implementation may further extend any of the 1$^{st}$ through 12$^{th}$ implementations. In the 13$^{th}$ implementation, modifying the video comprises performing the following for at least one frame of the video: determining an inner mouth area of the face in at least one frame; and replacing initial data for the inner mouth area of the face with replacement data determined from the altered condition of the dental site.

A 14$^{th}$ implementation may further extend the 13$^{th}$ implementation. In the 14$^{th}$ implementation, determining the inner mouth area for the at least one frame comprises: inputting the at least one frame into a trained machine learning model, wherein the trained machine learning model outputs a position of the inner mouth area for at least one frame.

A 15$^{th}$ implementation may further extend the 13$^{th}$ or 14$^{th}$ implementation. In the 15$^{th}$ implementation, the method further comprises performing the following prior determining the inner mouth area: determining a plurality of landmarks for a plurality of frames of the video using a trained machine learning model, wherein the at least one frame is one of the plurality of frames of the video; and performing smoothing of the plurality of landmarks between the plurality of frames, wherein the inner mouth area is determined based on the plurality of landmarks.

A 16$^{th}$ implementation may further extend the 15$^{th}$ implementation. In the 16$^{th}$ implementation, the method further comprises: cropping at least one frame around the inner mouth area; and performing one or more additional operations on the at least one cropped frame.

A $17^{th}$ implementation may further extend any of the $13^{th}$ through $16^{th}$ implementations. In the $17^{th}$ implementation, the method further comprises: performing segmentation on the inner mouth area of the at least one frame by inputting at least the inner mouth area of the at least one frame into a trained machine learning model that segments the inner mouth area into a plurality of individual teeth.

An $18^{th}$ implementation may further extend the $17^{th}$ implementation. In the $18^{th}$ implementation, the trained machine learning model further segments the inner mouth area into at least one of upper gingiva or lower gingiva.

A $19^{th}$ implementation may further extend the $17^{th}$ or $18^{th}$ implementation. In the $19^{th}$ implementation, the method further comprises: performing segmentation of a three-dimensional (3D) model of a dental arch that includes the dental site into a second plurality of individual teeth; and finding correspondences between the plurality of individual teeth in the inner mouth area and the second plurality of individual teeth in the 3D model of the dental arch.

A $20^{th}$ implementation may further extend the $19^{th}$ implementation. In the $20^{th}$ implementation, the method further comprises: fitting the 3D model of the dental arch to at least one frame based on the correspondences; determining a plane to project the 3D model onto, based on a result of the fitting; and projecting the 3D model onto the determined plane.

A $21^{st}$ implementation may further extend the $20^{th}$ implementation. In the $21^{st}$ implementation, the dental arch comprises an upper dental arch, the method further comprising performing the following for fitting the 3D model of the upper dental arch to the at least one frame: identifying facial landmarks in at least one frame; determining a six-dimensional (6D) pose of the face based on the facial landmarks and a 3D face model; and determining a relative position of the upper dental arch of the individual to the frame at least in part on the 6D pose.

A $22^{nd}$ implementation may further extend the $21^{st}$ implementation. In the $22^{nd}$ implementation, the method further comprises: determining a chin position of the face based on the facial landmarks and the 3D face model; finding additional correspondences between the plurality of individual teeth in the inner mouth area and a third plurality of individual teeth in a second 3D model of a lower dental arch of the individual; and fitting the second 3D model of the lower dental arch to at least one frame based at least in part on the determined chin position and the additional correspondences.

A $23^{rd}$ implementation may further extend the $22^{nd}$ implementation. In the $23^{rd}$ implementation, an articulation model that constrains possible poses of the lower dental arch relative to the upper dental arch is further used to fit the second 3D model of the lower dental arch to at least one frame.

A $24^{th}$ implementation may further extend any of the $20^{th}$ through $23^{rd}$ implementations. In the $24^{th}$ implementation, information on a fitting of the 3D model of the dental arch to a previous frame is used in performing the fitting of the 3D model of the dental arch to at least one frame.

A $25^{th}$ implementation may further extend any of the $17^{th}$ through $24^{th}$ implementations. In the $25^{th}$ implementation, performing segmentation of the at least one frame comprises inputting the inner mouth area of the at least one frame and inner mouth areas of one or more previous frames into the trained machine learning model, and wherein the trained machine learning model segments the inner mouth area of the at least one frame in a manner that is temporally consistent with the one or more previous frames.

A $26^{th}$ implementation may further extend any of the $17^{th}$ through $25^{th}$ implementations. In the $26^{th}$ implementation, the method further comprises: determining an optical flow between the at least one frame and one or more previous frames; wherein performing segmentation of the at least one frame comprises inputting the inner mouth area of the at least one frame and the optical flow into the trained machine learning model, and wherein the trained machine learning model segments the inner mouth area of the at least one frame in a manner that is temporally consistent with the one or more previous frames.

A $27^{th}$ implementation may further extend any of the $13^{th}$ through $26^{th}$ implementations. In the $27^{th}$ implementation, the method further comprises: determining color information for the inner mouth area in the at least one frame; determining contours of the estimated future condition of the dental site; and inputting at least one of the color information, the determined contours, the at least one frame or information on the inner mouth area into a generative model, wherein the generative model outputs an altered version of the at least one frame.

A $28^{th}$ implementation may further extend the $27^{th}$ implementation. In the $28^{th}$ implementation, an altered version of a prior frame is also input into the generative model to enable the generative model to output the post-treatment version of the at least one frame that is temporally stable with the prior frame.

A $29^{th}$ implementation may further extend the $28^{th}$ implementation. In the $29^{th}$ implementation, the method further comprises: transforming the prior frame and the at least one frame into a feature space; and determining an optical flow between the prior frame and the at least one frame in the feature space, wherein the generative model further uses the optical flow in the feature space to generate the altered version of the at least one frame.

A $30^{th}$ implementation may further extend any of the $27^{th}$ through $29^{th}$ implementations. In the $30^{th}$ implementation, the contours are determined based on a three-dimensional (3D) model of a dental arch comprising the altered condition of the dental site, the method further comprising: determining a plurality of normals to surfaces in the 3D model, wherein each normal of the plurality of normal comprises a 3D vector; fitting at least one of the 3D model or the additional 3D model to the inner mouth area of the at least one frame; and generating a two-dimensional (2D) map comprising one or more of the normals from the plurality of normals using a result of the fitting, wherein the 3D map is also input into the generative model.

A $31^{st}$ implementation may further extend the $30^{th}$ implementation. In the $31^{st}$ implementation, the 2D map comprises a red, green, blue (RGB) image, and wherein one or more pixels of the RGB image comprise a red value representing a component of a vector along a first axis, a green value representing a component of the vector along a second axis, and a blue value representing a component of the vector along a third axis.

A $32^{nd}$ implementation may further extend any of the $27^{th}$ through $31^{st}$ implementations. In the $32^{nd}$ implementation, the generative model comprises a generator of a generative adversarial network (GAN).

A $33^{rd}$ implementation may further extend any of the $27^{th}$ through $32^{nd}$ implementations. In the $33^{rd}$ implementation, the method further comprises: processing the video using a trained machine learning model that outputs a plurality of extracted features of the video, wherein the plurality of extracted features of the video are also input into the generative model.

A 34$^{th}$ implementation may further extend any of the 1$^{st}$ through 33$^{rd}$ implementations. In the 34$^{th}$ implementation, modifying the video comprises performing the following for at least one frame of the video: determining an area of interest corresponding to a dental condition in the at least one frame; and replacing initial data for the area of interest with replacement data determined from the altered condition of the dental site.

A 35$^{th}$ implementation may further extend the 34$^{th}$ implementation. In the 35$^{th}$ implementation, the altered condition for the dental site comprises at least one of a post-orthodontic treatment position and orientation of one or more teeth, or a crown, a veneer, a bridge, a composite bonding, an extraction, or a filling not present in the current condition of the dental site.

A 36$^{th}$ implementation may further extend any of the 1$^{st}$ through 35$^{th}$ implementations. In the 36$^{th}$ implementation, the video comprises a plurality of frames, and wherein modifying the video comprises performing the following for at least one frame of the plurality of frames: inputting data from the frame and the altered condition of the dental site into a trained generative model, wherein the trained generative model outputs a modified version of the frame.

A 37$^{th}$ implementation may further extend any of the 1$^{st}$ through 36$^{th}$ implementations. In the 37$^{th}$ implementation, the altered condition of the dental site comprises a deteriorated condition of the dental site that is expected if no treatment is performed.

A 38$^{th}$ implementation may further extend any of the 1$^{st}$ through 37$^{th}$ implementations. In the 38$^{th}$ implementation, the video is of the face of the individual.

A 39$^{th}$ implementation may further extend any of the 1$^{st}$ through 38$^{th}$ implementations. In the 39$^{th}$ implementation, the video comprises faces of a plurality of individuals, and wherein the individual is one of the plurality of individuals, the method further comprising: receiving or determining an altered condition of a second dental site of a second individual of the plurality of individuals; and further modifying the video by replacing a current condition of the second dental site with the altered condition of the second dental site in the video.

A 40$^{th}$ implementation may further extend any of the 1$^{st}$ through 39$^{th}$ implementations. In the 40$^{th}$ implementation, the video comprises a movie, and wherein the individual comprises an actor for the movie.

A 41$^{st}$ implementation may further extend the 40$^{th}$ implementation. In the 41$^{st}$ implementation, the method is performed during post-production of the movie.

A 42$^{nd}$ implementation may further extend any of the 1$^{st}$ through 41$^{st}$ implementations. In the 42$^{nd}$ implementation, the altered condition of the dental site comprises a degraded condition of the dental site.

A 43$^{rd}$ implementation may further extend the 42$^{nd}$ implementation. In the 43$^{rd}$ implementation, the degraded condition of the dental site comprises at least one of a malocclusion, one or more missing teeth, one or more stained teeth, one or more rotten teeth, or one or more chipped teeth.

A 44$^{th}$ implementation may further extend any of the 1$^{st}$ through 44$^{th}$ implementations. In the 44$^{th}$ implementation, the altered condition comprises a fantastical condition for the dental site that is not naturally occurring in humans.

A 45$^{th}$ implementation may further extend the 44$^{th}$ implementation. In the 45h implementation, the fantastical condition of the dental site comprises at least one of sharpened teeth, vampire teeth, or monstrous teeth.

A 46$^{th}$ implementation may further extend any of the 1$^{st}$ through 45$^{th}$ implementations. In the 46$^{th}$ implementation, the method further comprises: receiving a three-dimensional (3D) model of the dental site generated based on intraoral scanning of an oral cavity of the individual; determining the altered condition based on modifying the 3D model of the dental site; and for each frame of the video, projecting the modified 3D model of the dental site onto a plane associated with the frame of the video.

A 47$^{th}$ implementation may further extend the 46$^{th}$ implementation. In the 47h implementation, the method further comprises: presenting a palette of options for modifications to the dental site in a user interface; receiving a selection of one or more of the options; and modifying the 3D model of the dental site based on the one or more selected options.

A 48$^{th}$ implementation may further extend any of the 1$^{st}$ through 47$^{th}$ implementations. In the 48$^{th}$ implementation, the method further comprises: receiving one or more two-dimensional (2D) images of the dental site; generating a three-dimensional (3D) model of the dental site generated based on the one or more 2D images; determining the altered condition based on modifying the 3D model of the dental site; and for each frame of the video, projecting the modified 3D model of the dental site onto a plane associated with the frame of the video.

A 49$^{th}$ implementation may further extend the 48$^{th}$ implementation. In the 49$^{th}$ implementation, the 2D images are color 2D images generated by a mobile computing device.

A 50$^{th}$ implementation may further extend any of the 1$^{st}$ through 49$^{th}$ implementations. In the 50$^{th}$ implementation, the altered condition is an estimated future condition of the dental site.

A 51$^{st}$ implementation may further extend any of the 1$^{st}$ through 50$^{th}$ implementations. In the 51$^{st}$ implementation, a non-transitory computer readable medium comprising instructions that, when executed by a processing device, cause the processing device to perform the method of any of the 1$^{st}$ through 50$^{th}$ implementations.

A 52$^{nd}$ implementation may further extend any of the 1$^{st}$ through 50$^{th}$ implementations. In the 52$^{nd}$ implementation, a system comprises: a processing device; and a memory to store instructions that, when executed by the processing device, cause the processing device to perform the method of any of the 1$^{st}$ through 50$^{th}$ implementations.

In a 53$^{rd}$ implementation, a method comprises: capturing a video comprising a plurality of frames of a face of an individual; determining that the video fails to satisfy one or more quality criteria; and providing guidance of one or more actions to be performed by the individual to cause an updated video to satisfy the one or more quality criteria.

A 54$^{th}$ implementation may further extend the 53$^{rd}$ implementation. In the 54$^{th}$ implementation, the method further comprises: capturing the updated video comprising a second plurality of frames of the face of the individual after providing the guidance; and determining that the updated video satisfies the one or more quality criteria.

A 55$^{th}$ implementation may further extend the 54$^{th}$ implementation. In the 55$^{th}$ implementation, the method further comprises: determining that one or more frames of the second plurality of frames of the updated video fail to satisfy the one or more quality criteria; and removing the one or more frames from the updated video.

A 56$^{th}$ implementation may further extend the 55$^{th}$ implementation. In the 56$^{th}$ implementation, the method further comprises: generating a replacement frame for at least one removed frame, wherein the replacement frame is generated based on a first frame preceding the removed frame and a second frame following the removed frame and comprises an intermediate state of the face between a first state of the face in the first frame and a second state of the face in the second frame.

A 57$^{th}$ implementation may further extend the 56$^{th}$ implementation. In the 57$^{th}$ implementation, the replacement frame is generated by inputting the first frame and the second frame into a generative model that generates the replacement frame.

A 58$^{th}$ implementation may further extend any of the 53$^{rd}$ through 57$^{th}$ implementations. In the 58$^{th}$ implementation, the one or more quality criteria comprise at least one of: a face angle criterion; a motion blur criterion; a head pose criterion; a head movement speed criterion; a head position criterion; a camera stability criterion; a camera defocus criterion; a mouth shape criterion; a jaw position criterion; or a lighting criterion.

A 59$^{th}$ implementation may further extend any of the 53$^{rd}$ through 58$^{th}$ implementations. In the 59$^{th}$ implementation, the method further comprises: outputting a notice of the one or more quality criteria prior to beginning capturing of the video.

A 60$^{th}$ implementation may further extend any of the 53$^{rd}$ through 59$^{th}$ implementations. In the 60$^{th}$ implementation, the method further comprises: outputting a notice of which criteria of the one or more quality criteria are not satisfied and how to satisfy the one or more quality criteria.

A 61$^{st}$ implementation may further extend any of the 53$^{rd}$ through 60$^{th}$ implementations. In the 61$^{st}$ implementation, determining that the video fails to satisfy the one or more quality criteria and providing the guidance are performed during the capturing of the video.

A 62$^{nd}$ implementation may further extend any of the 53$^{rd}$ through 61$^{st}$ implementations. In the 62$^{nd}$ implementation, the one or more actions comprise at least one of: move head; rotate head; change facial expression; slow down head movement; adjust camera focus; or adjust lighting conditions.

A 63$^{rd}$ implementation may further extend any of the 53$^{rd}$ through 62$^{nd}$ implementations. In the 63$^{rd}$ implementation, the method further comprises: determining facial landmarks of the face in one or more frames of the video; determining at least one of a head position, a head orientation, a face angle, or a jaw position based on the facial landmarks; and determining at least one of a) that the head position fails to satisfy a head position criterion, b) that the head orientation fails to satisfy a head orientation criterion, c) that the face angle fails to satisfy a face angle criterion, or d) that the jaw position fails to satisfy a jaw position criterion.

A 64$^{th}$ implementation may further extend any of the 53$^{rd}$ through 63$^{rd}$ implementations. In the 64$^{th}$ implementation, the method further comprises: determining an optical flow between two or more frames of the video; determining at least one of a head movement speed or a camera stability based on the optical flow; and determining at least one of a) that the camera stability fails to satisfy a camera stability criterion or b) that the head movement speed fails to satisfy a head movement speed criterion.

A 65$^{th}$ implementation may further extend any of the 53$^{rd}$ through 64$^{th}$ implementations. In the 65$^{th}$ implementation, the method further comprises: detecting at least one of motion blur or camera focus associated with the video; and determining at least one of a) that the motion blur fails to satisfy a motion blur criterion or b) that the camera focus fails to satisfy a camera focus criterion.

A 66$^{th}$ implementation may further extend any of the 53$^{rd}$ through 65$^{th}$ implementations. In the 66$^{th}$ implementation, the method further comprises: determining an amount of visible teeth in the video; and determining whether the amount of visible teeth satisfies an amount of visible teeth criterion.

A 67$^{th}$ implementation may further extend any of the 53$^{rd}$ through 66$^{th}$ implementations. In the 67$^{th}$ implementation, the updated video comprises a current condition of a dental site of the individual, the method further comprising: estimating a future condition of the dental site; and modifying the updated video by replacing the current condition of the dental site with the future condition of the dental site in the updated video.

A 68$^{th}$ implementation may further extend the 67$^{th}$ implementation. In the 68$^{th}$ implementation, the method further comprises: determining one or more quality metric values for a plurality of frames of the modified updated video; identifying two or more consecutive frames of the plurality of frames having one or more quality metric values that fail to satisfy one or more quality metric criteria; and removing the two or more consecutive frames from the modified updated video.

A 69$^{th}$ implementation may further extend any of the 53$^{rd}$ through 68$^{th}$ implementations. In the 69$^{th}$ implementation, a non-transitory computer readable medium comprising instructions that, when executed by a processing device, cause the processing device to perform the method of any of the 53$^{rd}$ through 68$^{th}$ implementations.

A 70$^{th}$ implementation may further extend any of the 53$^{rd}$ through 68$^{th}$ implementations. In the 70$^{th}$ implementation, a system comprises: a processing device; and a memory to store instructions that, when executed by the processing device, cause the processing device to perform the method of any of the 53$^{rd}$ through 68$^{th}$ implementations.

In a 71$^{st}$ implementation, a method comprises: receiving a video, the video comprising of a current condition of a subject; receiving or determining an estimated future condition of the subject in the video; and modifying the video by replacing the current condition of the subject with the estimated future condition of the subject in the video.

A 72$^{nd}$ implementation may further extend the 71$^{st}$ implementation. In the 72$^{nd}$ implementation, the subject in the modified video is different from the subject in an original version of the video and is temporally stable and consistent between frames of the modified video.

A 73$^{rd}$ implementation may further extend to 72$^{nd}$ implementation. In the 73$^{rd}$ implementation, the method further comprises: identifying one or more frames of the modified video that fail to satisfy one or more image quality criteria; and removing the one or more frames of the modified video that failed to satisfy the one or more image quality criteria.

A 74$^{th}$ implementation may further extend the 73$^{rd}$ implementation. In the 74$^{th}$ implementation, the method further comprises: generating replacement frames for the removed one or more frames of the modified video.

A 75$^{th}$ implementation may further extend the 74$^{th}$ implementation. In the 75$^{th}$ implementation, each replacement frame is generated based on a first frame preceding a removed frame and a second frame following the removed frame and comprises an intermediate state of the subject between a first state of a first frame and a second state of the second frame.

A 76$^{th}$ implementation may further extend the 75$^{th}$ implementation. In the 76$^{th}$ implementation, the method further comprises: generating one or more synthetic frames for the modified video, wherein each synthetic frame of the one or more synthetic frames is generated based on an original frame of the modified video and a replacement frame of the modified video.

A $77^{th}$ implementation may further extend any of the $71^{st}$ through the $76^{th}$ implementations. In the $77^{th}$ implementation, determining the estimated future condition of the subject comprises: generating or receiving a first three-dimensional (3D) model of the subject; and generating or receiving a second 3D model of the subject comprising the estimated future condition of the subject, the second 3D model having been generated based on modifying the first 3D model of the subject.

A $78^{th}$ implementation may further extend the $77^{th}$ implementation. In the $78^{th}$ implementation, the first 3D model of the subject is generated from the video.

A $79^{th}$ implementation may further extend the $78^{th}$ implementation. In the $79^{th}$ implementation, the estimated future condition of the subject is determined based on applying one or more subject modification rules to the first 3D model of the subject.

An $80^{th}$ implementation may further extend any of the $71^{st}$ through the $79^{th}$ implementations. In the $80^{th}$ implementation, the modified video is generated on-the-fly during generation or streaming of the video.

An $81^{st}$ implementation may further extend any of the $71^{st}$ through the $80^{th}$ implementations. In the $81^{st}$ implementation, modifying the video comprises performing the following for at least one frame of the video: determining an area of interest of the subject in the at least one frame; and replacing initial data for the area of interest with replacement data determined from the estimated future condition of the subject.

An $82^{nd}$ implementation may further extend the $81^{st}$ implementation. In the $82^{nd}$ implementation, determining the area of interest for the at least one frame comprises: inputting the at least one frame into a trained machine learning model, wherein the trained machine learning model outputs a position of the area of interest for the at least one frame.

An $83^{rd}$ implementation may further extend the $81^{st}$ or $82^{nd}$ implementation. In the $83^{rd}$ implementation, the method further comprises performing the following prior determining the area of interest: determining a plurality of landmarks for a plurality of frames of the video using a trained machine learning model, wherein the at least one frame is one of the plurality of frames of the video; and performing smoothing of the plurality of landmarks between the plurality of frames, wherein the area of interest is determined based on the plurality of landmarks.

An $84^{th}$ implementation may further extend any of $81^{st}$ through $83^{rd}$ implementations. In the $84^{th}$ implementation, the method further comprises: cropping the at least one frame around the area of interest; and performing one or more additional operations on the cropped at least one frame.

An $85^{th}$ implementation may further extend any of $81^{st}$ through $84^{th}$ implementations. In the $85^{th}$ implementation, the method further comprises: performing segmentation on the area of interest of the at least one frame by inputting at least the area of interest of the at least one frame into a trained machine learning model that segments the area of interest into a plurality of individual objects.

An $86^{th}$ implementation may further extend the $85^{th}$ implementation. In the $86^{th}$ implementation, the method further comprises: performing segmentation of a three-dimensional (3D) model of the subject into a second plurality of objects; and finding correspondences between the plurality of objects in the area of interest and the second plurality of objects in the 3D model of the subject.

An $87^{th}$ implementation may further extend the $86^{th}$ implementation. In the $87^{th}$ implementation, the method further comprises: fitting the 3D model of the subject to the at least one frame based on the correspondences; determining a plane to project the 3D model onto based on a result of the fitting; and projecting the 3D model onto the determined plane.

An $88^{th}$ implementation may further extend the $87^{th}$ implementation. In the $88^{th}$ implementation, information on a fitting of the 3D model of the subject to a previous frame is used in performing the fitting of the 3D model of the subject to the at least one frame.

An $89^{th}$ implementation may further extend any of the $85^{th}$ through $88^{th}$ implementations. In the $89^{th}$ implementation, performing segmentation of the at least one frame comprises inputting the area of interest of the at least one frame and areas of interest of one or more previous frames into the trained machine learning model, and wherein the trained machine learning model segments the area of interest of the at least one frame in a manner that is temporally consistent with the one or more previous frames.

An $90^{th}$ implementation may further extend any of the $85^{th}$ through $89^{th}$ implementations. In the $90^{th}$ implementation, the method further comprises: determining an optical flow between the at least one frame and one or more previous frames; wherein performing segmentation of the at least one frame comprises inputting the area of interest of the at least one frame and the optical flow into the trained machine learning model, and wherein the trained machine learning model segments the area of interest of the at least one frame in a manner that is temporally consistent with the one or more previous frames.

An $91^{st}$ implementation may further extend any of the $81^{st}$ through $90^{th}$ implementations. In the $91^{st}$ implementation, the method further comprises: determining color information for the area of interest in the at least one frame; determining contours of the estimated future condition of the area of interest; and inputting at least one of the color information, the determined contours, the at least one frame or information on the area of interest into a generative model, wherein the generative model outputs a modified frame of the video comprising the estimated future condition of the subject.

A $92^{nd}$ implementation may further extend the $91^{st}$ implementation. In the $92^{nd}$ implementation, a modified version of a prior frame is also input into the generative model to enable the generative model to output the modified frame of the at least one frame that is temporally stable with the prior frame.

A $93^{rd}$ implementation may further extend the $92^{nd}$ implementation. In the $93^{rd}$ implementation, the method further comprises: transforming the prior frame and the at least one frame into a feature space; and determining an optical flow between the prior frame and the at least one frame in the feature space, wherein the generative model further uses the optical flow in the feature space to generate the modified version of the at least one frame.

A $94^{th}$ implementation may further extend any of the $91^{st}$ through $93^{rd}$ implementations. In the $94^{th}$ implementation, the contours are determined based on a three-dimensional (3D) model of the subject comprising the estimated future condition of the subject, the method further comprising: determining a plurality of normals to surfaces in the 3D model, wherein each normal of the plurality of normals comprises a 3D vector; fitting at least one of the 3D model or the additional 3D model to the area of interest of the at least one frame; and generating a two-dimensional (2D) map comprising one or more of the normals from the plurality of normals using a result of the fitting, wherein the 3D map is also input into the generative model.

A 95$^{th}$ implementation may further extend the 94$^{th}$ implementation. In the 95$^{th}$ implementation, the 2D map comprises a red, green, blue (RGB) image, and wherein one or more pixels of the RGB image comprise a red value representing a component of a vector along a first axis, a green value representing a component of the vector along a second axis, and a blue value representing a component of the vector along a third axis.

A 96$^{th}$ implementation may further extend any of the 91$^{st}$ through 95$^{th}$ implementations. In the 96$^{th}$ implementation, the generative model comprises a generator of a generative adversarial network (GAN).

A 97$^{th}$ implementation may further extend any of the 91$^{st}$ through 96$^{th}$ implementations. In the 97$^{th}$ implementation, the method further comprises: processing the video using a trained machine learning model that outputs a plurality of extracted features of the video, wherein the plurality of extracted features of the video are also input into the generative model.

A 98$^{th}$ implementation may further extend any of the 71$^{st}$ through 97$^{th}$ implementations. In the 98$^{th}$ implementation, the video comprises a plurality of frames, and wherein modifying the video comprises performing the following for at least one frame of the plurality of frames: inputting data from the frame and the estimated future condition of the subject into a trained generative model, wherein the trained generative model outputs a modified version of the frame.

A 99$^{th}$ implementation may further extend any of the 71$^{st}$ through 98$^{th}$ implementations. In the 99$^{th}$ implementation, the subject comprises a dental site and the estimated future condition of the subject comprises a post-treatment condition of the dental site.

A 100$^{th}$ implementation may further extend any of the 71$^{st}$ through 99$^{th}$ implementations. In the 100$^{th}$ implementation, the subject comprises a forest and the estimated future condition of the subject comprises a condition of the forest during or after a wildfire.

A 101$^{st}$ implementation may further extend any of the 71$^{st}$ through 100$^{th}$ implementations. In the 101$^{st}$ implementation, the subject comprises a view of at least a portion of a town or city, and wherein the estimated future condition of the subject comprises a condition of at least the portion of the town or city during or after a natural disaster.

A 102$^{nd}$ implementation may further extend any of the 71$^{st}$ through 101$^{st}$ implementations. In the 102$^{nd}$ implementation, the subject comprises a view of a landscape, and wherein the estimated future condition of the subject comprises a condition of the landscape during or after a natural disaster.

A 103$^{rd}$ implementation may further extend any of the 71$^{st}$ through 102$^{nd}$ implementations. In the 103$^{rd}$ implementation, a non-transitory computer readable medium comprising instructions that, when executed by a processing device, cause the processing device to perform the method of any of the 71$^{st}$ through 102$^{nd}$ implementations.

A 104$^{th}$ implementation may further extend any of the 71$^{st}$ through 102$^{nd}$ implementations. In the 104$^{th}$ implementation, a system comprises: a processing device; and a memory to store instructions that, when executed by the processing device, cause the processing device to perform the method of any of the 71$^{st}$ through 102$^{nd}$ implementations.

In a 105$^{th}$ implementation, a method comprises: receiving, by a processing device executing a video or image editing application or service, one or more images of a face of an individual, the one or more images comprising a current condition of a dental site of the individual generated in a non-clinical setting; receiving or determining, by the processing device, an altered condition of the dental site; and modifying, by the processing device, the one or more images by replacing the current condition of the dental site with the altered condition of the dental site.

A 106$^{th}$ implementation may further extend the 105$^{th}$ implementation. In the 106$^{th}$ implementation, the processing device executes the video or image editing service, wherein the one or more images are received from a client computing device along with an indication of one or more modifications to make to the one or more images, the method further comprising: transmitting the modified one or more images to the client computing device.

A 107$^{th}$ implementation may further extend the 105$^{th}$ or 106$^{th}$ implementation. In the 107$^{th}$ implementation, the processing device executes the video or image editing application, the method further comprising: outputting the modified one or more images to a display.

A 108$^{th}$ implementation may further extend any of the 105$^{th}$ through 107$^{th}$ implementations. In the 108$^{th}$ implementation, the one or more images comprise frames of a video.

A 109$^{th}$ implementation may further extend any of the 105$^{th}$ through 108$^{th}$ implementations. In the 109$^{th}$ implementation, the one or more images comprise frames of a live video stream.

A 110$^{th}$ implementation may further extend the 109$^{th}$ implementation. In the 110$^{th}$ implementation, the live video stream is associated with a video chat session.

A 111$^{th}$ implementation may further extend any of the 105$^{th}$ through 110$^{th}$ implementations. In the 111$^{th}$ implementation, the method further comprises: presenting a palette of options for modifications to the dental site in a user interface; and receiving a selection of one or more of the options, wherein the altered condition of the dental site is based on the one or more selected options.

A 112$^{th}$ implementation may further extend any of the 105$^{th}$ through 111$^{th}$ implementations. In the 112$^{th}$ implementation, the method further comprises: sending a request for the altered condition of the dental site to a server, the request indicating one or more modifications to make to the dental site, wherein the altered condition of the dental site is received from the server responsive to the server generating the altered condition of the dental site.

A 113$^{th}$ implementation may further extend any of the 105$^{th}$ through 112$^{th}$ implementations. In the 113$^{th}$ implementation, the one or more images are one or more images of an avatar of the individual.

A 114$^{th}$ implementation may further extend any of the 105$^{th}$ through 113$^{th}$ implementations. In the 114$^{th}$ implementation, the method further comprises: receiving intraoral scan data for the dental site of the individual; generating a three-dimensional (3D) model of the dental site based on the intraoral scan data; and using the 3D model to generate the altered condition of the dental site.

A 115$^{th}$ implementation may further extend any of the 105$^{th}$ through 114$^{th}$ implementations. In the 115$^{th}$ implementation, a non-transitory computer readable medium comprising instructions that, when executed by a processing device, cause the processing device to perform the method of any of the 105$^{th}$ through 114$^{th}$ implementations.

A 116$^{th}$ implementation may further extend any of the 105$^{th}$ through 114$^{th}$ implementations. In the 116$^{th}$ implementation, a system comprises: a processing device; and a memory to store instructions that, when executed by the processing device, cause the processing device to perform the method of any of the $105^{th}$ through $114^{th}$ implementations.

In $117^{th}$ implementation, a method comprises: receiving a three-dimensional (3D) model of a dental arch of an individual; determining a current orientation of the 3D model of the dental arch of the individual; selecting, from a plurality of images of a face of the individual, an image in which a jaw of the individual has an orientation that approximately corresponds to the orientation of the 3D model of the dental arch; and outputting the 3D model having the current orientation and the selected image to a display.

A $118^{th}$ implementation may further extend the $117^{th}$ implementation. In the $118^{th}$ implementation, the image is output to a first region of the display and the 3D model is output to a second region of the display.

A $119^{th}$ implementation may further extend the $117^{th}$ or $118^{th}$ implementation. In the $119^{th}$ implementation, at least a portion of the 3D model is overlaid on the image.

A $120^{th}$ implementation may further extend any of the $117^{th}$ through $119^{th}$ implementations. In the $120^{th}$ implementation, the method further comprises: modifying the image by replacing a dental site in the image with a least a portion of the 3D model.

A $121^{st}$ implementation may further extend the $120^{th}$ implementation. In the $121^{st}$ implementation, the method further comprises: determining an area between lips of the individual in the image; and replacing image data in the area with image data from the 3D model of the dental arch.

A $122^{nd}$ implementation may further extend any of the $117^{th}$ through $121^{st}$ implementations. In the $122^{nd}$ implementation, the method further comprises: receiving a command to adjust the 3D model to cause the 3D model of the dental arch to have a new orientation; selecting, from the plurality of images, a new image in which the jaw of the individual has a new orientation that approximately corresponds to the new orientation of the 3D model of the dental arch; and outputting the 3D model having the new orientation and the new selected image to the display.

A $123^{rd}$ implementation may further extend any of the $117^{th}$ through $122^{nd}$ implementations. In the $123^{rd}$ implementation, the plurality of images comprise frames of a video.

A $124^{th}$ implementation may further extend the $123^{rd}$ implementation. In the $124^{th}$ implementation, the method further comprises: determining that for at least two frames of the video the jaw of the individual has an orientation that approximately corresponds to the orientation of the 3D model of the dental arch; determining a timestamp of a previously selected frame of the video; and selecting, from the at least two frames, a frame having a timestamp that is closest to the timestamp associated with the previously selected frame.

A $125^{th}$ implementation may further extend the $123^{rd}$ or $124^{th}$ implementation. In the $125^{th}$ implementation, the method further comprises: dividing the video into a plurality of time segments, wherein each time segment of the plurality of time segments comprises a sequence of frames in which the jaw has an orientation that deviates by less than a threshold; and presenting the plurality of time segments.

A $126^{th}$ implementation may further extend the $125^{th}$ implementation. In the $126^{th}$ implementation, the method further comprises: receiving a selection of a time segment from the plurality of time segments; determining an orientation of the jaw in the selected time segment; and updating the orientation of the dental arch to match the orientation of the jaw in the selected time segment.

A $127^{th}$ implementation may further extend any of the $123^{rd}$ through the $126^{th}$ implementations. In the $127^{th}$ implementation, the method further comprises: outputting an indication of other frames of the video for which the orientation of the jaw approximately corresponds to the orientation of the 3D model of the dental arch.

A $128^{th}$ implementation may further extend any of the $123^{rd}$ through the $127^{th}$ implementations. In the $128^{th}$ implementation, the method further comprises: determining that for no frame of the video does the orientation of the jaw match the current orientation of the 3D model of the dental arch; and generating a new frame of the video for which the orientation of the jaw matches the current orientation of the 3D model of the dental arch, wherein the new frame is selected.

A $129^{th}$ implementation may further extend the $128^{th}$ implementation. In the $129^{th}$ implementation, the new frame is generated based on interpolation using two existing frames of the video.

A $130^{th}$ implementation may further extend any of the $123^{rd}$ through the $129^{th}$ implementations. In the $130^{th}$ implementation, the method further comprises: determining a range of orientations of the jaw of the individual from the plurality of frames of the video; and limiting the orientation of the 3D model based on the determined range of orientations of the jaw.

A $131^{st}$ implementation may further extend any of the $117^{th}$ through the $130^{th}$ implementations. In the $131^{st}$ implementation, the method further comprises: determining that for at least two images of the plurality of images the jaw of the individual has an orientation that approximately corresponds to the orientation of the 3D model of the dental arch; determining scores for each of the at least two images based on one or more parameters; and selecting, from the at least two images, an image having a highest score.

A $132^{nd}$ implementation may further extend the $131^{st}$ implementation. In the $132^{nd}$ implementation, the one or more parameter comprise at least one of a lighting condition parameter or a facial expression parameter.

A $133^{rd}$ implementation may further extend any of the $117^{th}$ through the $132^{nd}$ implementations. In the $133^{rd}$ implementation, the method further comprises: receiving a three-dimensional (3D) model of a second dental arch of the individual; and determining a current orientation of the 3D model of the second dental arch of the individual; wherein the selected image has an upper jaw with a first orientation that approximately matches the orientation of the dental arch and a lower jaw with a second orientation that approximately matches the orientation of the second dental arch.

A $134^{th}$ implementation may further extend any of the $117^{th}$ through the $133^{rd}$ implementations. In the $134^{th}$ implementation, a non-transitory computer readable medium comprising instructions that, when executed by a processing device, cause the processing device to perform the method of the $117^{th}$ through the $133^{rd}$ implementations.

A $135^{th}$ implementation may further extend any of the $117^{th}$ through the $133^{rd}$ implementations. In the $135^{th}$ implementation, a system comprises: a processing device; and a memory to store instructions that, when executed by the processing device, cause the processing device to perform the method of any of the $117^{th}$ through the $133^{rd}$ implementations.

In a $136^{th}$ implementation, a method comprises: receiving a selection of an image of a face of an individual from a plurality of images of the face of the individual; determining an orientation of a jaw of the individual in the selected image; and updating an orientation of a three-dimensional (3D) model of a dental arch of the individual to match the orientation of the jaw of the individual in the selected image.

A 137$^{th}$ implementation may further extend the 136$^{th}$ implementation. In the 137$^{th}$ implementation, the method further comprises: receiving a selection of a second image of the face of an individual from the plurality of images of the face of the individual; determining an orientation of an opposing jaw of the individual in the second image; and updating an orientation of a 3D model of a second dental arch of the individual to match the orientation of the opposing jaw of the individual in the second image.

A 138$^{th}$ implementation may further extend the 136$^{th}$ or 137$^{th}$ implementation. In the 138$^{th}$ implementation, the method further comprises: determining an orientation of an opposing jaw of the individual in the selected image; and updating an orientation of a 3D model of a second dental arch of the individual to match the orientation of the opposing jaw of the individual in the selected image.

A 139$^{th}$ implementation may further extend any of the 136$^{th}$ through 138$^{th}$ implementations. In the 139$^{th}$ implementation, the image is output to a first region of the display and the 3D model is output to a second region of the display.

A 140$^{th}$ implementation may further extend any of the 136$^{th}$ through 139$^{th}$ implementations. In the 140$^{th}$ implementation, at least a portion of the 3D model is overlaid on the image.

A 141$^{st}$ implementation may further extend any of the 136$^{th}$ through 140$^{th}$ implementations. In the 141$^{st}$ implementation, the method further comprises: modifying the image by replacing a dental site in the image with a least a portion of the 3D model.

A 142$^{nd}$ implementation may further extend the 141$^{st}$ implementation. In the 142$^{nd}$ implementation, the method further comprises: determining an area between lips of the individual in the image; and replacing image data in the area with image data from the 3D model of the dental arch.

A 143$^{rd}$ implementation may further extend any of the 136$^{th}$ through 142$^{nd}$ implementations. In the 143$^{rd}$ implementation, the method further comprises: receiving a selection of a new image of the face of the individual from the plurality of images of the face of the individual; determining a new orientation of the jaw of the individual in the new image; and updating an orientation of the 3D model of a dental arch of the individual to match the orientation of the jaw of the individual in the new image.

A 144$^{th}$ implementation may further extend any of the 136$^{th}$ through 143$^{rd}$ implementations. In the 144$^{th}$ implementation, the plurality of images comprise frames of a video.

A 145$^{th}$ implementation may further extend the 144$^{th}$ implementation. In the 145$^{th}$ implementation, the method further comprises: dividing the video into a plurality of time segments, wherein each time segment of the plurality of time segments comprises a sequence of frames in which the jaw has an orientation that deviates by less than a threshold; and presenting the plurality of time segments.

A 146$^{th}$ implementation may further extend the 144$^{th}$ or 145$^{th}$ implementation. In the 145$^{th}$ implementation, the method further comprises: receiving a selection of a time segment from the plurality of time segments; determining an orientation of the jaw in the selected time segment; and updating the orientation of the 3D model of the dental arch to match the orientation of the jaw in the selected time segment.

A 147$^{th}$ implementation may further extend any of the 144$^{th}$ through 146$^{th}$ implementations. In the 147$^{th}$ implementation, the method further comprises: outputting an indication of other frames of the video for which the orientation of the jaw approximately corresponds to the orientation of the jaw in the selected image.

A 148$^{th}$ implementation may further extend any of the 144$^{th}$ through 147$^{th}$ implementations. In the 148$^{th}$ implementation, a non-transitory computer readable medium comprising instructions that, when executed by a processing device, cause the processing device to perform the method of any of the 144$^{th}$ through 147$^{th}$ implementations.

A 149$^{th}$ implementation may further extend any of the 144$^{th}$ through 147$^{th}$ implementations. In the 149$^{th}$ implementation, a system comprises: a processing device; and a memory to store instructions that, when executed by the processing device, cause the processing device to perform the method of any of the 144$^{th}$ through 147$^{th}$ implementations.

BRIEF DESCRIPTION OF THE DRAWINGS

Embodiments of the present disclosure are illustrated by way of example, and not by way of limitation, in the figures of the accompanying drawings.

FIG. 1 illustrates videos of a patient's dentition before and after dental treatment, in accordance with an embodiment.

FIG. 3 illustrates a workflow for a video processing module that generates modified videos showing altered conditions of dentition of a subject, in accordance with an embodiment of the present disclosure.

FIG. 19 illustrates a flow diagram for a method of generating images and/or video having one or more subjects with altered dentition using a video or image editing application or service, in accordance with an embodiment.

DETAILED DESCRIPTION

Figure 2:
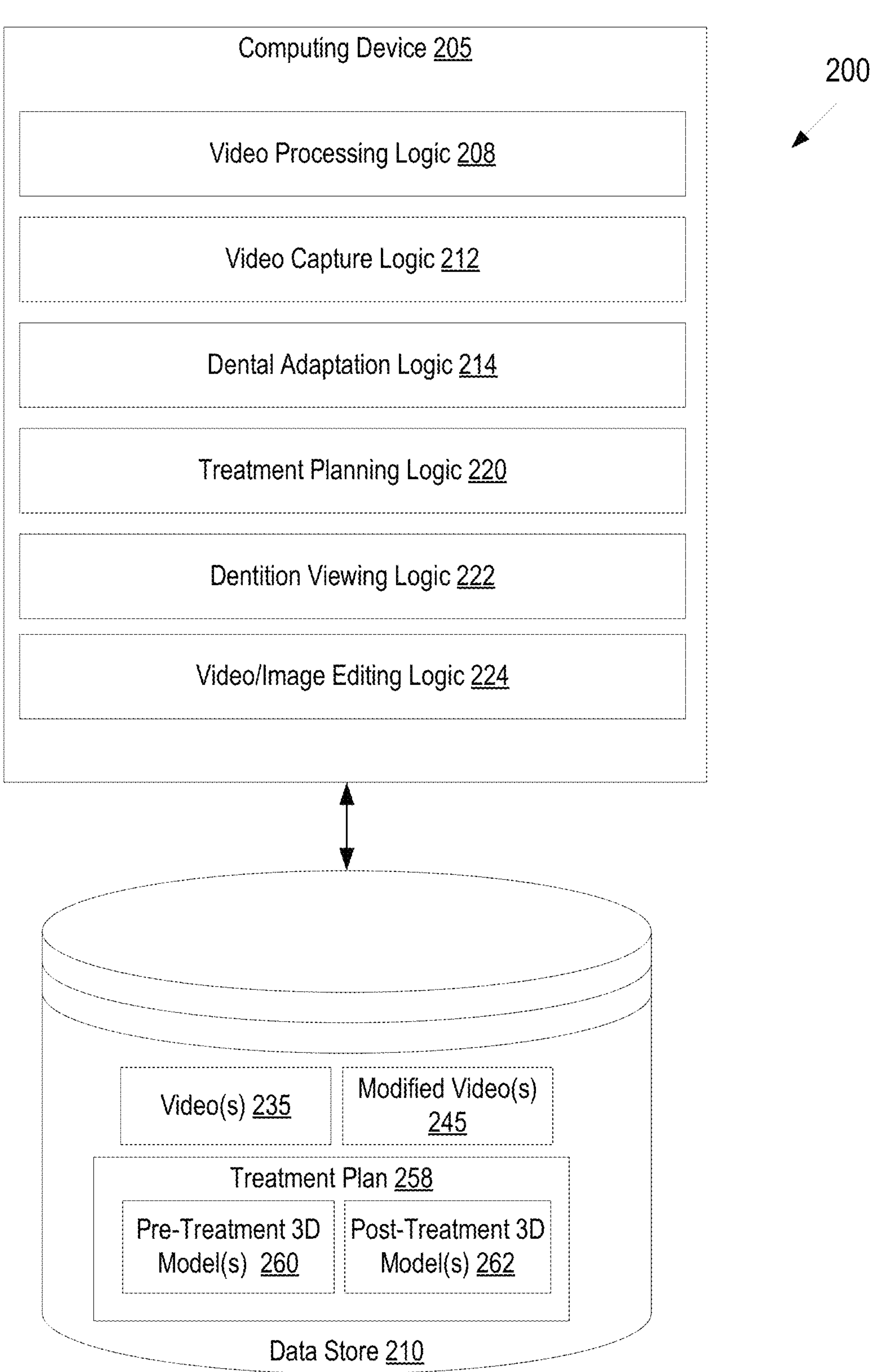
FIG. 2 illustrates one embodiment of a system for treatment planning and/or video generation, in accordance with an embodiment.

Described herein are methods and systems for generating videos of an altered condition (e.g., an estimated future condition) of an individual's face, smile and/or dentition based on modifying a captured video of a current condition of the individual's face, smile and/or dentition, in accordance with embodiments of the present disclosure. Also described herein a methods and systems for an image or video editing application, plugin and/or service that can alter dentition of one or more individuals in one or more images and/or a video. Also described herein are methods and systems for generating videos of an estimated future condition of other types of subjects based on modifying a captured video of a current condition of the subjects, in accordance with embodiments of the present disclosure. Also described herein are methods and systems for guiding an individual during video capture of the individual's face to ensure that the video will be of sufficient quality to process that video in order to generate a modified video with an estimated future condition of the individual's dentition, in accordance with embodiments of the present disclosure. Also described herein are methods and systems for selecting images and/or frames of a video based on a current orientation (e.g., view angle) of one or more 3D models of dental arches of an individual. In embodiments, an orientation of a jaw of the individual in the selected image(s) and/or frame(s) matches or approximately matches an orientation of a 3D model of a dental arch of the individual. Also described herein are methods and systems for updating an orientation of one or more 3D models of an individual's dental arch(es) based on a selected image and/or frame of a video. In embodiments, a selected frame or image includes a jaw of the individual having a specific orientation, and the orientation of the one or more 3D models of the dental arch(es) is updated to match or approximately match the orientation of the jaw(s) of the individual in the selected image or frame of a video.

The methods and systems described herein may perform a sequence of operations to identify areas of interest in frames of a video (e.g., such as a mouth area of a facial video) and/or images, determine a future condition of the area of interest, and then modify the frames of the video and/or images by replacing the current version of the area of interest with an estimated future version of the area of interest or other altered version of the area of interest. In embodiments, the other altered version of the area of interest may not correspond to a normally achievable condition. For example, an individual's dentition may be altered to reflect vampire teeth, monstrous teeth such as tusks, filed down pointed teeth, enlarged teeth, shrunken teeth, and so on. In other examples, an individual's dentition may be altered to reflect unlikely but possible conditions, such as edentulous dental arches, dental arches missing a collection of teeth, highly stained teeth, rotted teeth, and so on. In some embodiments, a video may include faces of multiple individuals, and the methods and systems may identify the individuals and separately modify the dentition of each of the multiple individuals. The dentition for each of the individuals may be modified in a different manner in embodiments.

In some embodiments, a 3D model of a patient's teeth is provided or determined, and based on the 3D model of the patient's teeth a treatment plan is created that may change teeth positions, shape and/or texture. A 3D model of the post-treatment condition of the patient's teeth is generated as part of the treatment plan. The 6D position and orientation of the pre-treatment teeth in 3D space may be tracked for frames of the video based on fitting performed between frames of the video and the 3D model of the current condition of the teeth.

Features of the video or image may be extracted from the video or image, which may include color, lighting, appearance, and so on. One or more deep learning models such as generative adversarial networks and/or other generative models may be used to generate a modified video or image that incorporates the post-treatment or other altered version of the teeth with the remainder of the contents of the frames of the received video or the remainder of the image. With regards to videos, these operations are performed in a manner that ensures temporal stability and continuity between frames of the video, resulting in a modified video that may be indistinguishable from a real or unmodified video. The methods may be applied, for example, to show how a patient's teeth will appear after orthodontic treatment and/or prosthodontic treatment (e.g., to show how teeth shape, position and/or orientation is expected to change), to alter the dentition of one or more characters in and/or actors for a movie or film (e.g., by correcting teeth, applying one or more dental conditions to teeth, removing teeth, applying fantastical conditions to teeth, etc.), and so on. For example, the methods may be applied to generate videos showing visual impact to tooth shape of restorative treatment, visual impact of removing attachments (e.g., attachments used for orthodontic treatment), visual impact of performing orthodontic treatment, visual impact of applying crowns, veneers, bridges, dentures, and so on, visual impact of filing down an individual's teeth to points, visual impact of vampire teeth, visual impact of one or more missing teeth (e.g., of edentulous dental arches), and so on.

Embodiments are capable of pre-visualizing a variety of dental treatments and/or dental alterations that change color, shape, position, quantity, etc. of teeth. Examples of such treatments include orthodontic treatment, restorative treatment, implants, dentures, teeth whitening, and so on. The system described herein can be used, for example, by orthodontists, dental and general practitioners, and/or patients themselves. In embodiments, the system is usable outside of a clinical setting, and may be an image or video editing application that executes on a client device, may be a cloud-based image or video editing service, etc. For example, the system may be used for post-production of movies to digitally alter the dentition of one or more characters in and/or actors for the movie to achieve desired visual effects. In embodiments the system is capable of executing on standard computer hardware (e.g., that includes a graphical processing unit (GPU)). The system can therefore be implemented on normal desktop machines, intraoral scanning systems, server computing machines, mobile computing devices (e.g., such as a smart phone, laptop computer, tablet computer, etc.), and so forth.

In embodiments, a video processing pipeline is applied to images and/or frames of a video to transform those images/frames from a current condition into an estimated future condition or other altered condition. Machine learning models such as neural networks may be trained for performing operations such as key point or landmark detection, segmentation, area of interest detection, fitting or registration, and/or synthetic image generation in the image processing pipeline. Embodiments enable patients to see what their smile will look like after treatment. Embodiments also enable modification of teeth of one or more individuals in images and/or frames of a video (e.g., of a movie) in any manner that is desired.

In some embodiments, because a generated video can show a patient's smile from various angles and sides, it provides a better understanding of the 3D shape and position changes to their teeth expected by treatment and/or other dentition alterations. Additionally, because the generated video can show a patient's post-treatment smile and/or other dentition alterations under various expressions, it provides a better understanding of how that patient's teeth will appear after treatment and/or after other changes.

In embodiments, the system may be run in real time or near-real time (e.g., on-the-fly) to create an immersive augmented reality (AR) experience. For example, a front or back camera of a smartphone may be used to generate a video, and the video may be processed by logic on the smartphone to generate a modified video or may be sent to a cloud server or service that may process the video to generate a modified video and stream the modified video back to the smartphone. In either instance, the smartphone may display the modified video in real time or near-real time as a user is generating the video. Accordingly, the smartphone may provide a smart mirror functionality or augmented reality functionality in embodiments.

The same techniques described herein with reference to generating videos and/or images showing an estimated future condition of a patient's dentition also applies to videos and/or images of other types of subjects. For example, the techniques described herein with reference to generating videos of a future dentition may be used to generate videos showing a person's face and/or body at an advanced age (e.g., to show the effects of aging, which may take into account changing features such as progression of wrinkles), to generate videos showing a future condition of a plant, a future condition of a geographic location (e.g., during or after a natural disaster), a future condition of a house or other building, a future condition of a forest during or after a forest fire, a future condition of other body parts after other types of treatments or surgeries (e.g., plastic surgery, addition of prosthetics, etc.), and so on. Accordingly, it should be understood that the described examples associated with teeth, dentition, smiles, etc. also apply to any other type of object, person, living organism, place, etc. whose condition or state might change over time. Accordingly, in embodiments the techniques set forth herein may be used to generate, for example, videos of future conditions of any type of object, person, living organism, place, etc.

In dentistry a doctor, technician or patient may generate one or more images of their smile, teeth, etc. The image or images may then be processed by a system that modifies the images to generate post-treatment version images. However, such a modified image shows a limited amount of information. From such a modified image the doctor, technician, and/or patient is only able to assess what the patient's dentition will look like under a single facial expression and/or head pose. Single images are not as immersive as a video because the single images don't capture multiple natural poses, smiles, movements, and so on that are all captured from a video showing a patient's smile. Additionally, single images don't provide coverage of the patient's smile from multiple angles. Such systems that generate post treatment versions of images of patient smiles are not able to generate post treatment versions of videos. Even if a video of a patient's face were to be captured, the frames of the video were to be separated out, and a system that generates post-treatment versions of each of the frames were to be generated, such post treatment frames would not have temporal continuity or stability. Accordingly, a subject in such a modified video would be jerky, and the modified information in the video would change from frame to frame, rendering the video unusable for assessing what the patient's dentition would look like after treatment.

Accordingly, in embodiments a system and/or method operate on a video to modify the video in a manner that replaces areas of interest in the video with estimated future conditions or other altered conditions of the areas of interest such that the modified video is temporally consistent and stable between frames. One or more operations in a video processing pipeline are designed for maintaining temporal stability and continuity between frames of a video, as is set forth in detail below. Generating modified versions of videos showing future conditions and/or other altered conditions of a video subject is considerably more difficult than generating modified images showing a future condition and/or other altered condition of an image subject, and the design of a pipeline capable of generating modified versions of video that are temporally stable and consistent between frames is a non-trivial task.

Consumer smile simulations are simulated images or videos generated for consumers (e.g., patients) that show how the smiles of those consumers will look after some type of dental treatment (e.g., such as orthodontic treatment). Clinical smile simulations are generated simulated images or videos used by dental professionals (e.g., orthodontists, dentists, etc.) to make assessments on how a patient's smile will look after some type of dental treatment. For both consumer smile simulations and clinical smile simulations, a goal is to produce a mid-treatment or post-treatment realistic rendering of a patient's smile that may be used by a patient, potential patient and/or dental practitioner to view a treatment outcome. For both use cases, the general process of generating a simulated video showing a post-treatment smile includes taking a video of the patient's current smile, simulating or generating a treatment plan for the patient that indicates post-treatment positions and orientations for teeth and gingiva, and converting data from the treatment plan back into a new simulated video showing the post-treatment smile. Embodiments generate smile videos showing future conditions of patient dentition in a manner that is temporally stable and consistent between frames of the video. This helps doctors to communicate treatment results to patients, and helps patients to visualize treatment results and make a decision on dental treatment. After a smile simulation video is generated, the patient and doctor can easily compare the current condition of the patient's dentition with the post-treatment condition of the dentition and make a treatment decision. Additionally, if there are different treatment options, then multiple post-treatment videos may be generated, one for each treatment option. The patient and doctor can then compare the different post-treatment videos to determine which treatment option is preferred. Additionally, for doctors and dental labs, embodiments help them to plan a treatment from both an aesthetic and functional point of view, as they can see the patient acting naturally in post-processed videos showing their new teeth. Embodiments also generate videos showing future conditions of other types of subjects based on videos of current conditions of the subjects.

In some embodiments, videos should meet certain quality criteria in order for the videos to be candidates to be processed by a video processing pipeline that will generate a modified version of such videos that show estimated future conditions of one or more subjects in the videos. It is much more challenging to capture a video that meets several quality constraints or criteria than it is to capture a still image that meets several quality constraints or criteria, since for the video the conditions should be met by a temporally continuous video rather than by a single image. In the context of dentistry and orthodontics, a video of an individual's face should meet certain video and/or image quality criteria in order to be successfully processed by a video processing pipeline that will generate a modified version of the video showing a future condition of the individual's teeth or dentition. Accordingly, in embodiments a method and system provide guidance to a doctor, technician and/or patient as to changes that can be made during video capture to ensure that the captured video will be of adequate quality. Examples of changes that can be made include moving the patient's head, rotating the patient's head, slowing down movement of the patient's head, changing lighting, reducing movement of a camera, and so on. The system and method may determine one or more image quality metric values associated with a captured video, and determine whether any of the image quality metric values fail to satisfy one or more image quality criteria.

Once a video is captured that satisfies quality criteria, some frames of the video may still fail to satisfy the quality criteria even though the video as a whole satisfies the quality criteria. Embodiments are able to detect frames that fail to meet quality standards and determine what actions to take for such frames. In embodiments, such frames that fail to satisfy the quality criteria may be removed from the video. In some embodiments, the removed frames may be replaced with interpolated frames that are generated based on surrounding frames of the removed frame (e.g., one or more frames prior to the removed frame and one or more frames after the removed frame). In some embodiments, additional synthetic frames may also be generated between existing frames of a video (e.g., to upscale the video). Instead of or in addition to removing one or more frames of the video that fail to meet quality standards, processing logic may show such frames with a different visualization than frames that do meet the quality standards in some embodiments. Embodiments increase the success and effectiveness of video processing systems that generate modified versions of videos showing future conditions of one or more subjects of the videos.

In dental treatment planning and visualization, a 3D model of an upper dental arch and a 3D model of a lower dental arch of a patient may be generated and displayed. The 3D models of the dental arches may be rotated, panned, zoomed in, zoomed out, articulated (e.g., where the relationship and/or positioning between the upper dental arch 3D model and lower dental arch 3D model changes), and so on. Generally, the tools for manipulating the 3D models are cumbersome to use, as the tools are best suited for adjustments in two dimensions, but the 3D models are three dimensional objects. As a result, it can be difficult for a doctor or technician to adjust the 3D models to observe areas of interest on the 3D models. Additionally, it can be difficult for a doctor or patient to visualize how their dental arch might appear in an image of their face.

In some embodiments, the system includes a dentition viewing logic that selects images and/or frames of a video based on a determined orientation of one or more 3D models of a patient's dental arch(es). The system may determine the current orientation of the 3D model(s), determine a frame or image comprising the patient's face in which an orientation of the patient's jaw(s) match the orientation of the 3D model(s), select the frame or image, and then display the selected frame or image along with the 3D model(s) of the patient's dental arches. This enables quick and easy selection of an image or frame showing a desired jaw position, facial expression, and so on.

In some embodiments, the system includes a dentition viewing logic that receives a selection of a frame or image, determines an orientation of an upper and/or lower jaw of a patient in the selected frame or image, and then updates an orientation of 3D models of the patient's upper and/or lower dental arches to match the orientation of the upper and/or lower jaws in the selected image or frame. This enables quick and easy manipulation of the 3D models of the dental arch(es) of the patient.

Embodiments are discussed with reference to generating modified videos that show future conditions of one or more subjects (e.g., such as future patient smiles). Embodiments may also use the techniques described herein to generate modified videos that are from different camera angles from the originally received video(s). Additionally, embodiments may use a subset of the techniques described herein to generate modified images that are not part of any video. Additionally, embodiments may use the techniques described herein to perform post production of movies (e.g., by altering the dentition of one or more characters in and/or actors for the movies), to perform image and/or video editing outside of a clinical setting, and so on.

Embodiments are discussed with reference to generating modified videos that show modified versions of dental sites such as teeth. The modified videos may also be generated in such a manner to show predicted or estimated shape, pose and/or appearance of the tongue and/or other parts of the inner mouth, such as cheeks, palate, and so on.

Embodiments are discussed with reference to identifying and altering the dentition of an individual in images and/or video. Any of these embodiments may be applied to images and/or video including faces of multiple individuals. The methods described for modifying the dentition of a single individual in images and video may be applied to modify the dentition of multiple individuals. Each individual may be identified, the updated dentition for that individual may be determined, and the image or video may be modified to replace an original dentition for that individual with updated dentition. This may be performed for each of the individuals in the image or video whose dentition is to be modified.

FIG. 1 illustrates videos of a patient's dentition before and after dental treatment, in accordance with an embodiment. FIG. 1 shows modification of a video by correcting a patient's teeth in the video. However, it should be understood that the same principles described with reference to correcting the patient's teeth in the video also apply to other types of changes to the patient's dentition, such as removing teeth, staining teeth, adding caries to teeth, adding cracks to teeth, changing the shape of teeth (e.g., to fantastical proportions and/or conditions that are not naturally occurring in humans), and so on. An original video 102 of the patient's dentition 106 is shown on the left of FIG. 1. The video 102 may show the patient's teeth in various poses and expressions. The original video 102 may be processed by a video processing logic that generates a modified video 104 that includes most of the data from the original video but with changes to the patient's dentition. The video processing logic may receive frames of the original video 102 as input, and may generate modified versions of each of the frames, where the modified versions of the frames show a post-treatment version of the patient's dentition 108. The post-treatment dentition 108 in the modified video is temporally stable and consistent between frames of the modified video 104. Accordingly, a patient or doctor may record a video. The video may then be processed by the video processing logic to generate a modified video showing an estimated future condition or other altered condition of the patient's dentition, optionally showing what the patient's dentition would look like if an orthodontic and/or restorative treatment were performed on the patient's teeth, what the patient's dentition would look like if they fail to undergo treatment (e.g., showing tooth wear, gingival swelling, tooth staining, caries, missing teeth, etc.). In some embodiments, the video processing logic may operate on the video 102 in real time or near-real time as the video is being captured of the patient's face. The patient may view the modified video during the capture of the original video, serving as a virtual mirror but with a post-treatment or other altered condition of the patient's dentition shown instead of the current condition of the patient's dentition.

FIG. 2 illustrates one embodiment of a treatment planning, image/video editing and/or video generation system 200 that may assist in capture of a high quality original video (e.g., such as the original video 102 of FIG. 1) and/or that may modify an original video to generate a modified video showing an estimated future condition and/or other altered condition of a subject in the video (e.g., modified video 104 of FIG. 1). In one embodiment, the system 200 includes a computing device 205 and a data store 210. The system 200 may additionally include, or be connected to, an image capture device such as a camera and/or an intraoral scanner. The computing device 205 may include physical machines and/or virtual machines hosted by physical machines. The physical machines may be traditionally stationary devices such as rackmount servers, desktop computers, or other computing devices. The physical machines may also be mobile devices such as mobile phones, tablet computers, game consoles, laptop computers, and so on. The physical machines may include a processing device, memory, secondary storage, one or more input devices (e.g., such as a keyboard, mouse, tablet, speakers, or the like), one or more output devices (e.g., a display, a printer, etc.), and/or other hardware components. In one embodiment, the computing device 205 includes one or more virtual machines, which may be managed and provided by a cloud provider system. Each virtual machine offered by a cloud service provider may be hosted on one or more physical machine. Computing device 205 may be connected to data store 210 either directly or via a network. The network may be a local area network (LAN), a public wide area network (WAN) (e.g., the Internet), a private WAN (e.g., an intranet), or a combination thereof.

Data store 210 may be an internal data store, or an external data store that is connected to computing device 205 directly or via a network. Examples of network data stores include a storage area network (SAN), a network attached storage (NAS), and a storage service provided by a cloud provider system. Data store 210 may include one or more file systems, one or more databases, and/or other data storage arrangement.

The computing device 205 may receive a video or one or more images from an image capture device (e.g., from a camera), from multiple image capture devices, from data store 210 and/or from other computing devices. The image capture device(s) may be or include a charge-coupled device (CCD) sensor and/or a complementary metal-oxide semiconductor (CMOS) sensor, for example. The image capture device(s) may provide video and/or images to the computing device 205 for processing. For example, an image capture device may provide a video 235 and/or image(s) to the computing device 205 that the computing device analyzes to identify a patient's mouth, a patient's face, a patient's dental arch, or the like, and that the computing device processes to generate a modified version of the video and/or images with a changed patient mouth, patient face, patient dental arch, etc. In some embodiments, the videos 235 and/or image(s)

captured by the image capture device may be stored in data store 210. For example, videos 235 and/or image(s) may be stored in data store 210 as a record of patient history or for computing device 205 to use for analysis of the patient and/or for generation of simulated post-treatment videos such as a smile video. The image capture device may transmit the video and/or image(s) to the computing device 205, and computing device 205 may store the video 235 and/or image(s) in data store 210. In some embodiments, the video 235 and/or image(s) includes two-dimensional data. In some embodiments, the video 235 is a three-dimensional video (e.g., generated using stereoscopic imaging, structured light projection, or other three-dimensional image capture technique) and/or the image(s) are 3D image(s).

In some embodiments, the image capture device is a device located at a doctor's office. In some embodiments, the image capture device is a device of a patient. For example, a patient may use a webcam, mobile phone, tablet computer, notebook computer, digital camera, etc. to take a video and/or image(s) of their teeth, smile and/or face. The patient may then send those videos and/or image(s) to computing device 205, which may then be stored as video 235 and/or image(s) in data store 210. Alternatively, or additionally, a dental office may include a professional image capture device with carefully controlled lighting, background, camera settings and positioning, and so on. The camera may generate a video of the patient's face and may send the captured video 235 and/or image(s) to computing device for storage and/or processing.

In one embodiment, computing device 205 includes a video processing logic 208, a video capture logic 212, and a treatment planning module 220. In some embodiments, computing device 205 additionally or alternatively includes a dental adaptation logic 214, a dentition viewing logic 222 and/or a video/image editing logic 224. The treatment planning module 220 is responsible for generating a treatment plan 258 that includes a treatment outcome for a patient. The treatment plan may be stored in data store 210 in embodiments. The treatment plan 258 may include and/or be based on one or more 2D images and/or intraoral scans of the patient's dental arches. For example, the treatment planning module 220 may receive 3D intraoral scans of the patient's dental arches based on intraoral scanning performed using an intraoral scanner. One example of an intraoral scanner is the iTero® intraoral digital scanner manufactured by Align Technology, Inc. Another example of an intraoral scanner is set forth in U.S. Publication No. 2019/0388193, filed Jun. 19, 2019, which is incorporated by reference herein.

During an intraoral scan session, an intraoral scan application receives and processes intraoral scan data (e.g., intraoral scans) and generates a 3D surface of a scanned region of an oral cavity (e.g., of a dental site) based on such processing. To generate the 3D surface, the intraoral scan application may register and "stitch" or merge together the intraoral scans generated from the intraoral scan session in real time or near-real time as the scanning is performed. Once scanning is complete, the intraoral scan application may then again register and stitch or merge together the intraoral scans using a more accurate and resource intensive sequence of operations. In one embodiment, performing registration includes capturing 3D data of various points of a surface in multiple scans (views from a camera), and registering the scans by computing transformations between the scans. The 3D data may be projected into a 3D space for the transformations and stitching. The scans may be integrated into a common reference frame by applying appropriate transformations to points of each registered scan and projecting each scan into the 3D space.

In one embodiment, registration is performed for adjacent or overlapping intraoral scans (e.g., each successive frame of an intraoral video). Registration algorithms are carried out to register two or more adjacent intraoral scans and/or to register an intraoral scan with an already generated 3D surface, which essentially involves determination of the transformations which align one scan with the other scan and/or with the 3D surface. Registration may involve identifying multiple points in each scan (e.g., point clouds) of a scan pair (or of a scan and the 3D model), surface fitting to the points, and using local searches around points to match points of the two scan (or of the scan and the 3D surface). For example, an intraoral scan application may match points of one scan with the closest points interpolated on the surface of another image, and iteratively minimize the distance between matched points. Other registration techniques may also be used. The intraoral scan application may repeat registration and stitching for all scans of a sequence of intraoral scans and update the 3D surface as the scans are received.

Treatment planning module 220 may perform treatment planning in an automated fashion and/or based on input from a user (e.g., from a dental technician). The treatment planning module 220 may receive and/or store the pre-treatment 3D model 260 of the current dental arch of a patient, and may then determine current positions and orientations of the patient's teeth from the virtual 3D model 260 and determine target final positions and orientations for the patient's teeth represented as a treatment outcome (e.g., final stage of treatment). The treatment planning module 220 may then generate a post-treatment virtual 3D model or models 262 showing the patient's dental arches at the end of treatment and optionally one or more virtual 3D models showing the patient's dental arches at various intermediate stages of treatment. The treatment planning module 220 may generate a treatment plan 258, which may include one or more of pre-treatment 3D models 260 of upper and/or lower dental arches and/or post-treatment 3D models 262 of upper and/or lower dental arches. For a multi-stage treatment such as orthodontic treatment, the treatment plan 258 may additionally include 3D models of the upper and lower dental arches for various intermediate stages of treatment.

By way of non-limiting example, a treatment outcome may be the result of a variety of dental procedures. Such dental procedures may be broadly divided into prosthodontic (restorative) and orthodontic procedures, and then further subdivided into specific forms of these procedures. Additionally, dental procedures may include identification and treatment of gum disease, sleep apnea, and intraoral conditions. The term prosthodontic procedure refers, inter alia, to any procedure involving the oral cavity and directed to the design, manufacture or installation of a dental prosthesis at a dental site within the oral cavity, or a real or virtual model thereof, or directed to the design and preparation of the dental site to receive such a prosthesis. A prosthesis may include any restoration such as implants, crowns, veneers, inlays, onlays, and bridges, for example, and any other artificial partial or complete denture. The term orthodontic procedure refers, inter alia, to any procedure involving the oral cavity and directed to the design, manufacture or installation of orthodontic elements at a dental site within the oral cavity, or a real or virtual model thereof, or directed to the design and preparation of the dental site to receive such orthodontic elements. These elements may be appliances including but not limited to brackets and wires, retainers, clear aligners, or functional appliances. Any of treatment outcomes or updates to treatment outcomes described herein may be based on these orthodontic and/or dental procedures. Examples of orthodontic treatments are treatments that reposition the teeth, treatments such as mandibular advancement that manipulate the lower jaw, treatments such as palatal expansion that widen the upper and/or lower palate, and so on. For example, an update to a treatment outcome may be generated by interaction with a user to perform one or more procedures to one or more portions of a patient's dental arch or mouth. Planning these orthodontic procedures and/or dental procedures may be facilitated by the AR system described herein.

A treatment plan for producing a particular treatment outcome may be generated by first generating an intraoral scan of a patient's oral cavity. From the intraoral scan a pre-treatment virtual 3D model 260 of the upper and/or lower dental arches of the patient may be generated. A dental practitioner or technician may then determine a desired final position and orientation for the patient's teeth on the upper and lower dental arches, for the patient's bite, and so on. This information may be used to generate a post-treatment virtual 3D model 262 of the patient's upper and/or lower arches after orthodontic and/or prosthodontic treatment. This data may be used to create an orthodontic treatment plan, a prosthodontic treatment plan (e.g., restorative treatment plan), and/or a combination thereof. An orthodontic treatment plan may include a sequence of orthodontic treatment stages. Each orthodontic treatment stage may adjust the patient's dentition by a prescribed amount, and may be associated with a 3D model of the patient's dental arch that shows the patient's dentition at that treatment stage.

A post-treatment 3D model or models 262 of an estimated future condition of a patient's dental arch(es) may be shown to the patient. However, just viewing the post-treatment 3D model(s) of the dental arch(es) does not enable a patient to visualize what their face, mouth, smile, etc. will actually look like after treatment. Accordingly, in embodiments computing device 205 receives a video 235 of the current condition of the patient's face, preferably showing the patient's smile. This video, if of sufficient quality, may be processed by video processing logic 208 together with data from the treatment plan 258 to generate a modified video 245 that shows what the patient's face, smile, etc. will look like after treatment through multiple angles, views, expressions, etc.

In embodiments, system 200 may be used in a non-clinical setting, and may or may not show estimated corrected versions of a patient's teeth. In some embodiments, system 200 includes video and/or image editing logic 224. Video and/or image editing logic 224 may include a video or image editing application that includes functionality for modifying dentition of individuals in images and/or video that may not be associated with a dental or orthodontic treatment plan. Video and/or image editing logic 224 may include a stand-alone video or image editing application that adjusts dentition of individuals in images and/or dental arches. The video and/or image editing application may also be able to perform many other standard video and/or image editing operations, such as color alteration, lighting alteration, cropping and rotating of images/videos, resizing of videos/images, contrast adjustment, layering of multiple images/frames, addition of text and typography, application of filters and effects, splitting and joining of clips from/to videos, speed adjustment of video playback, animations, and so on. In some embodiments, video/image editing logic 224 is a plugin or module that can be added to a video or image editing application (e.g., to a consumer grade or professional grade video or image editing application) such as Adobe Premiere Pro, Final Cut Pro X, DaVinci Resolve, Avid Media Composer, Sony Vegas Pro, CyberLink Power Director, Corel Video Studio, Pinnacle Studio, Lightworks, Shotcut, iMovie, Kdenlive, Openshot, HitFilm Express, Filmora, Adobe Photoshop, GNU Image Manipulation Program, Adobe Lightroom, CorelDRAW Graphics Studio, Corel PaintShop Pro, Affinity Photo, Pixlr, Capture One, Inkscape, Paint.NET, Canva, ACDSee, Sketch, DxO PhotoLab, SumoPaint, and Photoscape.

In some applications, video/image editing logic 224 functions as a service (e.g., in a Software as a Service (Saas) model). Other image and/or video editing applications and/or other software may use an API of the video/image editing logic to request one or more alterations to dentition of one or more individuals in provided images and/or video. Video/image editing logic 224 may receive the instructions, determine the requested alterations, and alter the images and/or video accordingly. Video/image editing logic 224 may then provide the altered images and/or video to the requestor. In some embodiments, a fee is associated with the performed alteration of images/video. Accordingly, video/image editing logic 224 may provide a cost estimate for the requested alterations, and may initiate a credit card or other payment. Responsive to receiving such payment, video/image editing logic 224 may perform the requested alterations and generate the modified images and/or video.

In some embodiments, system 200 includes dental adaptation logic 214. Dental adaptation logic 214 may determine and apply adaptations to dentition that are not part of a treatment plan. In some embodiments, dental adaptation logic 214 may provide a graphical user interface (GUI) that includes a palette of options for dental modifications. The palette of options may include options, for example, to remove one or more particular teeth, to apply stains to one or more teeth, to apply caries to one or more teeth, to apply rotting to one or more teeth, to change a shape of one or more teeth, to replace teeth with a fantastical tooth option (e.g., vampire teeth, tusks, monstrous teeth, etc.), to apply chips and/or breaks to one or more teeth, to whiten one or more teeth, to change a color of one or more teeth, and so on. Responsive to a selection of one or more tooth alteration options, dental adaptation logic 214 may determine a modified state of the patient's dentition. This may include altering 3D models of an upper and/or lower dental arch of an individual based on the selected option or options. The 3D models may have been generated based on 3D scanning of the individual in a clinical environment or in a non-clinical environment (e.g., using a simplified intraoral scanner not rated for a clinical environment). The 3D models may have alternatively been generated based on a set of 2D images of the individual's dentition.

In some embodiments, dental adaptation logic 214 includes tools that enable a user to manually adjust one or more teeth in a 3D model and/or image of the patient's dental arches and/or face. For example, the user may select and then move one or a collection of teeth, select and enlarge and/or change a shape of one or more teeth, select and delete one or more teeth, select and alter color of one or more teeth, and so on. Accordingly, in some embodiments a user may manually generate a specific target dentition rather than selecting options from a palette of options and letting the dental adaptation logic 214 automatically determine adjustments based on the selected options. Once dental adaptation logic 214 has generated an altered dentition, video processing logic 208 may use the altered dentition to update images and/or videos to cause an individual's dentition in the images and/or videos to match the altered dentition.

To facilitate capture of high quality videos, video capture logic 212 may assess the quality of a captured video 235 and determine one or more quality metric scores for the captured video 235. This may include, for example, determining an amount of blur in the video, determining an amount and/or speed of head movement in the video, determining whether a patient's head is centered in the video, determining a face angle in the video, determining an amount of teeth showing in the video, determining whether a camera was stable during capture of the video, determining a focus of the video, and so on.

One or more detectors and/or heuristics may be used to score videos for one or more criteria. The heuristics/detectors may analyze frames of a video, and may include criteria or rules that should be satisfied for a video to be used. Examples of criteria include a criterion that a video shows an open bite, that a patient is not wearing aligners in the video, that a patient face has an angle to a camera that is within a target range, and so on. Each of the determined quality metric scores may be compared to a corresponding quality metric criterion. The quality metric scores may be combined into a single video quality metric value in embodiments. In some embodiments, a weighted combination of the quality metric values is determined. For example, some quality metrics may have a larger impact on ultimate video quality than other quality metrics. Such quality metric scores that have a larger impact on ultimate video quality may be assigned higher weight than other quality metric scores that have a lower weight on ultimate video quality. If the combined quality metric score and/or some threshold of the individual quality metric scores fails to satisfy one or more quality metric criteria (e.g., a combined quality metric score is below a combined quality metric score threshold), then a video may be determined to be of too low quality to be used by video processing logic 208.

If video capture logic 212 determines that a captured video 235 fails to meet one or more quality criteria or standards, video capture 212 may determine why the captured video failed to meet the quality criteria or standards. Video capture logic 212 may then determine how to improve each of the quality metric scores that failed to satisfy a quality metric criterion. Video capture logic 212 may generate an output that guides a patient, doctor, technician, etc. as to changes to make to improve the quality of the captured video. Such guidance may include instructions to rotate the patient's head, move the patient's head towards the camera (so that the head fills a larger portion of the video), move the patient's head toward a center of a field of view of the camera (so that the head is centered), rotate the patient's head (so that the patient's face is facing generally towards the camera), move the patient's head more slowly, change lighting conditions, stabilize the camera, and so on. The person capturing the video and/or the individual in the video may then implement the one or more suggested changes. This process may repeat until a generated video 235 is of sufficient quality.

Once a video of sufficient quality is captured, video capture logic 212 may process the video by removing one or more frames of the video that are of insufficient quality. Even for a video that meets certain quality standards, some frames of the video may still fail to meet those quality standards. In some embodiments, such frames that fail to meet the quality standards are removed from the video. Replacement frames may then be generated by interpolation of existing frames. In one embodiment, one or more remaining frames are input into a generative model that outputs an interpolated frame that replaces a removed frame. In one embodiment, additional synthetic interpolated frames may also be generated, such as to upscale a video.

Once a video 235 is ready for processing, it may be processed by video processing logic 208. In embodiments, video processing logic 208 performs a sequence of operations to identify an area of interest in frames of the video, determine replacement content to insert into the area of interest, and generate modified frames that integrate the original frames and the replacement content. The operations may at a high level be divided into a landmark detection operation, an area of interest identifying operation, a segmentation operation, a 3D model to 2D frame fitting operation, a feature extraction operation, and a modified frame generation operation. One possible sequence of operations performed by video processing logic 208 to generate a modified video 245 is shown in FIG. 3.

Once a modified video is generated, the modified video may be output to a display for viewing by an end user, such as a patient, doctor, technician, etc. In some embodiments, video generation is interactive. Computing device 205 may receive one or more inputs (e.g., from an end user) to select changes to a target future condition of a subject's teeth, as described with reference to dental adaptation logic 214. Examples of such changes include adjusting a target tooth whiteness, adjusting a target position and/or orientation of one or more teeth, selecting alternative restorative treatment (e.g., selecting a composite vs. a metal filling), and so on. Based on such input, a treatment plan may be updated and/or the sequence of operations may be rerun using the updated information.

Various operations, such as the landmark detection, area of interest detection (e.g., inner mouth area detection), segmentation, feature extraction, modified frame generation, etc. may be performed using, and/or with the assistance of, one or more trained machine learning models.

In some embodiments, system 200 includes a dentition viewing logic 222. Dentition viewing logic 222 may be integrated into treatment planning logic 220 in some embodiments. Dentition viewing logic 222 provides a GUI for viewing 3D models or surfaces of an upper and lower dental arch of an individual as well as images or frames of a video showing a face of the individual. In some embodiments, the image or frame of the video is output to a first region of a display or GUI and the 3D model(s) is output to a second region of the display or GUI. In some embodiments, the image or frame and the 3D model(s) are overlaid on one another in the display or GUI. For example, the 3D models, or portions thereof, may be overlaid over a mouth region of the individual in the image or frame. In a further example, the mouth region of the individual in the image or frame may be identified and removed, and the image or frame with the removed mouth region may be overlaid over the 3D model(s) such that a portion of the 3D model(s) is revealed (e.g., the portion that corresponds to the removed mouth region). In another example, the 3D model(s) may be overlaid over the image or frame at a location corresponding to the mouth region.

In some embodiments, a user may use one or more viewing tools to adjust a view of the 3D models of the dental arch(es). Such tools may include a pan tool to pan the 3D models left, right, up and/or down, a rotation tool to rotate the 3D models about one or more axes, a zoom tool to zoom in or out on the 3D models, and so on. Dentition viewing logic 222 may determine a current orientation of the 3D model of the upper dental arch and/or the 3D model of the lower dental arch. Such an orientation may be determined in relation to a viewing angle of a virtual camera and/or a display (e.g., a plane). Dentition viewing logic 222 may additionally determine orientations of the upper and/or lower jaw of the individual in multiple different images (e.g., in multiple different frames of a video). Dentition viewing logic 222 may then compare the determined orientations of the upper and/or lower jaw to the current orientation of the 3D models of the upper and/or lower dental arches. This may include determining a score for each image and/or frame based at least in part on a difference between the orientation of the jaw(s) and of the 3D model(s). An image or frame in which the orientation of the upper and/or lower jaw most closely matches the orientation of the 3D model(s) may be identified (e.g., based on an image/frame having a highest score). The identified image may then be selected and output to a display together with the 3D model(s).

In some embodiments, a user may select an image (e.g., a frame of a video) from a plurality of available images comprising a face of an individual. For example, the user may scroll through frames of a video and select one of the frames in which the upper and/or lower jaw of the individual have a desired orientation. Dentition viewing logic 222 may determine an orientation of the upper and/or lower jaw of the individual in the selected image. Dentition viewing logic 222 may then update an orientation of the 3D model of the upper and/or lower dental arch to match the orientations of the upper and/or lower jaw in the selected image or frame.

In some embodiments, dentition viewing logic 222 determines an orientation of an upper and/or lower jaw of an individual in an image using image processing and/or application of machine learning. For example, dentition viewing logic 222 may process an image to identify facial landmarks of the individual in the image. The relative positions of the facial landmarks may then be used to determine the orientation of the upper jaw and/or the orientation of the lower jaw. In one embodiment, an image or frame is input into a trained machine learning model that has been trained to output an orientation value for the upper jaw and/or an orientation value for the lower jaw of a subject of the image. The orientation values may be expressed, for example, as angles (e.g., about one, two or three axes) relative to a vector that is normal to a plane that corresponds to a plane of the image or frame.

In some embodiments, dentition viewing logic 222 may process each of a set of images (e.g., each frame of a video) to determine the orientations of the upper and/or lower jaws of an individual in the image. Dentition viewing logic may then group or cluster images/frames based on the determined orientation or orientations. In one embodiment, for a video dentition viewing logic 222 groups sequential frames having similar orientations for the upper and/or lower jaw into time segments. Frames may be determined to have a similar orientation for a jaw if the orientation of the jaw differs by less than a threshold amount between the frames.

Dentition viewing logic 222 may provide a visual indication of the time segments for the video. A user may then select a desired time segment, and dentition viewing logic 222 may then show a representative frame from the selected time segment and update the orientation(s) of the 3D models for the upper/lower dental arches of the individual.

In some instances, dentition viewing logic 222 may output indications of other frames in a video and/or other images having orientations for the upper and/or lower jaw that match or approximately match the orientations of the upper and/or lower jaw in the selected image/frame or time segment. A user select another of the images having the similar jaw orientations and/or scroll through the different frames having the similar jaw orientations.

FIG. 3 illustrates a video processing workflow 305 for the video processing logic, in accordance with an embodiment of the present disclosure. In embodiments, one or more trained machine learning models of the video processing workflow 305 are trained at a server, and the trained models are provided to a video processing logic 208 on another computing device (e.g., computing device 205 of FIG. 2), which may perform the video processing workflow 305. The model training and the video processing workflow 305 may be performed by processing logic executed by a processor of a computing device. The video processing workflow 305 may be implemented, for example, by one or more machine learning models implemented in video processing logic 208 or other software and/or firmware executing on a processing device of computing device 2200 shown in FIG. 22.

A model training workflow may be implemented to train one or more machine learning models (e.g., deep learning models) to perform one or more classifying, image generation, landmark detection, color transfer, segmenting, detection, recognition, etc. tasks for images (e.g., video frames) of smiles, teeth, dentition, faces, etc. The video processing workflow 305 may then apply the one or more trained machine learning models to perform the classifying, image generation, landmark detection, color transfer, segmenting, detection, recognition, etc. tasks for images of smiles, teeth, dentition, faces, etc. to ultimately generate modified videos of faces of individuals showing an estimated future condition of the individual's dentition (e.g., of a dental site).

Many different machine learning outputs are described herein. Particular numbers and arrangements of machine learning models are described and shown. However, it should be understood that the number and type of machine learning models that are used and the arrangement of such machine learning models can be modified to achieve the same or similar end results. Accordingly, the arrangements of machine learning models that are described and shown are merely examples and should not be construed as limiting. Additionally, embodiments discussed with reference to machine learning models may also be implemented using traditional rule based engines.

In embodiments, one or more machine learning models are trained to perform one or more of the below tasks. Each task may be performed by a separate machine learning model. Alternatively, a single machine learning model may perform each of the tasks or a subset of the tasks. Additionally, or alternatively, different machine learning (ML) models may be trained to perform different combinations of the tasks. In an example, one or a few machine learning models may be trained, where the trained ML model is a single shared neural network that has multiple shared layers and multiple higher level distinct output layers, where each of the output layers outputs a different prediction, classification, identification, etc. The tasks that the one or more trained machine learning models may be trained to perform are as follows:

I) Dental object segmentation—this can include performing point-level classification (e.g., pixel-level classification or voxel-level classification) of different types and/or instances of dental objects from frames of a video and/or from a 3D model of a dental arch. The different types of dental objects may include, for example, teeth, gingiva, an upper palate, a preparation tooth, a restorative object other than a preparation tooth, an implant, a tongue, a bracket, an attachment to a tooth, soft tissue, a retraction cord (dental wire), blood, saliva, and so on. In some embodiments, images and/or 3D models of teeth and/or a dental arch are segmented into individual teeth, and optionally into gingiva.

II) Landmark detection—this can include identifying landmarks in images. The landmarks may be particular types of features, such as centers of teeth in embodiments. In some embodiments, landmark detection is performed before or after dental object segmentation. In some embodiments, these facial landmarks can be used to estimate the orientation of the facial skull and therefore the upper jaw. In some embodiments, dental object segmentation and landmark detection are performed together by a single machine learning model. In one embodiment, one or more stacked hourglass networks are used to perform landmark detection. One example of a model that may be used to perform landmark detection is a convolutional neural network that includes multiple stacked hourglass models, as described in Alejandro Newell et al., Stacked Hourglass Networks for Human Pose Estimation, Jul. 26, 2016, which is incorporated by reference herein in its entirety.

III) Teeth boundary prediction—this can include using one or more trained machine learning models to predict teeth boundaries and/or boundaries of other dental objects (e.g., mouth parts) optionally accompanied by depth estimation based on an input of one or more frames of a video. Teeth boundary prediction may be used instead of or in addition to landmark detection and/or segmentation in embodiments.

IV) Frame interpolation—this can include generating (e.g., interpolating) simulated frames that show teeth, gums, etc. as they might look between those teeth, gums, etc. in frames at hand. Such interpolated frames may be photo-realistic images. In some embodiments, a generative model such as a generative adversarial network (GAN), encoder/decoder model, diffusion model, variational autoencoder (VAE), neural radiance field (NeRF), etc. is used to generate intermediate simulated frames. In one embodiment, a generative model is used that determines features of two input frames in a feature space, determines an optical flow between the features of the two frames in the feature space, and then uses the optical flow and one or both of the frames to generate a simulated frame. In one embodiment, a trained machine learning model that determines frame interpolation for large motion is used, such as is described in Fitsum Reda at al., FILM: Frame Interpolation for Large Motion, Proceedings of the European Conference On Computer Vision (ECC) (2022), which is incorporated by reference herein in its entirety.

V) Frame generation—this can include generating estimated frames (e.g., 2D images) of how a patient's teeth are expected to look at a future stage of treatment (e.g., at an intermediate stage of treatment and/or after treatment is completed). Such frames may be photo-realistic images. In embodiments, a generative model (e.g., such as a GAN, encoder/decoder model, etc.) operates on extracted image features of a current frame and a 2D projection of a 3D model of a future state of the patient's dental arch to generate a simulated or modified frame.

VI) Optical flow determination—this can include using a trained machine learning model to predict or estimate optical flow between frames. Such a trained machine learning model may be used to make any of the optical flow determinations described herein.

VII) Jaw orientation (pose) detection—this can include using a trained machine learning model to estimate the orientation of an upper jaw and/or a lower jaw of an individual in an image. In some embodiments, processing logic estimates a pose of a face, where the pose of the face may correlate to an orientation of the upper jaw. The pose and/or orientation of the upper and/or lower jaw may be determined, for example, based on identified landmarks. In some embodiments, jaw orientation and/or pose detection is performed together with dental object segmentation and/or landmark detection by a single machine learning model.

One type of machine learning model that may be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, a generative model is used for one or more machine learning models. The generative model may be a generative adversarial network (GAN), encoder/decoder model, diffusion model, variational autoencoder (VAE), neural radiance field (NeRF), or other type of generative model. The generative model may be used, for example, in modified frame generator 336.

A GAN is a class of artificial intelligence system that uses two artificial neural networks contesting with each other in a zero-sum game framework. The GAN includes a first artificial neural network that generates candidates and a second artificial neural network that evaluates the generated candidates. The GAN learns to map from a latent space to a particular data distribution of interest (a data distribution of changes to input images that are indistinguishable from photographs to the human eye), while the discriminative network discriminates between instances from a training dataset and candidates produced by the generator. The generative model's training objective is to increase the error rate of the discriminative network (e.g., to fool the discriminator network by producing novel synthesized instances that appear to have come from the training dataset). The generative model and the discriminator network are co-trained, and the generative model learns to generate images that are increasingly more difficult for the discriminative network to distinguish from real images (from the training dataset) while the discriminative network at the same time learns to be better able to distinguish between synthesized images and images from the training dataset. The two networks of the GAN are trained once they reach equilibrium. The GAN may include a generator network that generates artificial intraoral images and a discriminator network that attempts to differentiate between real images and artificial intraoral images. In embodiments, the discriminator network may be a MobileNet.

In embodiments, the generative model used in frame generator 346 is a generative model trained to perform frame interpolation—synthesizing intermediate images between a pair of input frames or images. The generative model may receive a pair of input frames, and generate an intermediate frame that can be placed in a video between the pair of frames, such as for frame rate upscaling. In one embodiment, the generative model has three main stages, including a shared feature extraction stage, a scale-agnostic motion estimation stage, and a fusion stage that outputs a resulting color image. The motion estimation stage in embodiments is capable of handling a time-wise non-regular input data stream. Feature extraction may include determining a set of features of each of the input images in a feature space, and the scale-agnostic motion estimation may include determining an optical flow between the features of the two images in the feature space. The optical flow and data from one or both of the images may then be used to generate the intermediate image in the fusion stage. The generative model may be capable of stable tracking of features without artifacts for large motion. The generative model may handle disocclusions in embodiments. Additionally the generative model may provide improved image sharpness as compared to traditional techniques for image interpolation. In embodiments, the generative model generates simulated images recursively. The number of recursions may not be fixed, and may instead be based on metrics computed from the images.

In one embodiment, one or more machine learning model is a conditional generative adversarial (cGAN) network, such as pix2pix or vid2vid. These networks not only learn the mapping from input image to output image, but also learn a loss function to train this mapping. GANs are generative models that learn a mapping from random noise vector z to output image y, $G:z \rightarrow y$. In contrast, conditional GANs learn a mapping from observed image x and random noise vector z, to y, $G:\{x, z\} \rightarrow y$. The generator G is trained to produce outputs that cannot be distinguished from "real" images by an adversarially trained discriminator, D, which is trained to do as well as possible at detecting the generator's "fakes". The generator may include a U-net or encoder-decoder architecture in embodiments. The discriminator may include a MobileNet architecture in embodiments. An example of a cGAN machine learning architecture that may be used is the pix2pix architecture described in Isola, Phillip, et al. "Image-to-image translation with conditional adversarial networks." arXiv preprint (2017).

Video processing logic 208 may execute video processing workflow 305 on captured video 235 of an individual's face in embodiments. In some embodiments, the video 235 may have been processed by video capture logic 212 prior to processed by video processing logic 208 to ensure that the video is of sufficient quality.

One stage of video processing workflow 305 is landmark detection. Landmark detection includes using a trained neural network (e.g., such as a deep neural network) that has been trained to identify features or sets of features (e.g., landmarks) on each frame of a video 235. Landmark detector 310 may operate on frames individually or together. In some embodiments, a current frame, a previous frame, and/or landmarks determined from a previous frame are input into the trained machine learning model, which outputs landmarks for the current frame. In one embodiment, identified landmarks are one or more teeth, centers of one or more teeth, eyes, nose, and so on. The detected landmarks may include facial landmarks and/or dental landmarks in embodiments. The landmark detector 310 may output information on the locations (e.g., coordinates) of each of multiple different features or landmarks in an input frame. Groups of landmarks may indicate a pose (e.g., position, orientation, etc.) of a head, a chin or lower jaw, an upper jaw, one or more dental arch, and so on in embodiments. In embodiments, the facial landmarks are used to determine a six-dimensional (6D) pose of the face based on the facial landmarks and a 3D face model (e.g., by performing fitting between the facial landmarks and a general 3D face model. Processing logic may then determine a relative position of the upper dental arch of the individual to a frame at least in part on the 6D pose.

Figure 4:
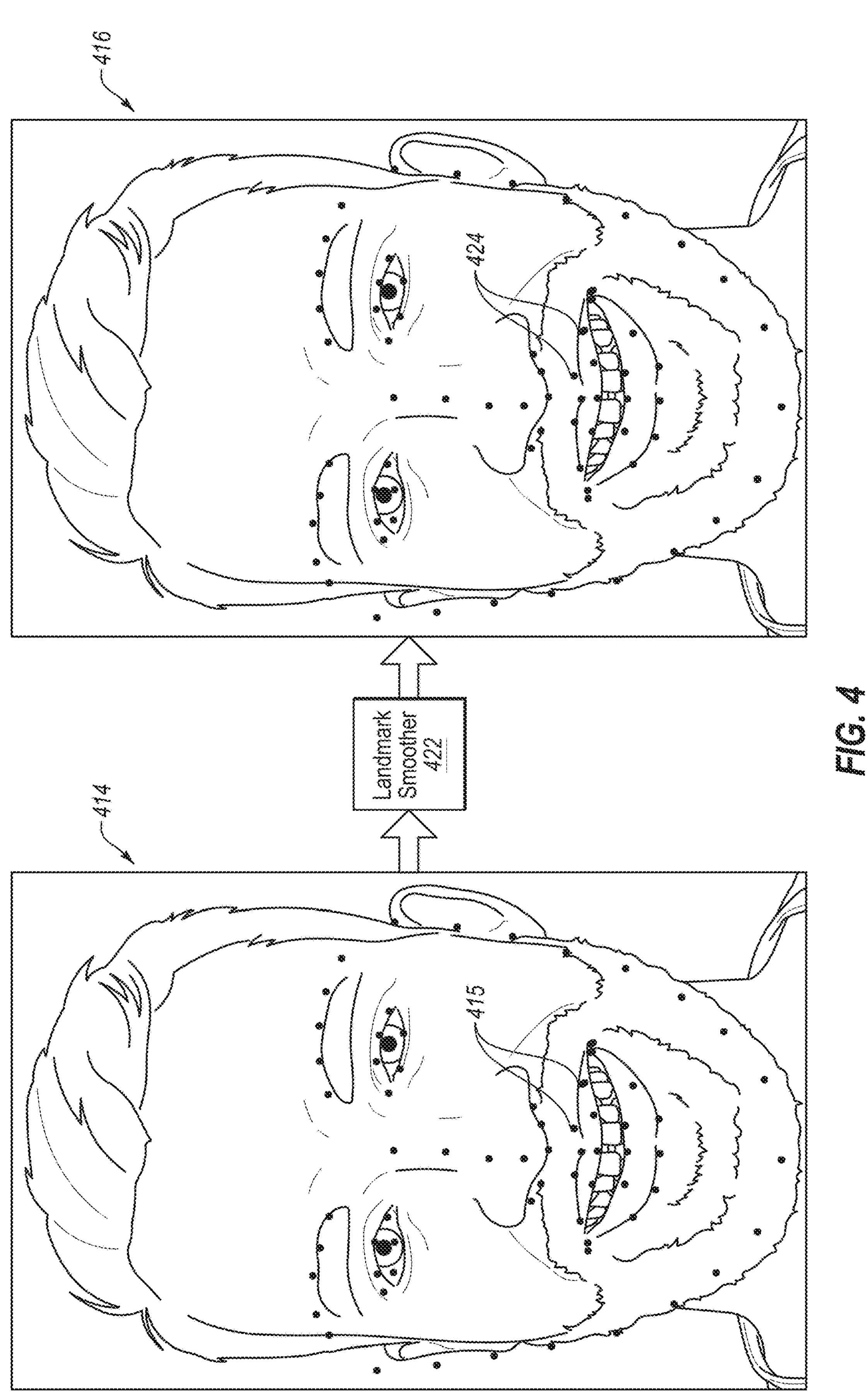
FIG. 4 illustrates images of a face after performing landmarking, in accordance with an embodiment of the present disclosure.

FIG. 4 illustrates images or video frames of a face after performing landmarking, in accordance with an embodiment of the present disclosure. A video frame 414 shows multiple facial landmarks 415 around eyebrows, a face perimeter, a nose, eyes, lips and teeth of an individual's face. In some embodiments, landmarks may be detected at slightly different locations between frames of a video, even in instances where a face pose has not changed or has only minimally changed. Such differences in facial landmarks between frames can result in jittery or jumpy landmarks between frames, which ultimately can lead to modified frames produced by a generator model (e.g., modified frame generator 336) that are not temporally consistent between frames. Accordingly, in one embodiment landmark detector 310 receives a current frame as well as landmarks detected from a previous frame, and uses both inputs to determine landmarks of the current frame. Additionally, or alternatively, landmark detector 310 may perform smoothing of landmarks after landmark detection using a landmark smoother 422. In one embodiment, landmark smoother 422 uses a Gaussian kernel to smooth facial landmarks 415 (and/or other landmarks) to make them temporally stable. Video frame 416 shows smoothed facial landmarks 424.

Referring back to FIG. 3, a result of landmark detector 310 is a set of landmarks 312, which may be a set of smoothed landmarks 312 that are temporally consistent with landmarks of previous video frames. Once landmark detection is performed, the video frame 235 and/or landmarks 312 (e.g., which may include smoothed landmarks) may be input into mouth area detector 314. Mouth area detector 314 may include a trained machine learning model (e.g., such as a deep neural network) that processes a frame of a video 235 (e.g., an image) and/or facial landmarks 312 to determine a mouth area within the frame. Alternatively, mouth area detector 314 may not include an ML model, and may determine a mouth area using the facial landmarks and one or more simple heuristics (e.g., that define a bounding box around facial landmarks for lips).

In some embodiments, mouth area detector 314 detects a bounding region (e.g., a bounding box) around a mouth area. The bounding region may include one or more offset around a detected mouth area. Accordingly, in one or more embodiments the bounding region may include lips, a portion of check, a portion of a chin, a portion of a nose, and so on. Alternatively, the bounding region may not be rectangular in shape, and/or may trace the lips in the frame so as to include only the mouth area. In some embodiments, landmark detection and mouth area detection are performed by the same machine learning model.

In one embodiment, mouth area detector 314 detects an area of interest that is smaller than a mouth region. For example, mouth area detector 314 detects an area of a dental site within a mouth area. The area of the dental site may be, for example, a limited area or one or more teeth that will undergo restorative treatment. Examples of such restorative treatments include crowns, veneers, bridges, composite bonding, extractions, fillings, and so on. For example, a restorative treatment may include replacing an old crown with a new crown. For such an example, the system may identify an area of interest associated with the region of the old crown. Ultimately, the system may replace only affected areas in a video and keep the current visualization of unaffected regions (e.g., including unaffected regions that are within the mouth area).

Figure 5A:
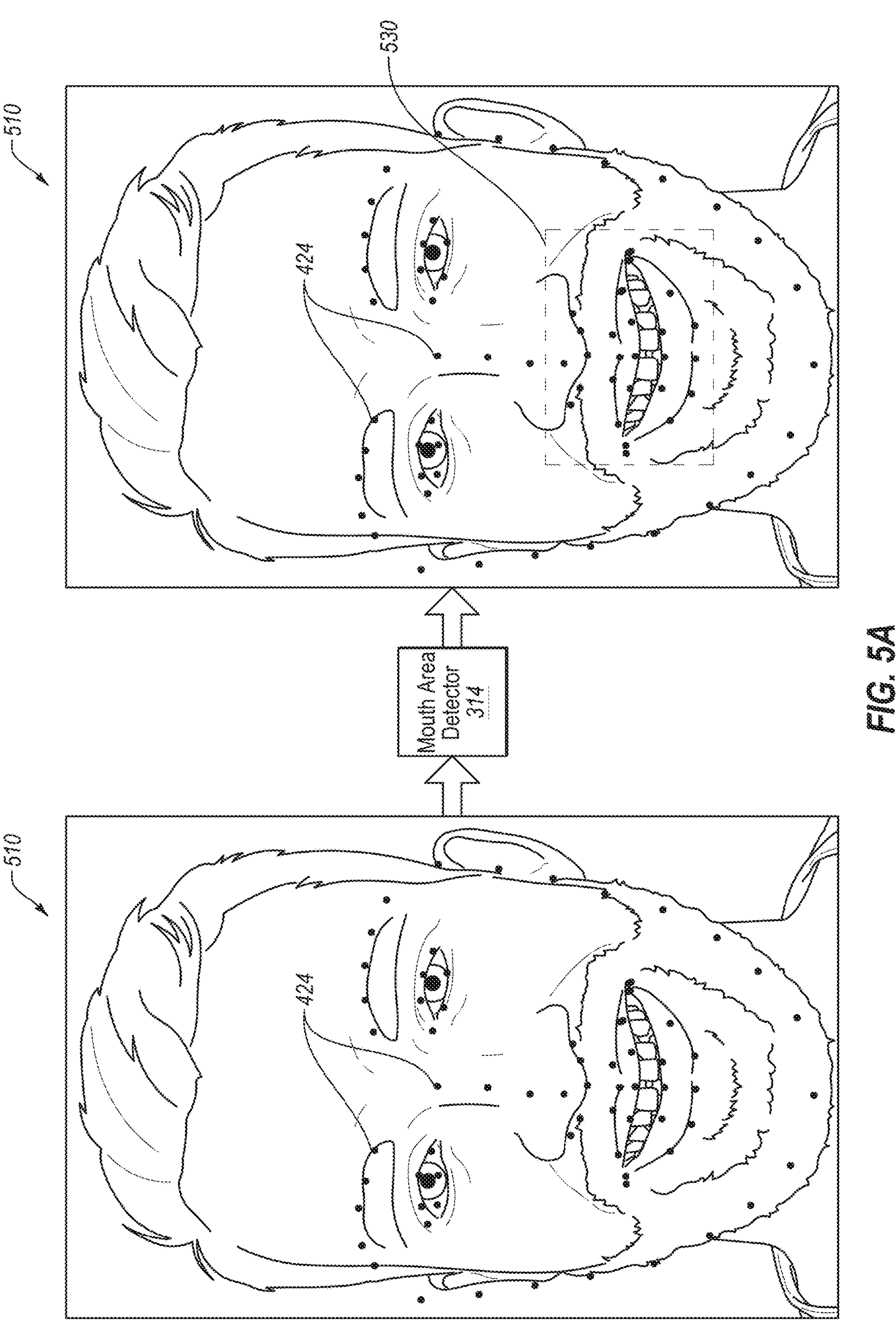
FIG. 5A illustrates images of a face after performing mouth detection, in accordance with an embodiment of the present disclosure.

FIG. 5A illustrates images of a face after performing mouth detection, in accordance with an embodiment of the present disclosure. A video frame 510 showing a face with detected landmarks 424 (e.g., which may be smoothed landmarks) is shown. The mouth area detector 314 may process the frame 510 and landmarks 424 and output a boundary region 530 that surrounds an inner mouth area, with or without an offset around the inner mouth area.

Figure 5B:
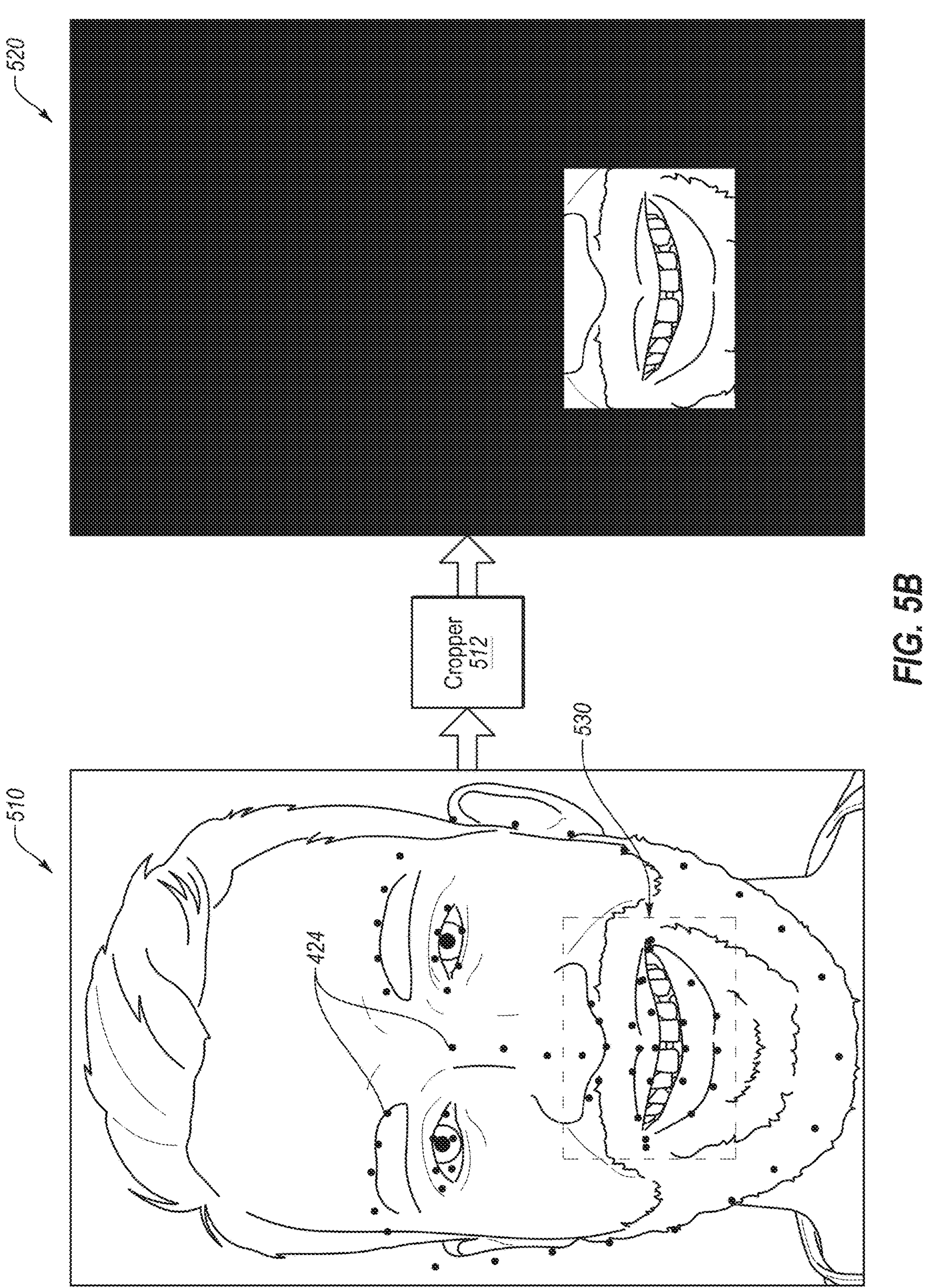
FIG. 5B illustrates a cropped video frame of a face that has been cropped around a boundary region that surrounds an inner mouth area, in accordance with an embodiment of the present disclosure.

FIG. 5B illustrates a cropped video frame 520 of a face that has been cropped around a boundary region that surrounds a mouth area by cropper 512, in accordance with an embodiment of the present disclosure. In the illustrated example, the cropped region is rectangular and includes an offset around a detected mouth area. In other embodiments, the mouth area may not include such an offset, and may instead trace the contours of the mouth area.

Figure 5C:
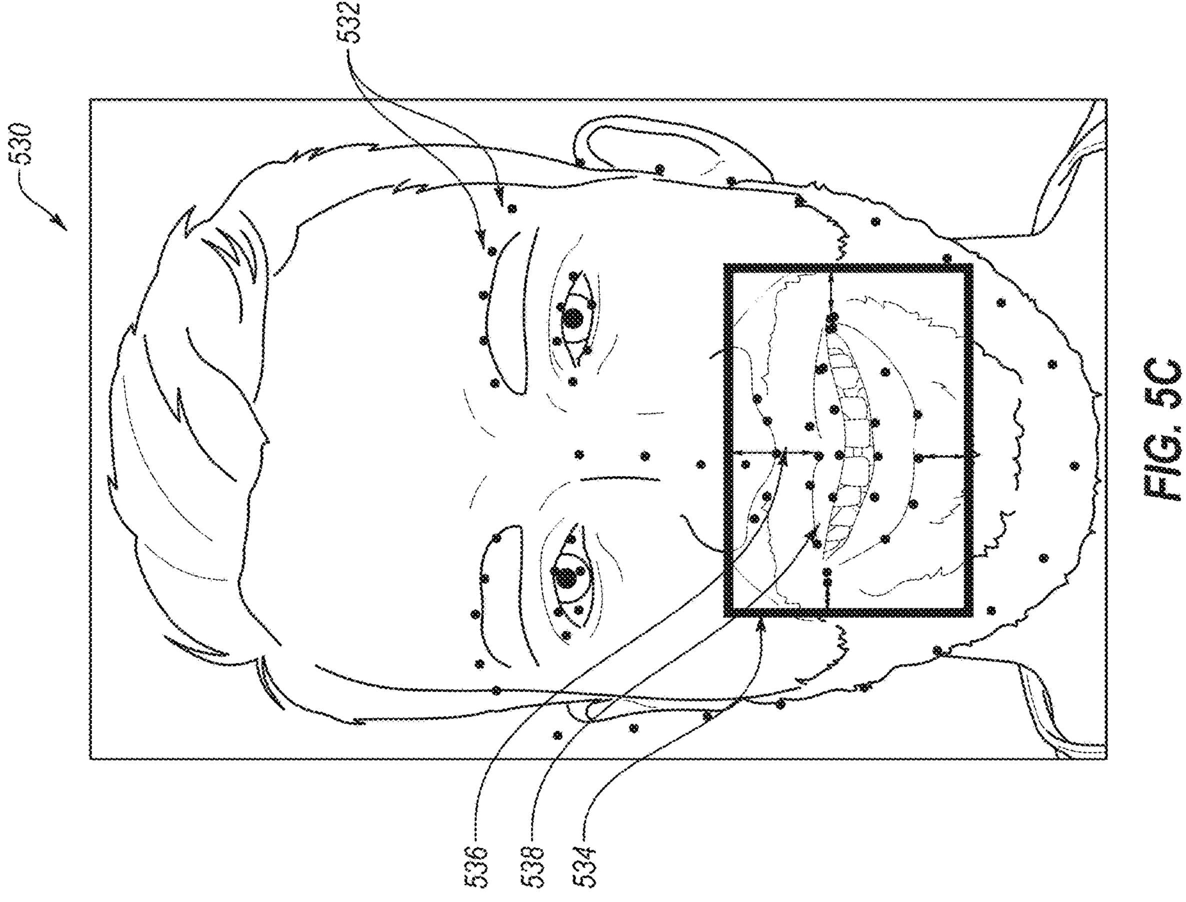
FIG. 5C illustrates an image of a face after landmarking and mouth detection, in accordance with an embodiment of the present disclosure.

FIG. 5C illustrates an image 530 of a face after landmarking and mouth detection, in accordance with an embodiment of the present disclosure. As shown, multiple facial landmarks 532, a mouth area 538, and a bounding region 534 about the mouth area 534 may be detected. In the illustrated example, the bounding region 534 includes offsets 536 about the mouth area 538.

Referring back to FIG. 3, mouth area detector 314 may crop the frame at the determined bounding region, which may or may not include offsets about a detected mouth area. In one embodiment, the bounding region corresponds to a contour of the mouth area. Mouth area detector 314 may output the cropped frame 316, which may then be processed by segmenter 318.

Segmenter 318 may include a trained machine learning model (e.g., such as a deep neural network) that processes a mouth area of a frame (e.g., a cropped frame) to segment the mouth area. The trained neural network may segment a mouth area into different dental objects, such as into individual teeth, upper and/or lower gingiva, inner mouth area and/or outer mouth area. The neural network may identify multiple teeth in an image and may assign different object identifiers to each of the identified teeth. In some embodiments, the neural network estimates tooth numbers for each of the identified teeth (e.g., according to a universal tooth numbering system, according to Palmer notation, according to the FDI World Dental Federation notation, etc.). The segmenter 318 may perform semantic segmentation of a mouth area to identify every tooth on the upper and lower jaw (and may specify teeth as upper teeth and lower teeth), to identify upper and lower gingiva, and/or to identify inner and outer mouth areas.

The trained neural network may receive landmarks and/or the mouth area and/or bounding region in some embodiments. In some embodiments, the trained neural network receives the frame, the cropped region of the frame (or information identifying the inner mouth area), and the landmarks. In some embodiments, landmark detection, mouth area detection, and segmentation are performed by a same machine learning model.

Framewise segmentation may result in temporally inconsistent segmentation. Accordingly, in embodiments segmenter 318 uses information from one or more previous frames as well as a current frame to perform temporally consistent segmentation. In some embodiments, segmenter 318 computes an optical flow between the mouth area (e.g., inner mouth area and/or outer mouth area) of a current frame and one or more previous frames. The optical flow may be computed in an image space and/or in a feature space in embodiments. Use of previous frames and/or optical flow provides context that results in more consistent segmentation for occluded teeth (e.g., where one or more teeth might be occluded in a current frame but may not have been occluded in one or more previous frames). Use of previous frames and/or optical flow also helps to give consistent tooth numbering and boundaries, reduces flickering, improves stability of a future fitting operation, and increases stability of future generated modified frames. Using a model which takes previous frame segmentation prediction, a current image frame and the optical flow can help the model to output temporally stable segmentation masks for a video. Such an approach can ensure that teeth numbering does not flicker and that ambiguous pixels in the corner of the mouth and that occur when the mouth is partially open are segmented with consistency.

Providing past frames as well as a current frame to the segmentation model can help the model to understand how teeth have moved, and resolve ambiguities such as when certain teeth are partly occluded. In one embodiment, an attention mechanism is used for the segmentation model (e.g., ML model trained to perform segmentation). Using such an attention mechanism, the segmentation model may compute segmentation of a current frame, and attention may be applied on the features of past frames to boost performance.

Segmenting may be performed using Panoptic Segmentation (PS) instead of instance or semantic segmentation in some embodiments. PS is a hybrid segmentation approach that may ensure that every pixel is assigned only one class (e.g., no overlapping teeth instances as in instance segmentation). PS ensures that no holes or color bleeding is performed in teeth as the classification will be done at teeth level (not pixel level like in semantic segmentation), and will allow enough context of neighboring teeth for the model to predict the teeth numbering correctly. Unlike instance segmentation, PS also enables segmentation of gums and the inner mouth area. Further, PS performed in the video domain can improve temporal consistency.

The segmentation model may return for each pixel a score distribution of multiple classes that can be normalized and interpreted as a probability distribution. In one embodiment, an operation that finds the argument that gives the maximum value from a target function (e.g., argmax) is performed on the class distribution to assign a single class to each pixel. If two classes have a similar score at a certain pixel, small image changes can lead to changes in pixel assignment. These changes would be visible in videos as flicker. Taking these class distributions into account can help reduce pixel changes when class assignment is not above a certainty threshold.

Figure 6:
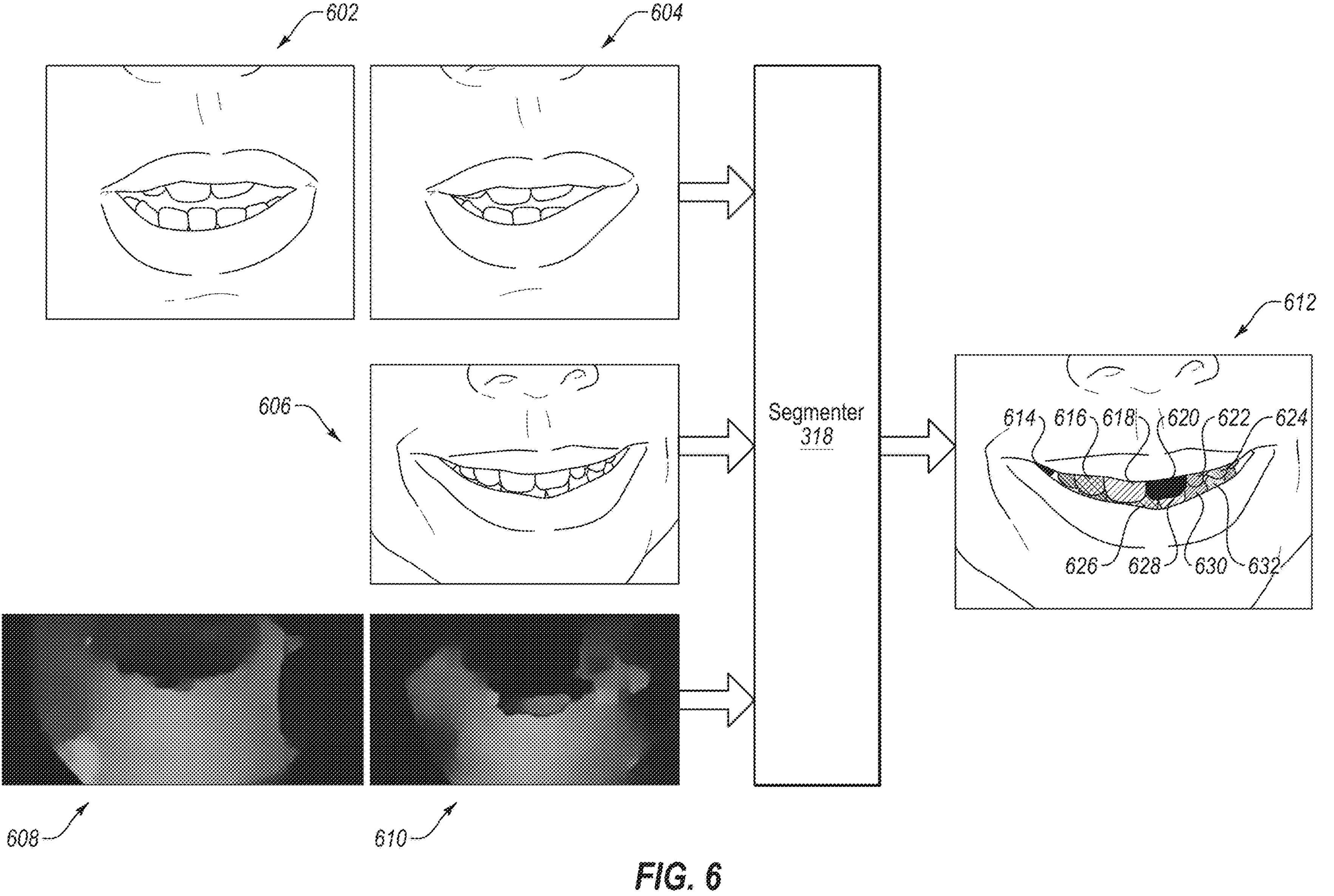
FIG. 6 illustrates segmentation of a mouth area of an image of a face, in accordance with an embodiment of the present disclosure.

FIG. 6 illustrates segmentation of a mouth area of an image of a face, in accordance with an embodiment of the present disclosure. As shown, a cropped mouth area of a current frame 606 is input into segmenter 318. Also input into segmenter 318 are one or more cropped mouth areas of previous frames 602, 604. Also input into segmenter 318 are one or more optical flows, including a first optical flow 608 between the cropped mouth area of previous frame 602 and the cropped mouth area of current frame 606 and/or a second optical flow 610 between the cropped mouth area of previous frame 604 and the cropped mouth area of current frame 606. Segmenter 318 uses the input data to segment the cropped mouth area of the current frame 606, and outputs segmentation information 612. The segmentation information 612 may include a mask that includes, for each pixel in the cropped mouth area of the current frame 606, an identity of an object associated with that pixel. Some pixels may include multiple object classifications. For example, pixels of the cropped mouth area of the current frame 606 may be classified as inner mouth area and outer mouth area, and may further be classified as a particular tooth or an upper or lower gingiva. As shown in segmentation information 612, separate teeth 614-632 have been identified. Each identified tooth may be assigned a unique tooth identifier in embodiments.

Referring back to FIG. 3, segmenter 318 may output segmentation information including segmented mouth areas 320. The segmented mouth areas 320 may include a mask that provides one or more classifications for each pixel. For example, each pixel may be identified as an inner mouth area or an outer mouth area. Each inner mouth area pixel may further be identified as a particular tooth on the upper dental arch, a particular tooth on the lower dental arch, an upper gingiva or a lower gingiva. The segmented mouth area 320 may be input into frame to model registration logic 326.

In some embodiments, teeth boundary prediction (and/or boundary prediction for other dental objects) is performed instead of or in addition to segmentation. Teeth boundary prediction may be performed by using one or more trained machine learning models to predict teeth boundaries and/or boundaries of other dental objects (e.g., mouth parts) optionally accompanied by depth estimation based on an input of one or more frames of a video.

In addition to frames being segmented, pre-treatment 3D models (also referred to as pre-alteration 3D models) 260 of upper and lower dental arches and/or post-treatment 3D models of the upper and lower dental arches (or other 3D models of altered upper and/or lower dental arches) may be processed by model segmenter 322. Post treatment 3D models may have been generated by treatment planning logic 220 or other altered 3D models may have been generated by dental adaptation logic 214, for example. Model segmenter 322 may segment the 3D models to identify and label each individual tooth in the 3D models and gingiva in the 3D models. In some embodiments, the pre-treatment 3D model 260 is generated based on an intraoral scan of a patient's oral cavity. The pre-treatment 3D model 260 may then be processed by treatment planning logic 220 to determine post-treatment conditions of the patient's dental arches and to generate the post-treatment 3D models 262 of the dental arches. Alternatively, the pre-treatment 3D model 260 may be processed by dental adaptation logic 214 to determine post-alteration conditions of the dental arches and to generate the post-alteration 3D models. The treatment planning logic may receive input from a dentist or doctor in the generation of the post-treatment 3D models 262, and the post-treatment 3D models 262 may be clinically accurate. The pre-treatment 3D models 260 and post-treatment or post-alteration 3D models 262 may be temporally stable.

In some embodiments, 3D models of upper and lower dental arches may be generated without performing intraoral scanning of the patient's oral cavity. A model generator may generate approximate 3D models of the patient's upper and lower dental arch based on 2D images of the patient's face. A treatment estimator may then generate an estimated post-treatment or other altered condition of the upper and lower dental arches and generate post-treatment or post-alteration 3D models of the dental arches. The post-treatment or post-alteration dental arches may not be clinically accurate in embodiments, but may still provide a good estimation of what an individual's teeth can be expected to look like after treatment or after some other alteration.

In embodiments, model segmenter 322 segments the 3D models and outputs segmented pre-treatment 3D models 324 and/or segmented post-treatment 3D models 334 or post-alteration 3D models. Segmented pre-treatment 3D models 324 may then be input into frame to model registration logic 326.

Frame to model registration logic 326 performs registration and fitting between the segmented mouth area 320 and the segmented pre-treatment 3D models 324. In embodiments, a rigid fitting algorithm is used to find a six-dimensional (6D) orientation (e.g., including translation along three axes and rotation about three axes) in space for both the upper and lower teeth. In some embodiments, the fitting is performed between the face in the frame and a common face mesh (which may be scaled to a current face). This enables processing logic to determine where the face is positioned in 3D space, which can be used as a constraint for fitting of the 3D models of the dental arches to the frame. After completing face fitting, teeth fitting (e.g., fitting of the dental arches to the frame) may be performed between the upper and lower dental arches and the frame. The fitting of the face mesh to the frame may be used to impose one or more constraints on the teeth fitting in some embodiments.

Figure 7A:
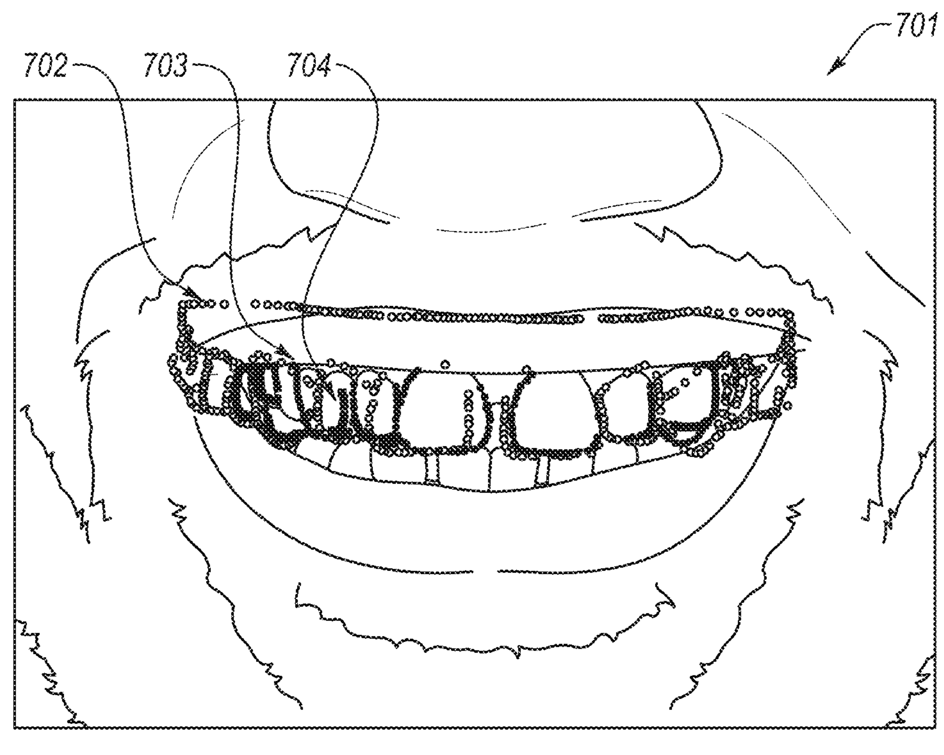
FIG. 7A illustrates fitting of a 3D model of a dental arch to an image of a face, in accordance with an embodiment of the present disclosure.

FIG. 7A illustrates fitting of a 3D model of a dental arch to an image of a face, in accordance with an embodiment of the present disclosure. A position and orientation for the 3D model is determined relative to cropped frame 701. The 3D model at the determined position and orientation is then projected onto a 2D surface (e.g., a 2D plane) corresponding to the plane of the frame. Cropped frame 316 is fit to the 3D model, where dots 702 are vertices of the 3D model projected onto the 2D image space. Lines 703 are contours around the teeth in 2D from the segmentation of the cropped frame 316. During fitting, processing logic minimizes the distance between the lines 703 and the dots 702 such that the dots 702 and lines 703 match. With each change in orientation of the 3D model the 3D model at the new orientation may be projected onto the 2D plane. In some embodiments, fitting is performed according to a correspondence algorithm or function. Correspondence is a match between a 2D contour point and a 3D contour vertex. With this matching, processing logic can compute the distance between a 2D contour point and 3D contour vertex in image space after projecting the 3D vertices onto the frame. The computed distance can be added to a correspondence cost term for each correspondence over all of the teeth. In some embodiments, correspondences are the main cost term to be optimized and so are the most dominant cost term.

Fitting of the 3D models of the upper and lower dental arches to the segmented teeth in the cropped frame includes minimizing the costs of one or more cost functions. One such cost function is associated with the distance between points on individual teeth from the segmented 3D model and points on the same teeth from the segmented mouth area of the frame (e.g., based on the correspondences between projected 3D silhouette vertices from the 3D models of the upper and lower dental arches and 2D segmentation contours from the frame). Other cost functions may also be computed and minimized. In some embodiments not all cost functions will be minimized. For example, reaching a minima for one cost function may cause the cost for another cost function to increase. Accordingly, in embodiments fitting includes reaching a global minimum for a combination of the multiple cost functions. In some embodiments, various cost functions are weighted, such that some cost functions may contribute more or less to the overall cost than other cost functions. In some embodiments, the correspondence cost between the 3D silhouette vertices and the 2D segmentation contours from the frame are given a lower weight than other cost functions because some teeth may become occluded or are not visible in some frames of the video.

In some embodiments, one or more constraints are applied to the fitting to reduce an overall number of possible solutions for the fitting. Some constraints may be applied, for example, by an articulation model of the jaw. Other constraints may be applied based on determined relationships between an upper dental arch and facial features such as nose, eyes, and so on. For example, the relative positions of the eyes, nose, etc. and the dental arch may be fixed for a given person. Accordingly, once the relative positions of the eyes, nose, etc. and the upper dental arch is determined for an individual, those relative positions may be used as a constraint on the position and orientation of the upper dental arch. Additionally, there is generally a fixed or predictable relationship between a position and orientation of a chin and a lower dental arch for a given person. Thus, the relative positions between the lower dental arch and the chin may be used as a further constraint on the position and orientation of the lower dental arch. A patient's face is generally visible throughout a video and therefore provides information on where the jawline should be positioned in cases where the mouth is closed or not clearly visible in a frame. Accordingly, in some embodiments fitting may be achieved even in instances where few or no teeth are visible in a frame based on prior fitting in previous frames and determined relationships between facial features and the upper and/or lower dental arches.

Teeth fitting optimization may use a variety of different cost terms and/or functions. Each of the cost terms may be tuned with respective weights so that there is full control of which terms are dominant. Some of the possible cost terms that may be taken into account include a correspondence cost term, a similarity cost term, a maximum allowable change cost term, a bite collision cost term, a chin reference cost term, an articulation cost term, and so on. In some embodiments, different optimizations are performed for the upper and lower 6D jaw poses. Some cost terms are applicable for computing both the upper and lower dental arch fitting, and some cost terms are only applicable to the upper dental arch fitting or only the lower dental arch fitting.

Some cost terms that may apply to upper and lower dental arch fitting includes correspondence cost terms, similarity cost terms, and maximal allowable change.

In embodiments, the correspondences for each tooth are weighted depending on a current face direction or orientation. More importance may be given to teeth that are more frontal to the camera for a particular frame. Accordingly, teeth that are front most in a current frame may be determined, and correspondences for those teeth may be weighted more heavily than correspondences for other teeth for that frame. In a new frame a face pose may change, resulting in different teeth being foremost. The new foremost teeth may be weighted more heavily in the new frame.

Another cost term that may be applied is a similarity cost term. Similarity cost terms ensure that specified current optimization parameters are similar to given optimization parameters. One type of similarity cost term is a temporal similarity cost term. Temporal similarity represents the similarity between the current frame and previous frame. Temporal similarity may be computed in terms of translations and rotations (e.g., Euler angles and/or Quaternions) in embodiments. Translations may include 3D position information in X, Y and Z directions. Processing logic may have control over 3 different directions separately. Euler angles provide 3D rotation information around X, Y and Z directions. Euler angles may be used to represent rotations in a continuous manner. The respective angles can be named as pitch, yaw, and roll. Processing logic may have control over 3 different directions separately. 3D rotation information may also be represented in Quaternions. Quaternions may be used in many important engineering computations such as robotics and aeronautics.

Another similarity cost term that may be used is reference similarity. Temporal similarity represents the similarity between a current object to be optimized and a given reference object. Such optimization may be different for the upper and lower jaw. The upper jaw may take face pose (e.g., 6D face pose) as reference, while lower jaw may take upper jaw pose and/or chin pose as a reference. The application of these similarities may be the same as or similar to what is performed for temporal similarity, and may include translation, Euler angle, and/or Quaternion cost terms.

As mentioned, one or more hard constraints may be imposed on the allowed motion of the upper and lower jaw. Accordingly, there may be maximum allowable changes that will not be exceeded. With the given reference values of each 6D pose parameter, processing logic can enforce an optimization solution to be in bounds with the constraints. In one embodiment, the cost is only activated when the solution is not in bounds, and then it is recomputed by considering the hard constraint or constraints that were violated. 6D pose can be decomposed as translation and rotation as it is in other cost terms, such as with translations, Euler angles and/or Quaternions.

In addition to the above mentioned common cost terms used for fitting both the upper and lower dental arch to the frame, one or more lower jaw specific cost terms may also be used, as fitting of the lower dental arch is a much more difficult problem than fitting of the upper dental arch. In embodiments, processing logic first solves for fitting of the upper jaw (i.e., upper dental arch). Subsequently, processing logic solves for fitting of the lower jaw. By first solving for the fitting of the upper jaw, processing logic may determine the pose of the upper jaw and use it for optimization of lower jaw fitting.

In one embodiment, a bite collision cost term is used for lower jaw fitting. When processing logic solves for lower jaw pose, it may strictly ensure that the lower jaw does not collide with the upper jaw (e.g., that there is not overlap in space between the lower jaw and the upper jaw since this is physically impossible). Since processing logic has solved for the pose of upper jaw already, this additional cost term may be applied on the solution for the lower jaw position to avoid bite collision.

The lower jaw may have a fixed or predictable relationship to the chin for a given individual. Accordingly, in embodiments a chin reference cost term may be applied for fitting of the lower jaw. Lower jaw optimization may take into consideration the face pose, which may be determined by performing fitting between the frame and a 3D face mesh. After solving for face pose and jaw openness, processing logic may take a reference from chin position to locate the lower jaw. This cost term may be is useful for open jaw cases.

There are a limited number of possible positions that a lower jaw may have relative to an upper jaw. Accordingly, a jaw articulation model may be determined and applied to constrain the possible fitting solutions for the lower jaw. Processing logic may constrain the allowable motion of the lower jaw in the Y direction, both for position and rotation (jaw opening, pitch angle, etc.) in embodiments. In some embodiments, a simple articulation model is used to describe the relationship between position and orientation in a vertical direction so that processing logic may solve for one parameter (articulation angle) instead of multiple (e.g., two) parameters. Since processing logic already constrains the motion of the lower jaw in other directions mostly with upper jaw, this cost term helps to stabilize the jaw opening in embodiments.

In some embodiments, information from multiple frames is used in determining a fitting solution to provide for temporal stability. A 3D to 2D fitting procedure may include correctly placing an input 3D mesh on a frame of the video using a determined 6D pose. Fitting may be performed for each frame in the video. In one embodiment, even though the main building blocks for fitting act independently, multiple constraints may be applied on the consecutive solutions to the 6D poses. This way, processing logic not only solves for the current frame pose parameters, but also considers the previous frame(s). In the end, the placement of the 3D mesh looks correct and the transitions between frames look very smooth, i.e. natural.

In some embodiments, before performing teeth fitting, a 3D to 2D fitting procedure is performed for the face in a frame. Processing logic may assume that the relative pose of the upper jaw to the face is the same throughout the video. In other words, teeth of the upper jaw do not move inside the face. Using this information enables processing logic to utilize a very significant source of information, which is the 6D pose of the face. Processing logic may use face landmarks as 2D information, and such face landmarks are already temporally stabilized as discussed with reference to landmark detector 310.

In some embodiments, processing logic uses a common 3D face mesh with size customizations. Face fitting provides very consistent information throughout a video because the face is generally visible in all frames even though the teeth may not be visible in all frames. For those cases where the teeth are not visible, face fitting helps to position the teeth somewhere close to its original position even though there is no direct 2D teeth information. This way, consecutive fitting optimization does not break and is ready for teeth visibility in the video. Additionally, processing logic may optimize for mouth openness of the face in a temporally consistent way. Processing logic may track the chin, which provides hints for optimizing the fitting of the lower jaw, and especially in the vertical direction.

The fitting process is a big optimization problem where processing logic tries to find the best 6D pose parameters for the upper and lower jaw in a current frame. In addition to the main building blocks, processing logic may consider different constraints in the optimization such that it ensures temporal consistency.

In some embodiments, frame to model registration logic 326 starts each frame's optimization with the last frame's solution (i.e., the fitting solution for the previous frame). In the cases where there are small movements (e.g., of head, lips, etc.), this already gives a good baseline for smooth transitions. Processing logic may also constrain the new pose parameters to be similar to the previous frame values. For example, the fitting solutions for a current frame may not have more than a threshold difference from the fitting solutions for a previous frame. In some embodiments, for a first frame, processing logic applies an initialization step based on an optimization that minimizes the distance between the centers of 2D tooth segmentations and the centers 2D projections of the 3D tooth models.

Figure 7B:
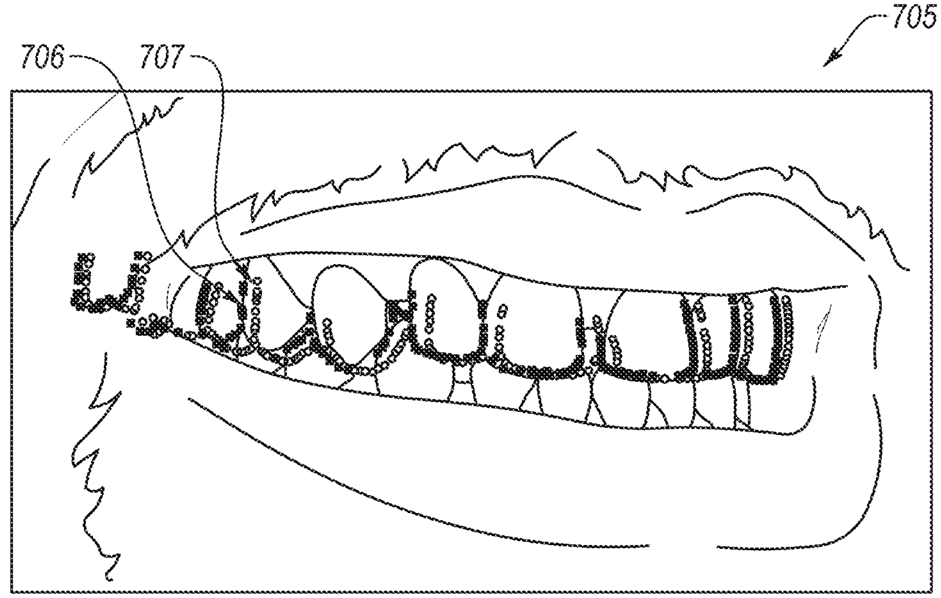
FIG. 7B illustrates a comparison of the fitting solution for a current frame and a prior fitting solution for a previous frame, in accordance with an embodiment of the present disclosure.

FIG. 7B illustrates a comparison of the fitting solution 706 for a current frame and a prior fitting solution 707 for a previous frame, in accordance with an embodiment of the present disclosure. A constraint may be applied that prohibits the fitting solution for the current frame from differing from the fitting solution for the prior frame by more than a threshold amount.

In some embodiments, new pose parameters (e.g., a new fitting solution for a current frame) are constrained to have a similar relative position and orientation to a specified reference as prior pose parameters. For the upper jaw optimization, one or more facial landmarks (e.g., for eyes, nose, cheeks, etc.) and their relationship to the upper jaw as determined for prior frames are used to constrain the fitting solution for the upper jaw in a current frame. Processing logic may assume that the pose of the upper jaw relative to the facial landmarks is the same throughout the video in embodiments.

Figure 7C:
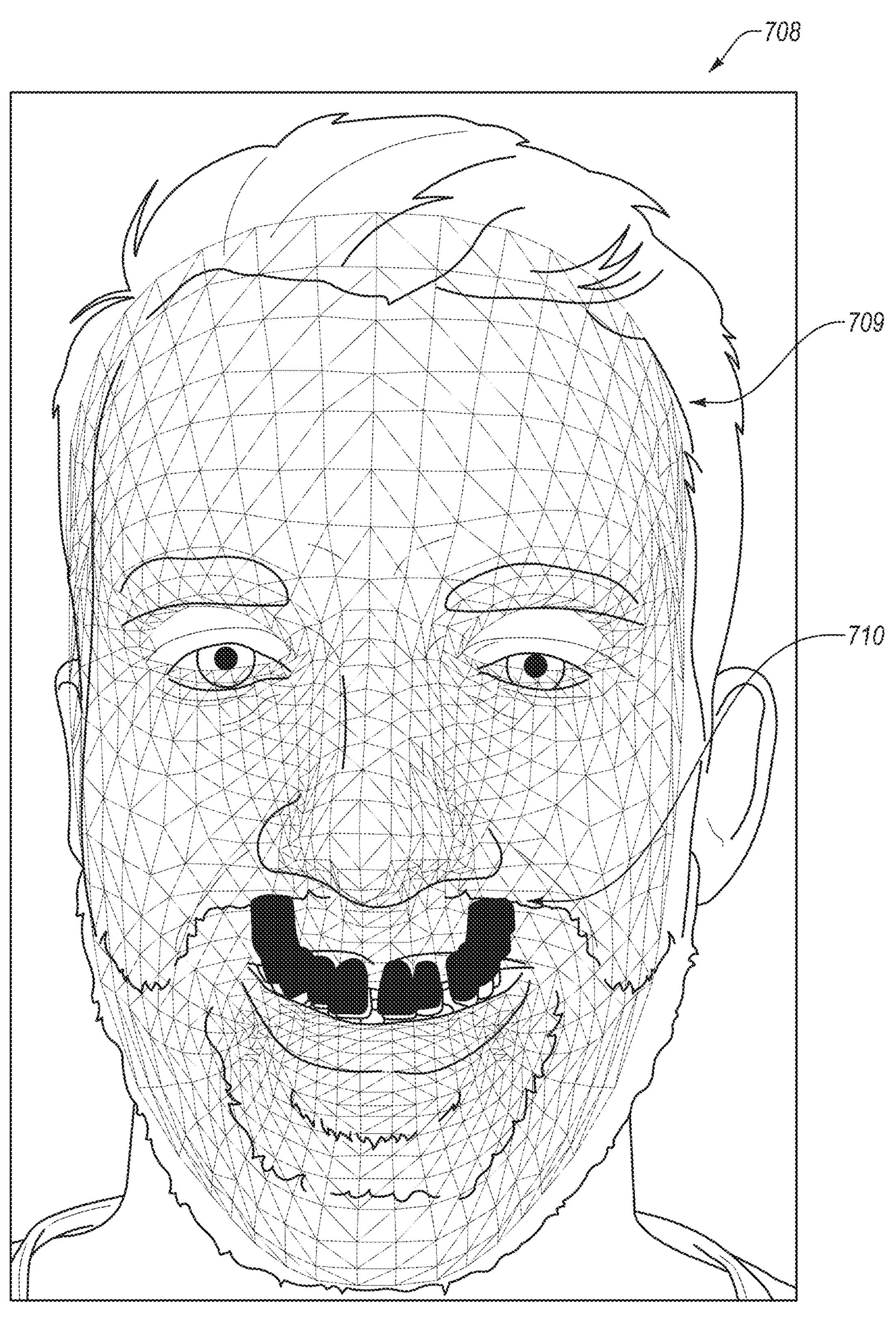
FIG. 7C illustrates fitting of a 3D model of a dental arch to an image of a face, in accordance with an embodiment of the present disclosure.

FIG. 7C illustrates fitting of a 3D model of an upper dental arch 710 to an image of a face 708 based on one or more landmarks of the face and/or a determined 3D mesh of the face 709, in accordance with an embodiment of the present disclosure.

With regards to fitting of the 3D model of the lower dental arch, the facial landmarks and the position of the upper jaw may be used to constrain the possible solutions for the fitting. The position of teeth and face relative to each other may be defined by anatomy and expressions for the lower jaw. Tracking the face position using landmarks can help constraint the teeth positions when other image features such as a segmentation are not reliable (e.g., in case of motion blur).

In one embodiment, processing logic assumes that the pose parameters in horizontal and depth directions are the same for the lower and upper jaw relative to their initial poses. Processing logic may only allow differences in a vertical direction (relative to the face) due to the physical constraints on opening of the lower jaw. As specified above, processing logic may also constrain lower jaw position to be similar to chin position. This term guides the lower jaw fitting in the difficult cases where there is limited information from 2D.

Figures 7D, 7E:
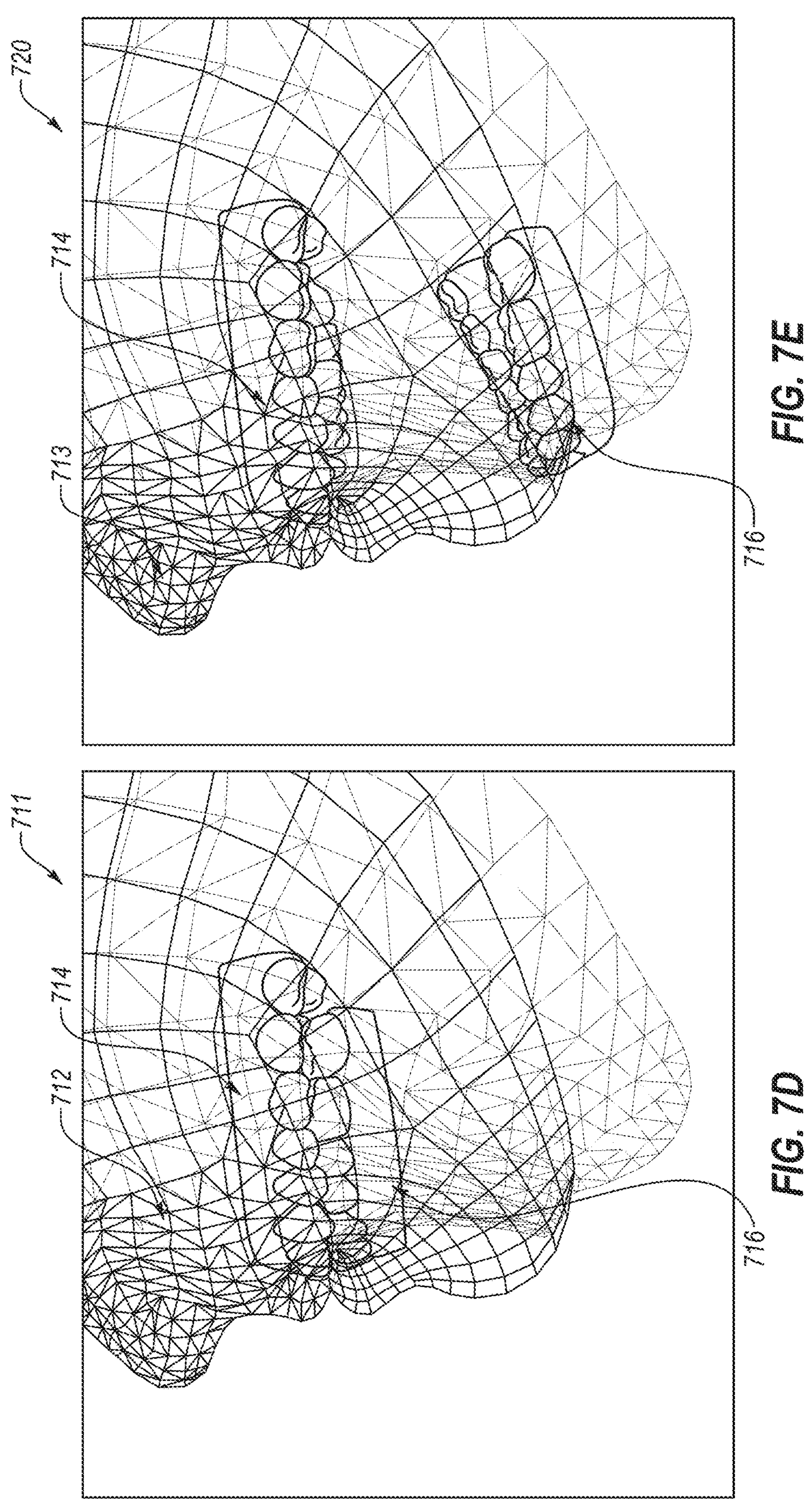
FIGS. 7D-E illustrate fitting of 3D models of an upper and lower dental arch to an image of a face, in accordance with an embodiment of the present disclosure.

FIGS. 7D-E illustrate fitting of 3D models of an upper and lower dental arch to an image of a face, in accordance with an embodiment of the present disclosure. In particular, FIG. 7D shows fitting of the lower jaw 716 to a frame 711 based on information on a determined position of an upper jaw 714 and on a facial mesh 712 in an instance where the lower jaw is closed. FIG. 7E shows fitting of the lower jaw 716 to a different frame 720 based on information on a determined position of an upper jaw 714 and on a facial mesh 713 in an instance where the lower jaw is open, using a chin reference cost term.

For the lower jaw, processing logic may constrain the motion in the Y direction (e.g., for both rotation and translation) to be in a predefined path. Processing logic may apply a simplified articulation model that defines the motion of the lower jaw inspired from anatomical approximations. Processing logic may also apply a constraint on similarity between articulation angle in a previous frame and articulation angle in a current frame which makes the jaw opening and closing smooth across the frames.

Figure 7F:
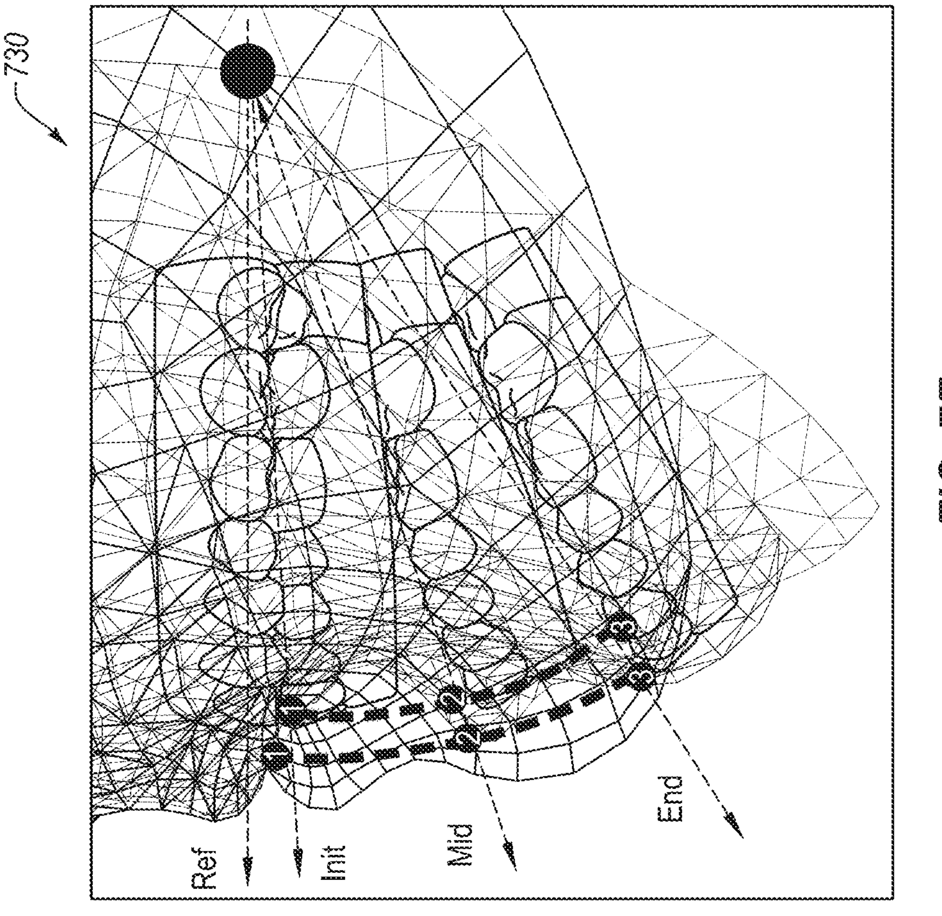
FIG. 7F illustrates fitting of a lower dental arch to an image of a face using a jaw articulation model, in accordance with an embodiment of the present disclosure.

FIG. 7F illustrates fitting of a lower dental arch to an image of a face using a jaw articulation model and a constraint on similarity between articulation angle between frames, in accordance with an embodiment of the present disclosure. The articulation model shows a reference angle, an a minimum articulation angle (init) (e.g., in bite position), a mid-adjustment articulation angle and an end articulation angle that shows a maximum articulation of the lower jaw.

In some embodiments, on top of the teeth fitting optimization steps, processing logic may also apply some filtering steps to overrule some non-smooth parts of a video. In one embodiment, processing logic applies one or more state estimation methods to estimate the next frame pose parameters by combining the information retrieved from the teeth fitting optimization and a simple mathematical model of the pose changes. In one embodiment, processing logic applies a Kalman Filter with determined weighting for this purpose. In one embodiment, an optical flow is computed and used for image motion information in 2D. Optical flow and/or tracking of landmarks can give visual clues of how fast objects move in the video stream. Movements of these image features may be constrained to match with the movements of the re-projection of a fitted object. Even without connecting this information with 3D, processing logic can still add it as an additional constraint to the teeth fitting optimization. In one embodiment, simple 1D Gaussian smoothing is performed to prune any remaining outliers.

In some embodiments, state estimation methods such as a Kalman filter may be used to improve fitting. Using common sense, a statistical movement model of realistic movements of teeth may be built, which may be applied as constraints on fitting. The 2D-3D matching result may be statistically modeled based on the segmentation prediction as a measurement in embodiments. This may improve a position estimate to a statistically most likely position.

Returning to FIG. 3, for each frame, frame to model registration logic 326 (also referred to as fitting logic) outputs registration information (also referred to as fitting information). The registration information 328 may include an orientation, position and/or zoom setting (e.g., 6D fitting parameters) of an upper 3D model fit to a frame and may include a separate orientation, position and/or zoom setting of a lower 3D model fit to the frame. Registration information 328 may be input into a model projector 329 along with segmented post treatment 3D models (or post-alteration 3D models) of the upper and lower dental arch. The model projector 329 may then project the post-treatment 3D models (or post-alteration 3D models) onto a 2D plane using the received registration information 328 to produce post-treatment contours 340 (or post-alteration contours) of teeth. The post-treatment contours (or post alteration contours) of the upper and/or lower teeth may be input into modified frame generator 336. In some embodiments, model projector 329 additionally determines normals to the 3D surfaces of the teeth, gums, etc. from the post-treatment/alteration 3D models (e.g., the segmented post-treatment/alteration 3D models) and/or the pre-treatment/alteration 3D models (e.g., the segmented pre-treatment/alteration 3D models). Each normal may be a 3D vector that is normal to a surface of the 3D model at a given pixel as projected onto the 2D plane. In embodiments, a normal map comprising normals to surfaces of the post-treatment 3D model (or post alteration 3D model) may be generated and provided to the modified frame generator 336. The normal map may be a 2D map comprising one of more of the normals. In one embodiment the 2D map comprises a red, green, blue (RGB) image, wherein one or more pixels of the RGB image comprise a red value representing a component of a vector along a first axis, a green value representing a component of the vector along a second axis, and a blue value representing a component of the vector along a third axis.

Figure 8A:
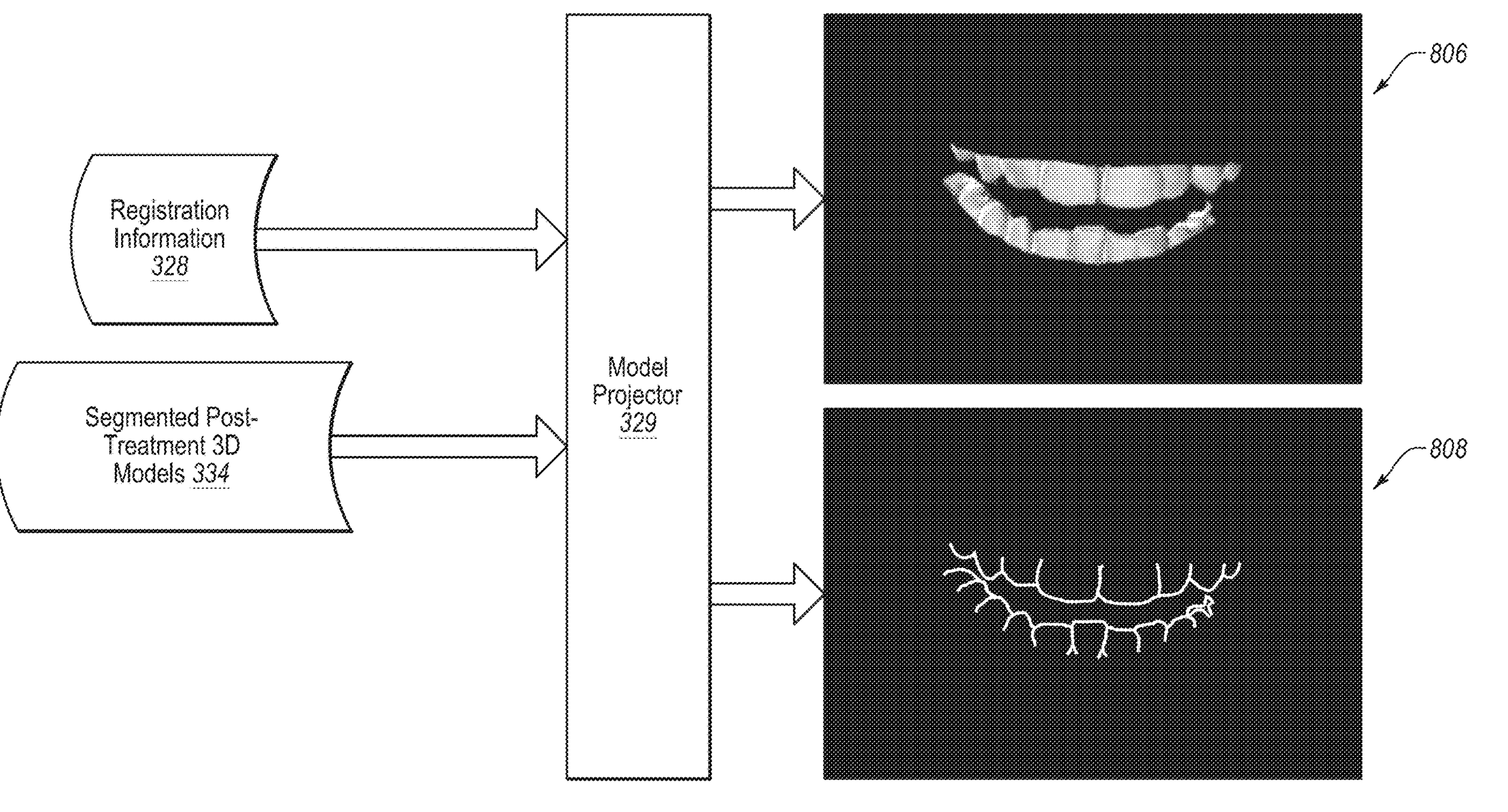
FIG. 8A illustrates a trained machine learning model that outputs teeth contours of an estimated future condition of a dental site and normals associated with the teeth contours, in accordance with an embodiment of the present disclosure.

FIG. 8A illustrates model projector 329 receiving registration information 326, a segmented 3D model of an upper dental arch and a segmented 3D model of a lower dental arch, and outputting a normals map 806 for the portion of the post-treatment dentition that would occur within the inner mouth region of a frame and a contours sketch 808 for the portion of the post-treatment dentition that would occur within the inner mouth region of the frame.

Figures 8B, 8C:
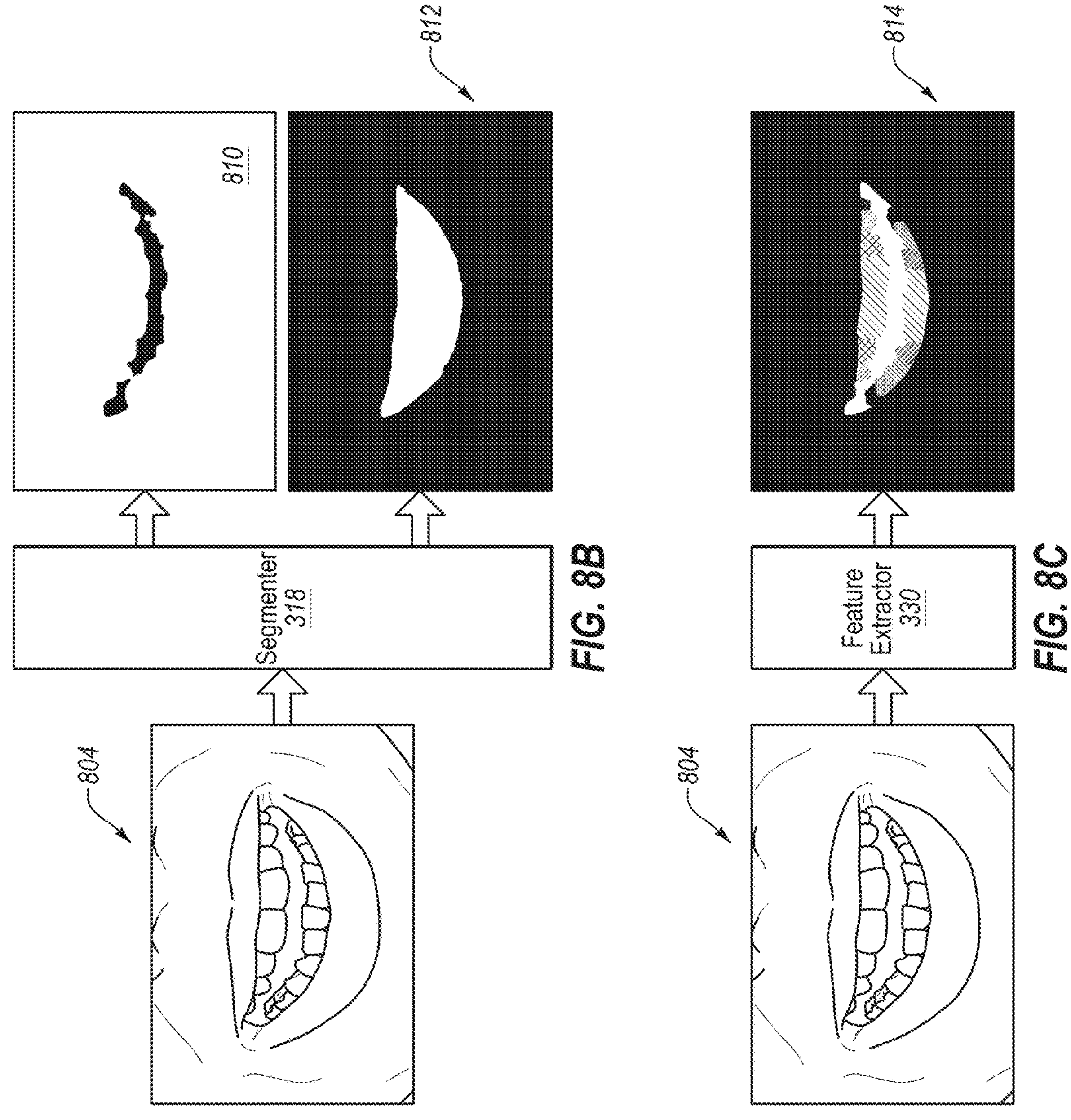
FIG. 8B shows a cropped frame of a face being input into a segmenter, in accordance with an embodiment of the present disclosure.
FIG. 8C illustrates feature extraction of an inner mouth area of a frame from a video of a face, in accordance with an embodiment of the present disclosure.

FIG. 8B shows a cropped frame of a face being input into a segmenter 318. Segmenter 318 may identify an inner mouth area, an outer mouth area, teeth, an area between teeth, and so on. The segmenter 318 may output one or more masks. In one embodiment, segmenter 318 outputs a first mask 812 that identifies the inner mouth area and a second mask 810 that identifies space between teeth of an upper dental arch and teeth of a lower dental arch. For the first mask 812, pixels that are in the inner mouth area may have a first value (e.g., 1) and pixels that are outside of the inner mouth area may have a second value (e.g., 0). For the second mask, pixels that are part of the region between the upper and lower dental arch teeth (e.g., of the negative space between teeth) may have a first value, and all other pixels may have a second value.

Returning to FIG. 3, feature extractor 330 may include one or more machine learning models and/or image processing algorithms that extract one or more features from frames of the video. Feature extractor 330 may receive one or more frames of the video, and may perform feature extraction on the one or more frames to produce one or more feature sets 332, which may be input into modified frame generator 336. The specific features that are extracted are features usable for visualizing post-treatment teeth or other post-alteration teeth. In one embodiment, feature extractor extracts average teeth color for each tooth. Other color information may additionally or alternatively be extracted from frames.

In one embodiment, feature extractor 330 includes a trained ML model (e.g., a small encoder) that processes some or all frames of the video 235 to generate a set of features for the video 235. The set of features may include features present in a current frame being processed by video processing workflow 305 as well as features not present in the current frame. The set of features output by the encoder may be input into the modified frame generator 336 together with the other inputs described herein. By extracting features from many frames of the video rather than only features of the current frame and providing those features to modified frame generator 336, processing logic increases stability of the ultimately generated modified frames.

Different features may benefit from different handling for temporal consistency. The tooth color for example does not change throughout a video, but occlusions, shadow and lighting do. When extracting features in an unsupervised manner using for example auto-encoders, image features are not disentangled and there is no way to semantically interpret or edit such image features. This makes temporally smoothing these very hard. Accordingly, in embodiments the feature extractor 330 extracts the color values of the teeth for all frames and uses Gaussian smoothing for temporal consistency. The color values may be RGB color values in embodiments. The RGB values of a tooth depend on the tooth itself, which is constant, but also the lighting conditions that can change throughout the video. Accordingly, in some embodiments lighting may be taken into consideration, such as by using depth information that indicates depth into the plane of an image for each pixel of a tooth. Teeth that have less depth may be adjusted to be lighter, while teeth that have greater depth (e.g., are deeper or more recessed into the mouth) may be adjusted to be darker.

In one embodiment, feature extractor 330 includes a model (e.g., an ML model) that generates a color map from a frame. In one embodiment, feature extractor 330 generates a color map using traditional image processing techniques, and does not use a trained ML model for generation of the color map. In one embodiment, the feature extractor 330 determines one or more blurring functions based on a captured frame. This may include setting up the functions, and then solving for the one or more blurring functions using data from an initial pre-treatment video frame. In some embodiments, a first set of blurring functions is generated (e.g., set up and then solved for) with regards to a first region depicting teeth in the captured frame and a second set of blurring functions is generated with regards to a second region depicting gingiva in the captured frame. Once the blurring functions are generated, these blurring functions may be used to generate a color map.

In embodiments, the blurring functions for the teeth and/or gingiva are global blurring functions that are parametric functions. Examples of parametric functions that may be used include polynomial functions (e.g., such as biquadratic functions), trigonometric functions, exponential functions, fractional powers, and so on. In one embodiment, a set of parametric functions are generated that will function as a global blurring mechanism for a patient. The parametric functions may be unique functions generated for a specific patient based on an image of that patient's smile. With parametric blurring, a set of functions (one per color channel of interest) may be generated, where each function provides the intensity, I, for a given color channel, c, at a given pixel location, x, y according to the following equation:

$$I_c(x,y)=f(x,y) \tag{1}$$

A variety of parametric functions can be used for f. In one embodiment, a parametric function is used, where the parametric function can be expressed as:

$$I_c(x, y) = \sum_{i=0}^{N} \sum_{j=0}^{i} w(i, j) x^{i-j} y^j \tag{2}$$

In one embodiment, a biquadratic function is used. The biquadratic can be expressed as:

$$I_c(x,y)=w_0+w_1x+w_2y+w_3xy+w_4x^2+w_5y^2 \tag{3}$$

Where $w_0, w_1, \ldots, w_5$ are weights (parameters) for each term of the biquadratic function, x is a variable representing a location on the x axis and y is a variable representing a location on the y axis (e.g., x and y coordinates for pixel locations, respectively).

The parametric function (e.g., the biquadratic function) may be solved using linear regression (e.g., multiple linear regression). Some example techniques that may be used to perform the linear regression include the ordinary least squares method, the generalized least squares method, the iteratively reweighted least squares method, instrumental variables regression, optimal instruments regression, total least squares regression, maximum likelihood estimation, rigid regression, least absolute deviation regression, adaptive estimation, Bayesian linear regression, and so on.

To solve the parametric function, a mask M of points may be used to indicate those pixel locations in the initial image that should be used for solving the parametric function. For example, the mask M may specify some or all of the pixel locations that represent teeth in the image if the parametric function is for blurring of teeth or the mask M may specify some or all of the pixel locations that represent gingiva if the parametric function is for the blurring of gingiva.

In an example, for any initial image and mask, M, of points, the biquadratic weights, $w_0, w_1, \ldots, w_5$, can be found by solving the least squares problem:

$$Aw^T = b \tag{4}$$

where:

$$w = [w_0, w_1, w_2, w_3, w_4, w_5] \tag{5}$$

$$A = \begin{bmatrix} 1 & x_0 & y_0 & x_0y_0 & x_0^2 & y_0^2 \\ 1 & x_1 & y_1 & x_1y_1 & x_1^2 & y_1^2 \\ \vdots & \vdots & \vdots & \vdots & \vdots & \vdots \\ 1 & x_n & y_n & x_ny_n & x_n^2 & y_n^2 \end{bmatrix}; \forall x_i, y_i \in M \tag{6}$$

$$b = \begin{bmatrix} I_c(x_0, y_0) \\ I_c(x_1, y_1) \\ \vdots \\ I_c(x_n, y_n) \end{bmatrix}; \forall x_i, y_i \in M \tag{7}$$

By constructing blurring functions (e.g., parametric blurring functions) separately for the teeth and the gum regions, a set of color channels can be constructed that avoid any pattern of dark and light spots that may have been present in the initial image as a result of shading (e.g., because one or more teeth were recessed).

In embodiments, the blurring functions for the gingiva are local blurring functions such as Gaussian blurring functions. A Gaussian blurring function in embodiments has a high radius (e.g., a radius of at least 5, 10, 20, 40, or 50 pixels). The Gaussian blur may be applied across the mouth region of the initial image in order to produce color information. A Gaussian blurring of the image involves convolving a two-dimensional convolution kernel over the image and producing a set of results. Gaussian kernels are parameterized by σ, the kernel width, which is specified in pixels. If the kernel width is the same in the x and y dimensions, then the Gaussian kernel is typically a matrix of size 6σ+1 where the center pixel is the focus of the convolution and all pixels can be indexed by their distance from the center in the x and y dimensions. The value for each point in the kernel is given as:

$$G(x, y) = \frac{1}{2\pi\sigma^2} e^{-\frac{x^3+y^2}{2\sigma^2}} \tag{8}$$

In the case where the kernel width is different in the x and y dimensions, the kernel values are specified as:

$$G(x, y) = G(x)G(y) = \frac{1}{2\pi\sigma_x\sigma_y} e^{-\left(\frac{x^2}{2\sigma_x^2}+\frac{y62^2}{2\sigma_y^2}\right)} \tag{9}$$

FIG. 8C illustrates a cropped frame of a face being input into a feature extractor 330. Feature extractor 330 may output a color map and/or other feature map of the inner mouth area of the cropped frame.

Referring back to FIG. 3, modified frame generator 336 receives features 332, post-treatment or other post-alteration contours and/or normals 340, and optionally one or more masks generated by segmenter 318 and/or mouth area detector 314. Modified frame generator 336 may include one or more trained machine learning models that are trained to receive one or more of these inputs and to output a modified frame that integrates information from the original frame with a post-treatment or other post-alteration dental arch condition. Abstract representations such as a color map, image data such as sketches obtained from the 3D model of the dental arch at a stage of treatment (e.g., from a 3D mesh from the treatment plan) depicting contours of the teeth and gingiva post-treatment or at an intermediate stage of treatment and/or a normal map depicting normals of surfaces from the 3D model, for example, may be input into a generative model (e.g., such as a generative adversarial network (e.g., a generator of a generative adversarial network) or a variational autoencoder) that then uses such information to generate a post-treatment image of a patient's face and/or teeth. Alternatively, abstract representations such as a color map, image data such as sketches obtained from the 3D model of an altered dental arch depicting contours of the altered teeth and/or gingiva and/or a normal map depicting normals of surfaces from the 3D model may be input into a generative model that then uses such information to generate an altered image of a patient's face and/or teeth that may not be related to dental treatment. In some embodiments, large language models may be used in the generation of altered images of patient faces. For example, one or more large language model (LLM) may receive any of the aforementioned inputs discussed with reference to a generative model and output and output one or more synthetic images of the face and/or teeth.

In some embodiments, modified frame generator 336 includes a trained generative model that receives as input, features 332 (e.g., a pre-treatment and/or post treatment or post-alteration color map that may provide color information for teeth in one or more frame), pre-treatment and/or post-treatment (or post-alteration) contours and/or normals, and/or one or more mouth area masks, such as an inner mouth area mask and/or an inverted inner mouth area mask (e.g., a mask that shows the space between upper and lower teeth in the inner mouth area). In one embodiment, one or more prior modified frames are further input into the generative model. Previously generated images or frames may be input into the generative model recursively. This enables the generative model to base its output on the previously generated frame/image and create a consistent stream of frames. In one embodiment, instead of recursively feeding the previously generated frame for generation of a current modified frame, the underlying features that were used to generate the previously generated frame may instead be input into the generative model for the generation of the current modified frame. In one embodiment, the generative model may generate the modified frame in a higher resolution, and the modified frame may then be downscaled to remove higher frequencies and associated artifacts.

In one embodiment, an optical flow is determined between the current frame and one or more previous frames, and the optical flow is input into the generative model. In one embodiment, the optical flow is an optical flow in a feature space. For example, one or more layers of a machine learning model (e.g., a generative model or a separate flow model) may generate features of a current frame (e.g., of a mouth area of the current frame) and one or more previous frames (e.g., a mouth area of one or more previous frames), and may determine an optical flow between the features of the current frame and the features of the one or more previous frames. In one embodiment a machine learning model is trained to receive current and previously generated labels (for current and previous frames) as well as a previously generated frame and to compute an optical flow between the current post-treatment contours and the previous generated frame. The optical flow may be computed in the feature space in embodiments.

Figure 9:
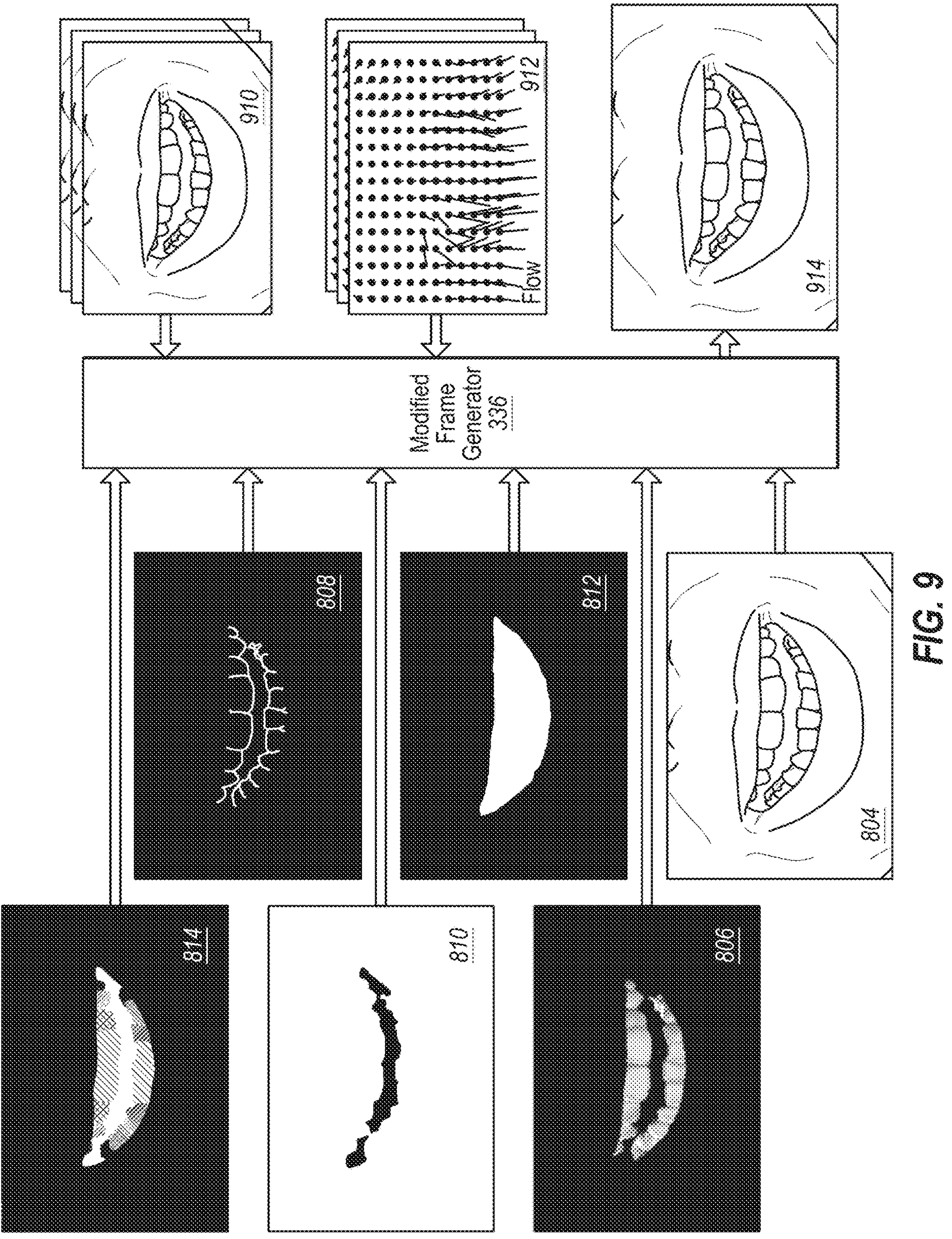
FIG. 9 illustrates generation of a modified image of a face using a trained machine learning model, in accordance with an embodiment of the present disclosure.

FIG. 9 illustrates generation of a modified image or frame 914 of a face using a trained machine learning model (e.g., modified frame generator 336), in accordance with an embodiment of the present disclosure. In embodiments, modified frame generator 336 receives multiple inputs. The inputs may include, for example, one or more of a color map 806 that provides separate color information for each tooth in the inner mouth area of a frame, post-treatment contours 808 (or post-alteration contours) that provides geometric information of the post-treatment teeth (or post-alteration teeth), an inner mouth area mask 812 that provides the area of image generation, an inner mouth mask 810 (optionally inverted) that together with a background of the frame provides information on a non-teeth area, a normals map 614 that provides additional information on tooth geometry that helps with specular highlights, pre-treatment (original) and/or post-treatment or post-alteration (modified) versions of one or more previous frames 910, and/or optical flow information 912 that shows optical flow between the post-treatment or post-alteration contours 808 of the current frame and the one or more modified previous frames 910. In embodiments, the modified frame generator 336 performs a warp in the feature space based on the received optical flow (which may also be in the feature space). The modified frame generator 336 may generate modified frames with post-treatment or post-alteration teeth in a manner that reduces flow loss (e.g., perceptual correctness loss in feature space) and/or affine regularization loss for optical flow.

In embodiments the generative model of modified frame generator 336 is or includes an auto encoder. In embodiments, the generative model of the modified frame generator 336 is or includes a GAN. The GAN may be, for example, a vid2vid GAN, a modified pix2pix GAN, a few-shot-vid2vid GAN, or other type of GAN. In embodiments, the GAN uses the received optical flow information in addition to the other received information to iteratively determine loss and optimization over all generated frames in a sequence.

Returning to FIG. 3, modified frame generator 336 outputs modified frames 340, which are modified versions of each of the frames of video 235. The above described operations of the video generation workflow or pipeline 305 may be performed separately for each frame. Once all modified frames are generated, each showing the post-treatment or other estimated future or altered condition of the individual's teeth or dentition, a modified video may ultimately be produced. In embodiments where the above described operations are performed in real time, in near-real time or on-the-fly during video capture and/or video streaming, modified frames 340 of the video 235 may be output, rendered and displayed one at a time before further frames of the video 235 have been received and/or during capture or receipt of one or more further frames.

In embodiments, modified frames show post-treatment versions of teeth of an individual. In other embodiments, modified frames show other estimated future conditions of dentition. Such other estimated future conditions may include, for example, a future condition that is expected if no treatment is performed, or if a patient doesn't start brushing his or her teeth, or how teeth might move without orthodontic treatment, or if a patient smokes or drinks coffee. In other embodiments, modified frames show other selected alterations, such as alterations that remove teeth, replace teeth with fantastical teeth, add one or more dental conditions to teeth, and so on.

Modified videos may be displayed to an end user (e.g., a doctor, patient, end user, etc.) in embodiments. In some embodiments, video generation is interactive. Processing logic may receive one or more inputs (e.g., from an end user) to select changes to a target future condition of a subject's teeth. Examples of such changes include adjusting a target tooth whiteness, adjusting a target position and/or orientation of one or more teeth, selecting alternative restorative treatment (e.g., selecting a composite vs. a metal filling), removing one or more teeth, changing a shape of one or more teeth, replacing one or more teeth, adding restorations for one or more teeth, and so on. Based on such input, a treatment plan and/or 3D model(s) of an individual's dental arch(es) may be updated and/or one or more operations of the sequence of operations may be rerun using the updated information. In one example, to increase or decrease a whiteness of teeth, one or more settings or parameters of modified frame generator 336 may be updated. In one example, to change a position, size and/or shape of one or more post-treatment or post-alteration teeth, one or more updated post-treatment or post-alteration 3D models may be generated and input into modified frame generator 336.

In some embodiments, modified frames 340 are analyzed by frame assessor 342 to determine one or more quality metric values of each of the modified frames 340. Frame assessor 342 may include one or more trained machine learning models and/or image processing algorithms to determine lighting conditions, determine blur, detect a face and/or head and determine face/head position and/or orientation, determine head movement speed, identify teeth and determine a visible teeth area, and/or determines other quality metric values. The quality metric values are discussed in greater detail below with reference to FIGS. 15-17. Processing logic may compare each of the computed quality metric values of the modified frame to one or more quality criteria. For example, a head position may be compared to a set of rules for head position that indicate acceptable and unacceptable head positions. If a determination is made that one or more quality metric criteria are not satisfied, and/or that a threshold number of quality criteria are not satisfied, and/or that one or more determined quality metric values deviate from acceptable quality metric thresholds by more than a threshold amount, frame assessor 342 may trim a modified video by removing such frame or frames that failed to satisfy the quality metric criteria. In one embodiment, frame assessor 342 determines a combined quality metric score for a moving window of modified frames. If a sequence of modified frames in the moving window fails to satisfy the quality metric criteria, then the sequence of modified frames may be cut from the modified video. Once one or more frames of low quality are removed from the modified video, a trimmed video 344 is output.

In some embodiments, removed frames of a modified video may be replaced using a generative model that generates interpolated frames between remaining frames that were not removed (e.g., between a first frame that is before a removed frame or frames and a second frame that is after the removed frame or frames). Frame interpolation may be performed using a learned hybrid data driven approach that estimates movement between images to output images that can be combined to form a visually smooth animation even for irregular input data. The frame interpolation may also be performed in a manner that can handle disocclusion, which is common for open bite images. The frame generator may generate additional synthetic images or frames that are essentially interpolated images that show what the dentition likely looked like between the remaining frames. The synthetic frames are generated in a manner that they are aligned with the remaining modified frames in color and space.

In embodiments, frame generation can include generating (e.g., interpolating) simulated frames that show teeth, gums, etc. as they might look between those teeth, gums, etc. in frames at hand. Such frames may be photo-realistic images. In some embodiments, a generative model such as a generative adversarial network (GAN), encoder/decoder model, diffusion model, variational autoencoder (VAE), neural radiance field (NeRF), etc. is used to generate intermediate simulated frames. In one embodiment, a generative model is used that determines features of two input frames in a feature space, determines an optical flow between the features of the two frames in the feature space, and then uses the optical flow and one or both of the frames to generate a simulated frame. In one embodiment, a trained machine learning model that determines frame interpolation for large motion is used, such as is described in Fitsum Reda at al., FILM: Frame Interpolation for Large Motion, Proceedings of the European Conference On Computer Vision (ECC) (2022), which is incorporated by reference herein in its entirety.

In embodiments, the frame generator is or includes a generative model trained to perform frame interpolation—synthesizing intermediate images between a pair of input frames or images. The generative model may receive a pair of input frames, and generate an intermediate frame that can be placed in a video between the pair of frames. In one embodiment, the generative model has three main stages, including a shared feature extraction stage, a scale-agnostic motion estimation stage, and a fusion stage that outputs a resulting color image. The motion estimation stage in embodiments is capable of handling a time-wise non-regular input data stream. Feature extraction may include determining a set of features of each of the input images in a feature space, and the scale-agnostic motion estimation may include determining an optical flow between the features of the two images in the feature space. The optical flow and data from one or both of the images may then be used to generate the intermediate image in the fusion stage. The generative model may be capable of stable tracking of features without artifacts for large motion. The generative model may handle disocclusions in embodiments. Additionally the generative model may provide improved image sharpness as compared to traditional techniques for image interpolation. In embodiments, the generative model generates simulated images recursively. The number of recursions may not be fixed, and may instead be based on metrics computed from the images.

In embodiments, the model generator may generate interpolated frames recursively. For example, a sequence of 10 frames may be removed from the modified video. In a first pass, frame generator 346 may generate a first interpolated frame between a first modified frame that immediately preceded the earliest frame in the sequence of removed frames and a second modified frame that immediately followed the latest frame in the sequence of removed frames. Once the first interpolated frame is generated, a second interpolated frame may be generated by using the first frame and the first interpolated frame as inputs to the generative model. Subsequently, a third interpolated frame may be generated between the first frame and the second interpolated frame, and a fourth interpolated frame may be generated between the second interpolated frame and the first interpolated frame, and so on. This may be performed until all of the removed frames have been replaced in embodiments, resulting in a final video 350 that has a high quality (e.g., for which frames satisfy the image quality criteria).

The modified video 340 or final video 350 may be displayed to a patient, who may then make an informed decision on whether or not to undergo treatment.

Many logics of video processing workflow or pipeline 305 such as mouth area detector 314, landmark detector 310, segmenter 318, feature extractor 330, frame generator 346, frame assessor 342, modified frame generator 336, and so on may include one or more trained machine learning models, such as one or more trained neural networks. Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available.

For model training, a training dataset containing hundreds, thousands, tens of thousands, hundreds of thousands or more videos and/or images should be used to form a training dataset. In embodiments, videos of up to millions of cases of patient dentition may be available for forming a training dataset, where each case may include various labels of one or more types of useful information. This data may be processed to generate one or multiple training datasets for training of one or more machine learning models. The machine learning models may be trained, for example, to perform landmark detection, perform segmentation, perform interpolation of images, generate modified versions of frames that show post-treatment dentition, and so on. Such trained machine learning models can be added to video processing workflow 305 once trained.

In one embodiment, generating one or more training datasets includes gathering one or more images with labels. The labels that are used may depend on what a particular machine learning model will be trained to do. For example, to train a machine learning model to perform classification of dental sites (e.g., for segmenter 318), a training dataset may include pixel-level labels of various types of dental sites, such as teeth, gingiva, and so on.

Processing logic may gather a training dataset comprising images having one or more associated labels. One or more images, scans, surfaces, and/or models and optionally associated probability maps in the training dataset may be resized in embodiments. For example, a machine learning model may be usable for images having certain pixel size ranges, and one or more image may be resized if they fall outside of those pixel size ranges. The images may be resized, for example, using methods such as nearest-neighbor interpolation or box sampling. The training dataset may additionally or alternatively be augmented. Training of large-scale neural networks generally uses tens of thousands of images, which are not easy to acquire in many real-world applications. Data augmentation can be used to artificially increase the effective sample size. Common techniques include random rotation, shifts, shear, flips and so on to existing images to increase the sample size.

To effectuate training, processing logic inputs the training dataset(s) into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above.

Training may be performed by inputting one or more of the images or frames into the machine learning model one at a time. Each input may include data from an image from the training dataset. The machine learning model processes the input to generate an output. An artificial neural network includes an input layer that consists of values in a data point (e.g., intensity values and/or height values of pixels in a height map). The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction and/or output that the machine learning model can produce. For example, for an artificial neural network being trained to perform dental site classification, there may be a first class (tooth), a second class (gums), and/or one or more additional dental classes. Moreover, the class, prediction, etc. may be determined for each pixel in the image or 3D surface, may be determined for an entire image or 3D surface, or may be determined for each region or group of pixels of the image or 3D surface. For pixel level segmentation, for each pixel in the image, the final layer applies a probability that the pixel of the image belongs to the first class, a probability that the pixel belongs to the second class, and/or one or more additional probabilities that the pixel belongs to other classes.

Accordingly, the output may include one or more prediction and/or one or more a probability map. For example, an output probability map may comprise, for each pixel in an input image/scan/surface, a first probability that the pixel belongs to a first dental class, a second probability that the pixel belongs to a second dental class, and so on. For example, the probability map may include probabilities of pixels belonging to dental classes representing a tooth, gingiva, or a restorative object.

Processing logic may then compare the generated probability map and/or other output to the known probability map and/or label that was included in the training data item. Processing logic determines an error (i.e., a classification error) based on the differences between the output probability map or prediction and/or label(s) and the provided probability map and/or label(s). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

In one embodiment, one or more training optimizations are performed to train a machine learning model to perform landmarking (e.g., to train landmark detector 310). In one embodiment, to improve landmark stability between frames of a video, smoothing of landmarks is performed during training. Similar smoothing may then be performed at inference, as discussed above. In one embedment, smoothing is performed using Gaussian smoothing (as discussed above). In one embodiment, smoothing is performed using an optical flow between frames. In one embodiment, landmark stability is improved at training time by, instead of only using labels for fully supervised training, also including image features as unsupervised loss. In one embodiment, landmark stability is improved by smoothing face detection. In one embodiment, a trained model may ignore stability of landmark detection, but may make sure that face boxes are temporally smooth by smoothing at test time and/or by applying temporal constraints at training time.

Labelling mouth crops for full video for segmentation is computationally expensive. One way to generate a dataset for video segmentation is to annotate only every nth frame in the video. Then, a GAN may be trained based on a video prediction model, which predicts future frames based on past frames by computing motion vectors for every pixel. Such a motion vector can be used to also propagate labels from labelled frames to unlabeled frames in the video.

Segmentation models typically have a fixed image size that they operate on. In general, training should be done using a highest resolution possible. Nevertheless, as training data is limited, videos at test time might have higher resolutions than those that were used at training time. In these cases, the segmentation has to be upscaled. This upscale interpolation can take the probability distributions into account to create a finer upscaled segmentation than using nearest neighbor interpolation.

Traditionally, models are trained in a supervised manner with image labels. However, unlabelled frames in videos can also be used to fine tune a model with temporal consistency loss. The loss may ensure that for pair of a labelled frame $V_i$ and an unlabelled frame $V_{i+1}$, the prediction for $V_{i+1}$ is consistent with the optical flow warped label of $V_i$.

In a test set, a video can have a large variation in terms of lighting, subject's skin color, mouth expression, number of teeth, teeth color, missing teeth, beard, lipsticks on lips, etc. Such variation might not be fully captured by limited labelled training data. To improve the generalization capabilities of a segmentation model, a semi-supervised approach (instead of fully-supervised) may be used, where along with the labelled data, a large amount of unlabelled mouth crops can be used. Methods like cross consistency training, cross pseudo supervision, self-training etc., can be performed.

Figure 10A:
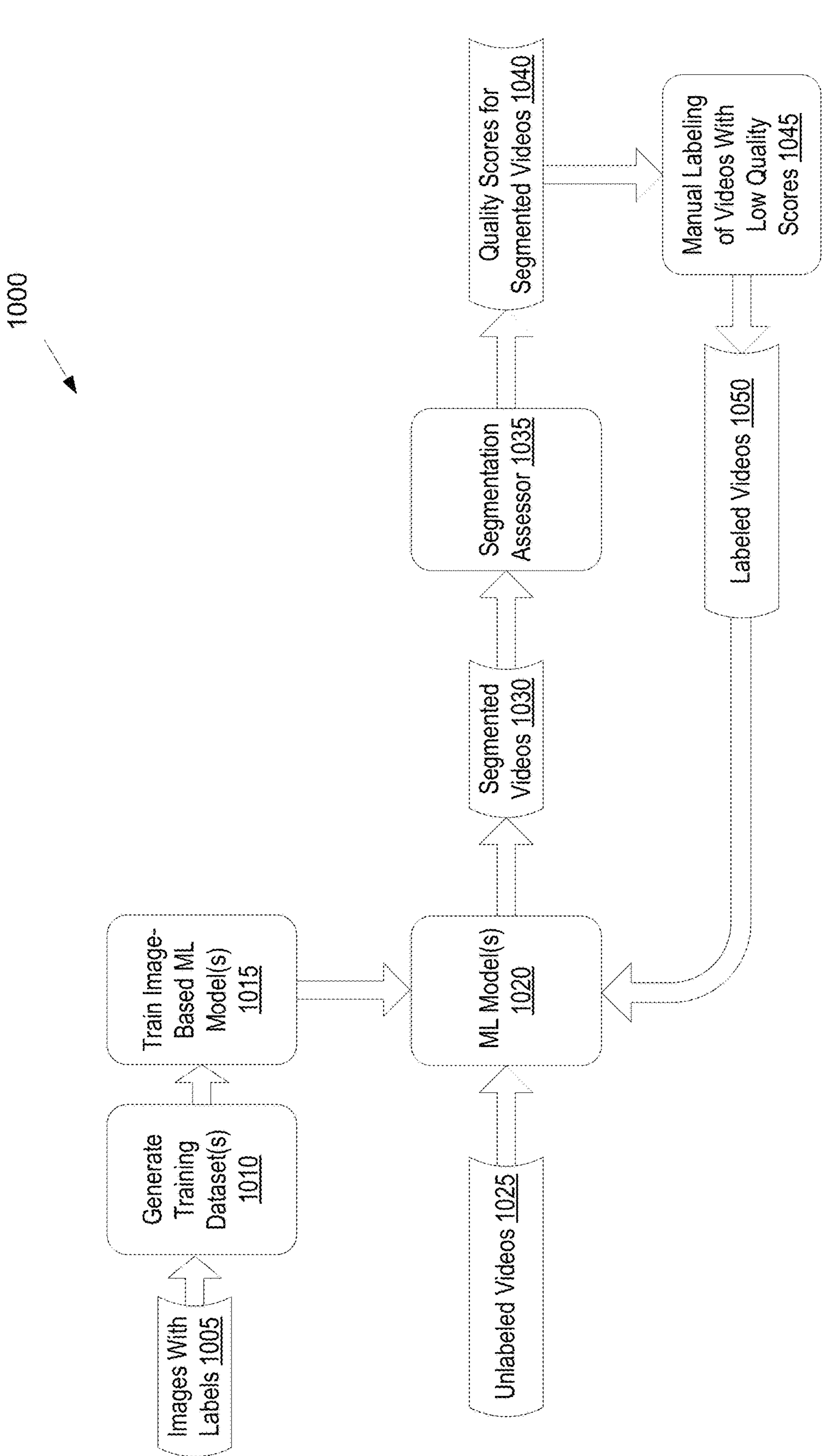
FIG. 10A illustrates training of a machine learning model to perform segmentation, in accordance with an embodiment of the present disclosure.

FIG. 10A illustrates a workflow 1000 for training of a machine learning model to perform segmentation, in accordance with an embodiment of the present disclosure. In one embodiment, images of faces with labeled segmentation 1005 are gathered into a training dataset 1010. These labeled images may include labels for each separate tooth, an upper gingiva, a lower gingiva, and so on in the images. At block 1015, one or more machine learning models are trained to perform segmentation of still images.

Once the machine learning model(s) are trained for still images, further training may be performed on videos of faces. However, it would require vast resources for persons to manually label every frame of even a small number of videos, much less to label each frame of thousands, tens of thousands, hundreds of thousands, or millions of videos of faces. Accordingly, in one embodiment, unlabeled videos are processed by the trained ML model that was trained to perform segmentation on individual images. For each video, the ML model 1020 processes the video and outputs a segmented version of the video. A segmentation assessor 1030 then assesses the confidence and/or quality of the performed segmentation. Segmentation assessor 1035 may run one or more heuristics to identify difficult frames that resulted in poor or low confidence segmentation. For example, a trained ML model 1020 may output a confidence level for each segmentation result. If the confidence level is below a threshold, then the frame that was segmented may be marked. In one embodiment, segmentation assessor 1035 outputs quality scores 1040 for each of the segmented videos.

At block 1045, those frames with low confidence or low quality segmentation are marked. The marked frames that have low quality scores may then be manually labeled. Video with the labeled frames may then be used for further training of the ML model(s) 1020, improving the ability of the ML model to perform segmentation of videos. Such a fine-tuned model can then provide an accurate segmentation mask for video which is used in training data.

In order to train modified frame generator, a large training set of videos should be prepared. Each of the videos may be a short video cut or clip that meets certain quality criteria. Manual selection of such videos would be inordinately time consuming and would be very expensive. Accordingly, in embodiments one or more automatic heuristics are used to assess videos and select snippets from those videos that meet certain quality criteria.

Figure 10B:
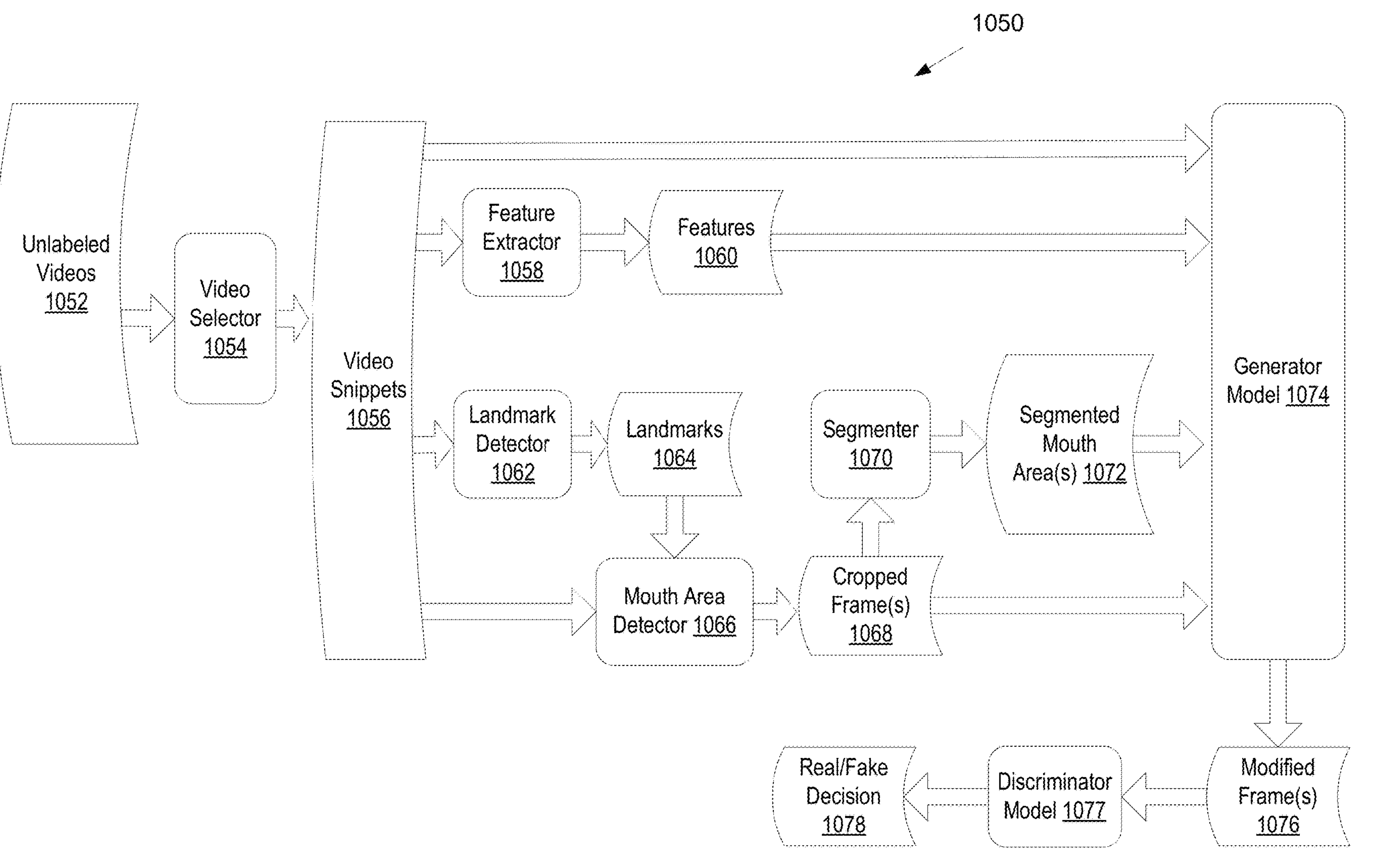
FIG. 10B illustrates training of a machine learning model to perform generation of modified images of faces, in accordance with an embodiment of the present disclosure.

FIG. 10B illustrates training of a machine learning model to perform generation of modified images of faces, in accordance with an embodiment of the present disclosure. In one embodiment, unlabeled videos 1052 are assessed by video selector 1054, which processes the videos using one or more heuristics. Examples of such heuristics include heuristics for analyzing resolution, an open mouth condition, a face orientation, blurriness, variability between videos, and so on. The videos 1052 may be inherently temporally accurate in most instances.

A first heuristic may assess video frames for resolution, and may determine a size of a mouth in frames of the video in terms of pixels based on landmarks. For example, landmarking may be performed on each frame, and from the landmarks a mouth area may be identified. A number of pixels in the mouth area may be counted. Frames of videos that have a number of pixels in the mouth area that are below a threshold may not be selected by video selector.

A second heuristic may assess frames of a video for an open mouth condition. Landmarking may be performed on the frames, and the landmarks may be used to determine locations of upper and lower lips. A delta may then be calculated between the upper and lower lips to determine how open the mouth is. Frames of videos that have a mouth openness of less than a threshold may not be selected.

A third heuristic may assess frames of a video for face orientation. Landmarking may be performed on the frames, and from the landmarks a face orientation may be computed. Frames of videos with faces that have an orientation that is outside of a face orientation range may not be selected.

A fourth heuristic may assess frames for blurriness and/or lighting conditions. A blurriness of a frame may be detected using standard blur detection techniques. Additionally, or alternatively, a lighting condition may be determined using standard lighting condition detection techniques. If the blurriness is greater than a threshold and/or the amount of light is below a threshold, then the frames may not be selected.

If a threshold number of consecutive frames pass each of the frame quality criteria (e.g., pass each of the heuristics), then a snippet containing those frames may be selected from a video. The heuristics may be low computation and/or very fast performing heuristics, enabling the selection process to be performed quickly on a large number of videos.

Video snippets 1056 may additionally or alternatively be selected for face tracking consistency (e.g., no jumps in image space), for face recognition (e.g., does the current frame depict the same person as previous frames), frame to frame variation (e.g., did the image change too much between frames), optical flow map (e.g., are there any big jumps between frames), and so on.

Video snippets 1056 that have been selected may be input into a feature extractor 1058, which may perform feature extraction on the frames of the video snippets and output features 1060 (e.g., which may include color maps).

The video snippets 1056 may also be input into landmark detector 1062, which performs landmarking on the frames of the video snippets 1056 and outputs landmarks 1064. The landmarks (e.g., facial landmarks) and/or frames of a video snippet 1056 may be input into mouth area detector 1066, which determines a mouth area in the frames. Mouth area detector 1066 may additionally crop the frames around the detected mouth area, and output cropped frames 1070. The cropped frames 1068 may be input into segmenter 1070, which may perform segmentation of the cropped frames and output segmentation information, which includes segmented mouth areas 1072. The segmented mouth areas, cropped frames, features, etc. are input into generator model 1074. Generator model 1074 generates a modified frame based on input information, and outputs the modified frame 1076. Each of the feature extractor 1058, landmark detector 1062, mouth area detector 1056, segmenter 1070, etc. may perform the same operations as the similarly named component of FIG. 3. The generator model 1074 may receive an input that may be the same as any of the inputs described as being input into the modified frame generator 336 of FIG. 3.

Generator model 1074 and discriminator model 1077 may be models of a GAN. Discriminator model 107 may process the modified frames 1076 of a video snippet and make a decision as to whether the modified frames were real (e.g., original frames) or fake (e.g., modified frames). The decision may be compared to a ground truth that indicates whether the image was a real or fake image. In one embodiment, the ground truth for a frame k may be the k+1 frame. The discriminator model in embodiments may learn motion vectors that transform a kth frame to a k+1th frame. For videos in which there are labels for a few frames, a video GAN model may be run to predict motion vectors and propagate labels for neighboring unlabeled frames. The results of the discriminator model's 1077 output may then be used to update a training of both the discriminator model 1077 (to train it to better identify real and fake frames and videos) and generator model 1074 (to train it to better generate modified frames and/or videos that cannot be distinguished from original frames and/or videos).

Figure 10C:
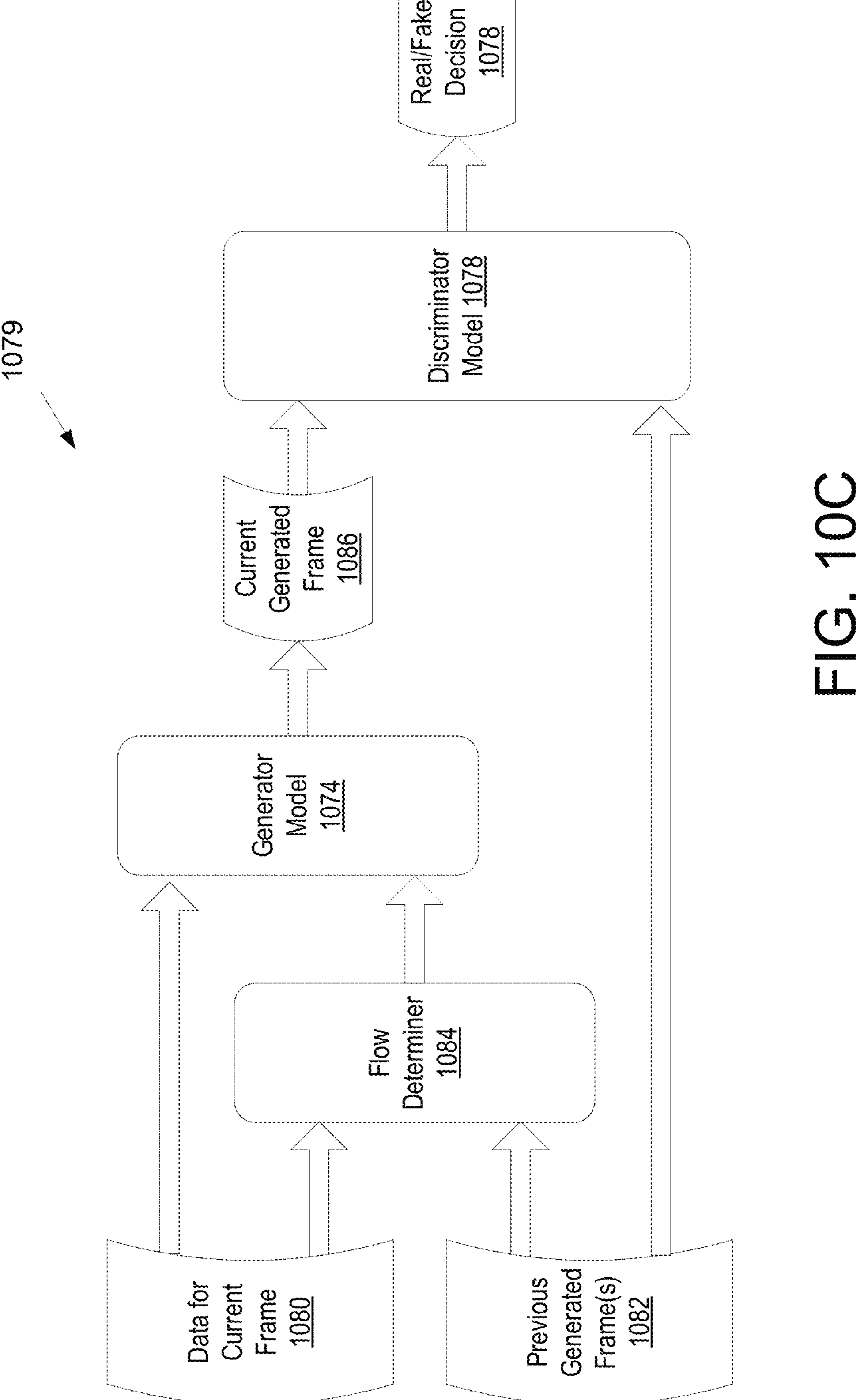
FIG. 10C illustrates training of a machine learning model to perform generation of modified images of faces, in accordance with an embodiment of the present disclosure.

FIG. 10C illustrates a training workflow 1079 for training of a machine learning model (e.g., generator model 1074) to perform generation of modified images of faces, in accordance with an embodiment of the present disclosure. In one embodiment, data for a current frame 1080 is input into a generator model 1074. Additionally, one or more previously generated frames 1082 and the data for the current frame 1080 is input into a flow determiner 1084, which outputs an optical flow to generator model 1074. The optical flow may be in an image space and/or in a feature space. The generator model 1074 processes the data for the current frame and the optical flow to output a current generated frame 1086.

A discriminator model 1078 may receive the current generator frame 1086 and/or the one or more previously generator frames 1082, and may make a determination based on the received current and/or past generated frames as to whether the frame or sequence of frames is real or fake. Discriminator model 1078 may then output the decision 1078 of whether the frame or sequence of frames was real or fake. The generator model 1074 and discriminator model 1078 may then be trained based on whether the decision of the discriminator model was correct or not.

Figure 10D:
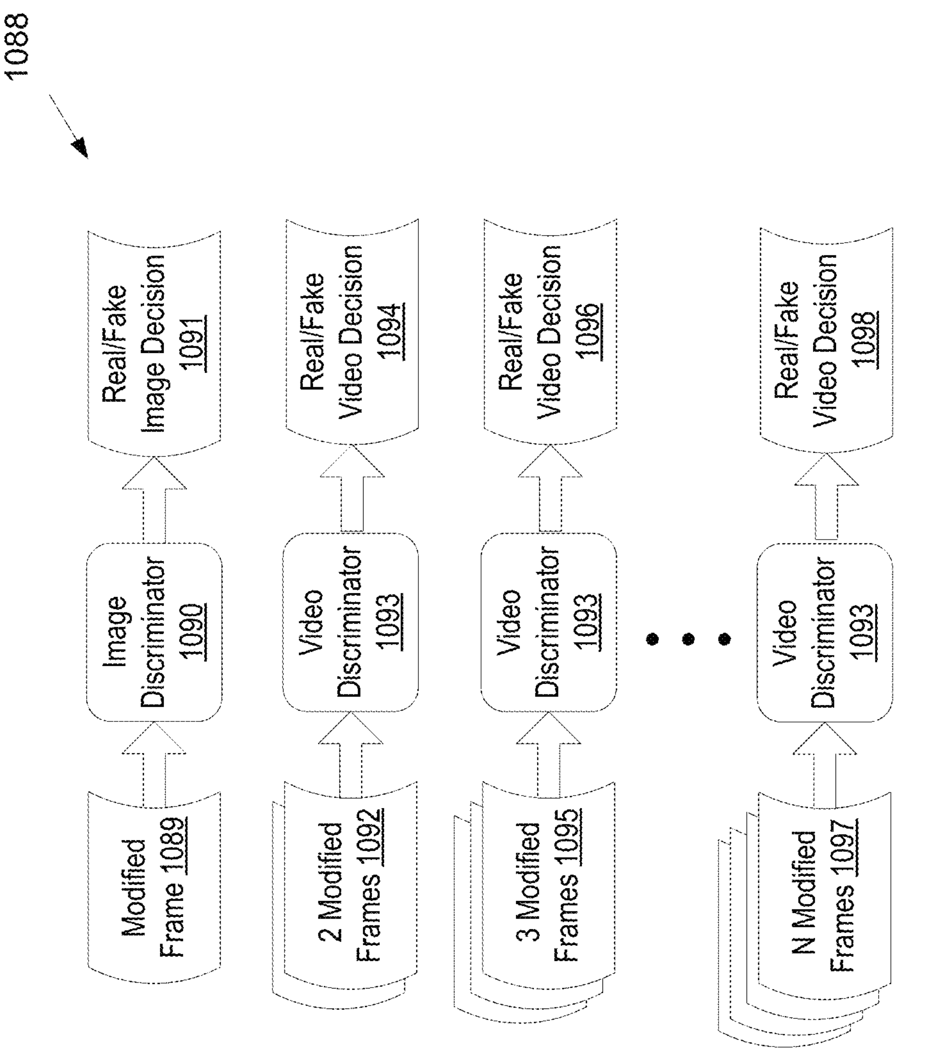
FIG. 10D illustrates training of a machine learning model to perform generation of modified images of faces, in accordance with an embodiment of the present disclosure.

FIG. 10D illustrates a training workflow 1088 for training of a machine learning model to perform discrimination of modified images of faces, in accordance with an embodiment of the present disclosure. In one embodiment, the training workflow 1088 begins with training an image discriminator 1090 on individual frames (e.g., modified frame 1089). After being trained, the image discriminator 1090 may accurately discern whether a single input frame is real or fake and output a real/fake image decision 1091. A corresponding generator may be trained in parallel to the image discriminator 1090.

After the image discriminator 1090 is trained on individual frames, an instance of the image discriminator may be retrained using pairs of frames (e.g., 2 modified frames 1092) to produce aa video discriminator 1093 that can make decisions (e.g., real/fake decision 1094) as to whether pairs of frames are real or fake. A corresponding generator may be trained in parallel to the video discriminator 1093.

After the video discriminator 1093 is trained on pairs of frames, the video discriminator may be retrained using sets of three frames (e.g., 3 modified frames 1095). The video discriminator 1093 is thereby converted into a video discriminator that can make decisions (e.g., real/fake decision 1096) as to whether sets of three frames are real or fake. A corresponding generator may be retrained in parallel to the video discriminator 1093.

This process may be repeated up through sets of n frames. After a final training sequence, video discriminator 1093 may be trained to determine whether sequences of n modified frames 1097 are real or fake and to output real/fake decision 1098. A corresponding generator may be retrained in parallel to the video discriminator 1093. With each iteration, the generator becomes better able to generate modified video frames that are temporally consistent with other modified video frames in a video.

In some embodiments, separate discriminators are trained for images, pairs of frames, sets of three frames, sets of four frames, and/or sets of larger numbers of frames. Some or all of these discriminators may be used in parallel during training of a generator in embodiments.

Figure 22:
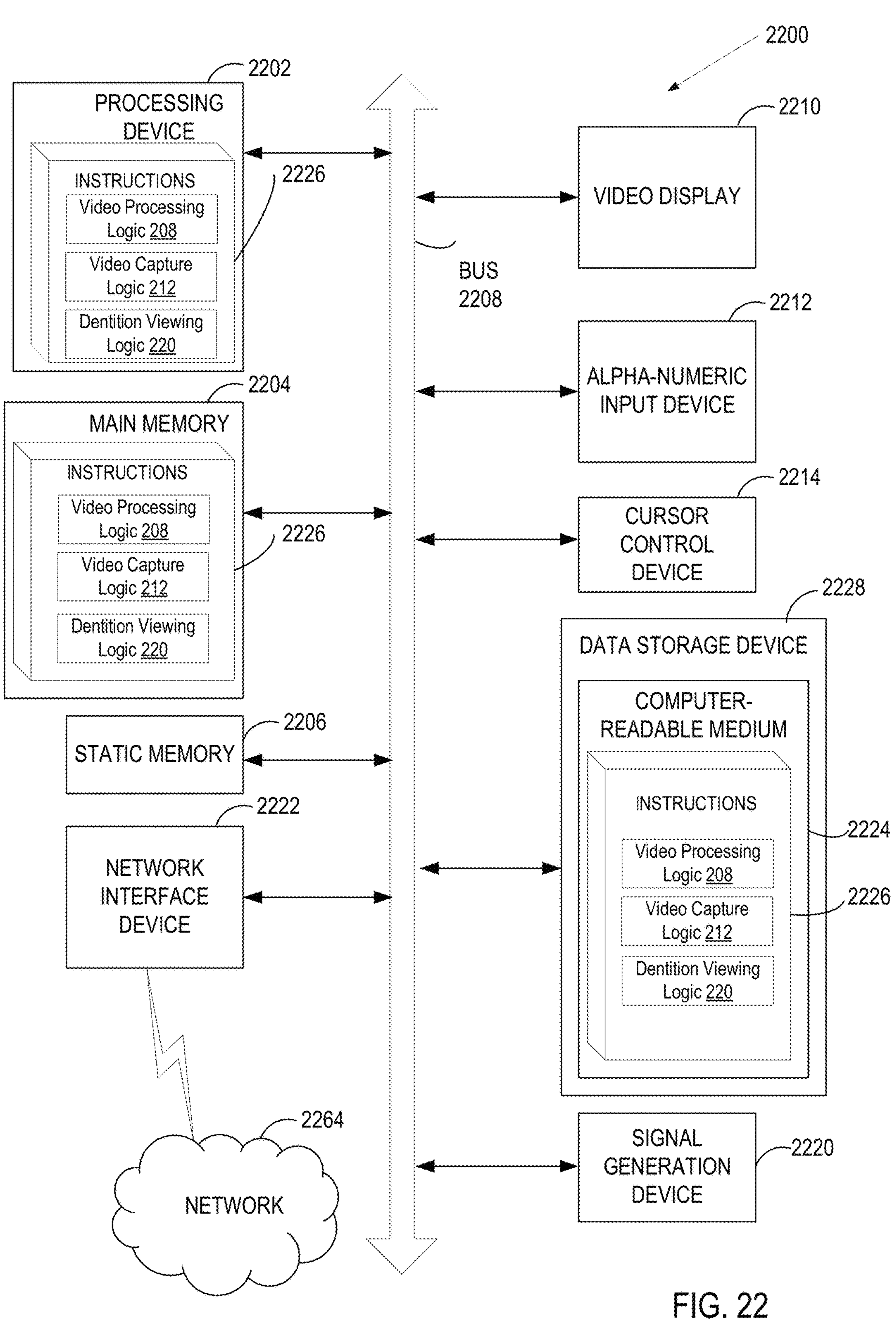
FIG. 22 illustrates a block diagram of an example computing device, in accordance with embodiments of the present disclosure.

FIGS. 11-19 below describe methods associated with generating modified videos of a patient's smile, assessing quality of a video of a patient's smile, guiding the capture of high quality videos of a patient's smile, and so on, in accordance with embodiments of the present disclosure. Also described are methods associated with generating modified videos of other subjects, which may be people, landscapes, buildings, plants, animals, and/or other types of subjects. The methods depicted in FIGS. 11-19 may be performed by a processing logic that may comprise hardware (e.g., circuitry, dedicated logic, programmable logic, microcode, etc.), software (e.g., instructions run on a processing device), or a combination thereof. Various embodiments may be performed by a computing device 205 as described with reference to FIG. 2 and/or by a computing device 2200 as shown in FIG. 22.

Figure 11:
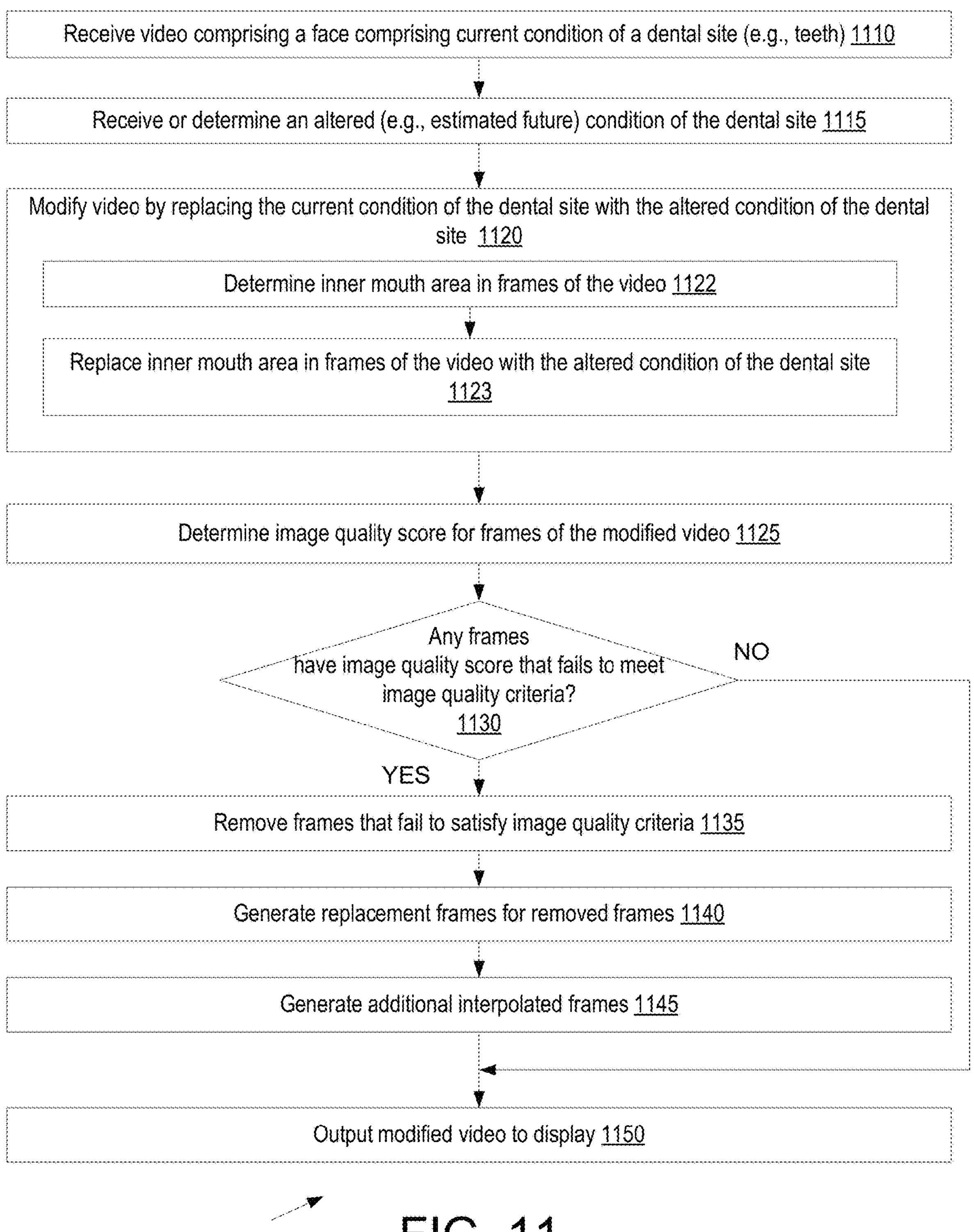
FIG. 11 illustrates a flow diagram for a method of generating a video of a dental treatment outcome, in accordance with an embodiment.

FIG. 11 illustrates a flow diagram for a method 1100 of generating a video of a dental treatment outcome, in accordance with an embodiment. At block 1110 of method 1100, processing logic receives a video of a face comprising a current condition of a dental site (e.g., a current condition of a patient's teeth). At block 1115, processing logic receives or determines an estimated future condition or other altered condition of the dental site. This may include, for example, receiving a treatment plan that includes 3D models of a current condition of a patient's dental arches and 3D models of a future condition of the patient's dental arches as they are expected to be after treatment. This may additionally or alternatively include receiving intraoral scans and using the intraoral scans to generate 3D models of a current condition of the patient's dental arches. The 3D models of the current condition of the patient's dental arches may then be used to generate post-treatment 3D models or other altered 3D models of the patient's dental arches. Additionally, or alternatively, a rough estimate of a 3D model of an individual's current dental arches may be generated based on the received video itself. Treatment planning estimation software or other dental alteration software may then process the generated 3D models to generate additional 3D models of an estimated future condition or other altered condition of the individual's dental arches. In one embodiment, the treatment plan is a detailed and clinically accurate treatment plan generated based on a 3D model of a patient's dental arches as produced based on an intraoral scan of the dental arches. Such a treatment plan may include 3D models of the dental arches at multiple stages of treatment. In one embodiment, the treatment plan is a simplified treatment plan that includes a rough 3D model of a final target state of a patient's dental arches, and is generated based on one or more 2D images and/or a video of the patient's current dentition (e.g., an image of a current smile of the patient).

At block 1120, processing logic modifies the received video by replacing the current condition of the dental site with the estimated future condition or other altered condition of the dental site. This may include at block 1122 determining the inner mouth area in frames of the video, and then replacing the inner mouth area in each of the frames with the estimated future condition of the dental site at block 1123. In embodiments, a generative model receives data from a current frame and optionally one or more previous frames and data from the 3D models of the estimated future condition or other altered condition of the dental arches, and outputs a synthetic or modified version of the current frame in which the original dental site has been replaced with the estimated future condition or other altered condition of the dental site.

In one embodiment, at block 1125 processing logic determines an image quality score for frames of the modified video. At block 1130, processing logic determines whether any of the frames have an image quality score that fails to meet an image quality criteria. In one embodiment, processing logic determines whether there are any sequences of consecutive frames in the modified video in which each of the frames of the sequence fails to satisfy the image quality criteria. If one or more frames (or a sequence of frames including at least a threshold number of frames) is identified that fails to meet the image quality criteria, the method may continue to block 1135. If all of the frames meet the image quality criteria (or no sequence of frames including at least a threshold number of frames fails to meet the image quality criteria), the method proceeds to block 1150.

At block 1135, processing logic removes one or more frames (e.g., a sequence of frames) that failed to satisfy the image quality criteria. Removing a sequence of frames may cause the modified video to become jumpy or jerky between some remaining frames. Accordingly, in one embodiment at block 1140 processing logic generates replacement frames for the removed frames. The replacement frames may be generated, for example, by inputting remaining frames before and after the removed frames into a generative model, which may output one or more interpolated intermediate frames. In one embodiment, processing logic determines an optical flow between a pair of frames that includes a first frame that occurs before the removed sequence of frames (or individual frame) and a second frame that occurs after the removed sequence of frames (or individual frame). In one embodiment, the generative model determines optical flows between the first and second frames and uses the optical flows to generate replacement frames that show an intermediate state between the pair of input frames. In one embodiment, the generative model includes a layer that generates a set of features in a feature space for each frame in a pair of frames, and then determines an optical flow between the set of features in the feature space and uses the optical flow in the feature space to generate a synthetic frame or image.

In one embodiment, at block 1145 one or more additional synthetic or interpolated frames may also be generated by the generative model described with reference to block 1140. In one embodiment, processing logic determines, for each pair of sequential frames (which may include a received frame and/or a simulated frame), a similarity score and/or a movement score. Processing logic may then determine whether the similarity score and/or movement score satisfies a stopping criterion. If for any pair of frames a stopping criterion is not met, one or more additional simulated frames are generated.

At block 1150, processing logic outputs a modified video showing the individual's face with the estimated future condition of the dental site rather than the current condition of the dental site. The frames in the modified video may be temporally stable and consistent.

Figure 12:
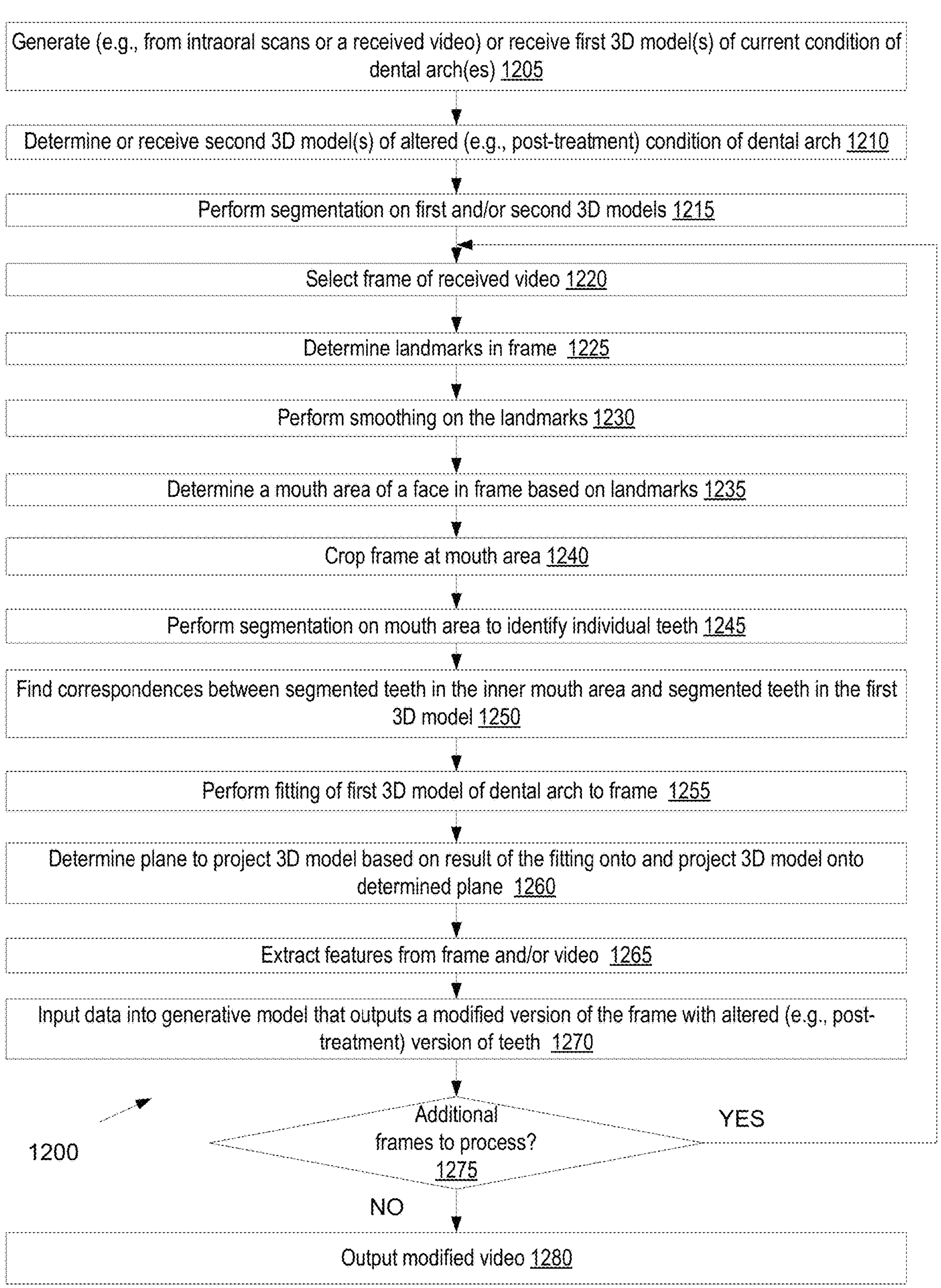
FIG. 12 illustrates a flow diagram for a method of generating a video of a dental treatment outcome, in accordance with an embodiment.

FIG. 12 illustrates a flow diagram for a method 1200 of generating a video of a dental treatment outcome, in accordance with an embodiment. Method 1200 may be performed, for example, at block 1120 of method 1100. At block 1205 of method 1200, processing logic generates or receives first 3D models of a current condition of an individual's dental arches. The first 3D models may be generated, for example, based on intraoral scans of the individual's oral cavity or on a received 2D video of the individual's smile.

At block 1210, processing logic determines or receives second 3D models of the individual's dental arches showing a post-treatment condition of the dental arches (or some other estimated future condition or other altered condition of the individual's dental arches).

At block 1215, processing logic performs segmentation on the first and/or second 3D models. The segmentation may be performed to identify each individual tooth, an upper gingiva, and/or a lower gingiva on an upper dental arch and on a lower dental arch.

At block 1220, processing logic selects a frame from a received video of a face of an individual. At block 1225, processing logic processes the selected frame to determine landmarks in the frame (e.g., such as facial landmarks). In one embodiment, a trained machine learning model is used to determine the landmarks. In one embodiment, at block 1230 processing logic performs smoothing on the landmarks. Smoothing may be performed to improve continuity of landmarks between frames of the video. In one embodiment, determined landmarks from a previous frame are input into a trained machine learning model as well as the current frame for the determination of landmarks in the current frame.

At block 1235, processing logic determines a mouth area (e.g., an inner mouth area) of the face based on the landmarks. In one embodiment, the frame and/or landmarks are input into a trained machine learning model, which outputs a mask identifying, for each pixel in the frame, whether or not that pixel is a part of the mouth area. In one embodiment, the mouth area is determined based on the landmarks without use of a further machine learning model. For example, landmarks for lips may be used together with an offset around the lips to determine a mouth area.

At block 1240, processing logic crops the frame at the determined mouth area. At block 1245, processing logic performs segmentation of the mouth area (e.g., of the cropped frame that includes only the mouth area) to identify individual teeth in the mouth area. Each tooth in the mouth area may be identified as a separate object and labeled. Additionally, upper and/or lower gingiva may also be identified and labeled. In some embodiments, an inner mouth area (e.g., a mouth area between upper and lower lips of an open mouth) is also determined by the segmentation. In some embodiments, a space between upper and lower teeth is also determined by the segmentation. In embodiments, the segmentation is performed by a trained machine learning model. The segmentation may result in the generation of one or more masks that provide useful information for generation of a synthetic image that will show an estimated future condition of a dental site together with a remainder of a frame of a video. Generated masks may include an inner mouth area mask that includes, for each pixel of the frame, an indication as to whether that pixel is part of an inner mouth area. Generated masks may include a map that indicates the space within an inner mouth area that shows the space between teeth in the upper and lower dental arch. Other maps may also be generated. Each map may include one or more sets of pixel locations (e.g., x and y coordinates for pixel locations), where each set of pixel locations may indicate a particular class of object or a type of area.

At block 1250, processing logic finds correspondences between the segmented teeth in the mouth area and the segmented teeth in the first 3D model. At block 1255, processing logic performs fitting of the first 3D model of the dental arch to the frame based on the determined correspondences. The fitting may be performed to minimize one or more cost terms of a cost function, as described in greater detail above. A result of the fitting may be a position and orientation of the first 3D model relative to the frame that is a best fit (e.g., a 6D parameter that indicates rotation about three axes and translation along three axes).

At block 1260, processing logic determines a plane to project the second 3D model onto based on a result of the fitting. Processing logic then projects the second 3D model onto the determined plane, resulting in a sketch in 2D showing the contours of the teeth from the second 3D model (e.g., the estimated future condition of the teeth from the same camera perspective as in the frame). A 3D virtual model showing the estimated future condition of a dental arch may be oriented such that the mapping of the 3D virtual model into the 2D plane results in a simulated 2D sketch of the teeth and gingiva from a same perspective from which the frame was taken.

At block 1265, processing logic extracts one or more features of the frame. Such extracted features may include, for example, a color map including colors of the teeth and/or gingiva without any contours of the teeth and/or gingiva. In one embodiment, each tooth is identified (e.g., using the segmentation information of the cropped frame), and color information is determined separately for each tooth. For example, an average color may be determined for each tooth and applied to an appropriate region occupied by the respective tooth. The average color for a tooth may be determined, for example, based on Gaussian smoothing the color information for each of the pixels that represents that tooth. The features may additionally or alternatively be smoothed across frames. For example, in one embodiment the color of the tooth is not only extracted based on the current frame but is additionally smoothed temporally.

In some embodiments, optical flow is determined between the estimated future condition of the teeth for the current frame and a previously generated frame (that also includes the estimated future condition of the teeth). The optical flow may be determined in the image space or in a feature space.

At block 1270, processing logic inputs data into a generative model that then outputs a modified version of the current frame with the post-treatment (or other estimated future condition or other altered condition) of the teeth. The input data may include, for example, the current frame, one or more generated or synthetic previous frames, a mask of the inner mouth area for the current frame, a determined optical flow, a color map, a normals map, a sketch of the post-treatment condition or other altered condition of the teeth, a second mask that identifies a space between teeth of an upper dental arch and teeth of a lower dental arch, and so on. A shape of the teeth in the new simulated frame may be based on the sketch of the estimated future condition or other altered condition of the teeth and a color of the teeth (and optionally gingiva) may be based on the color map (e.g., a blurred color image containing a blurred color representation of the teeth and/or gingiva).

At block 1275, processing logic determines whether there are additional frames of the video to process. If there are additional frames to process, then the method returns to block 1220 and a next frame is selected. If there are no further frames to process, the method proceeds to block 1280 and a modified video showing the estimated future condition of a dental site is output.

In some embodiments, method 1200 is performed in such a manner that the sequence of operations is performed one frame at a time. For example, the operations of blocks 1220-1270 in sequence for a first frame before repeating the sequence of operations for a next frame, as illustrated. This technique could be used, for example, for live processing since an entire video may not be available when processing current frames. In some embodiments, the operations of block 1220 are performed on all or multiple frames, and once the operation has been performed on those frames, the operations of block 1225 are performed on the frames before proceeding to block 1230, and so on. Accordingly, the operations of a particular step in an image processing pipeline may be performed on all frames before moving on to a next step in the image processing pipeline in embodiments. One advantage of this technique is that each processing step can use information from the entire video, which makes it easier to achieve temporal consistency.

Figure 13:
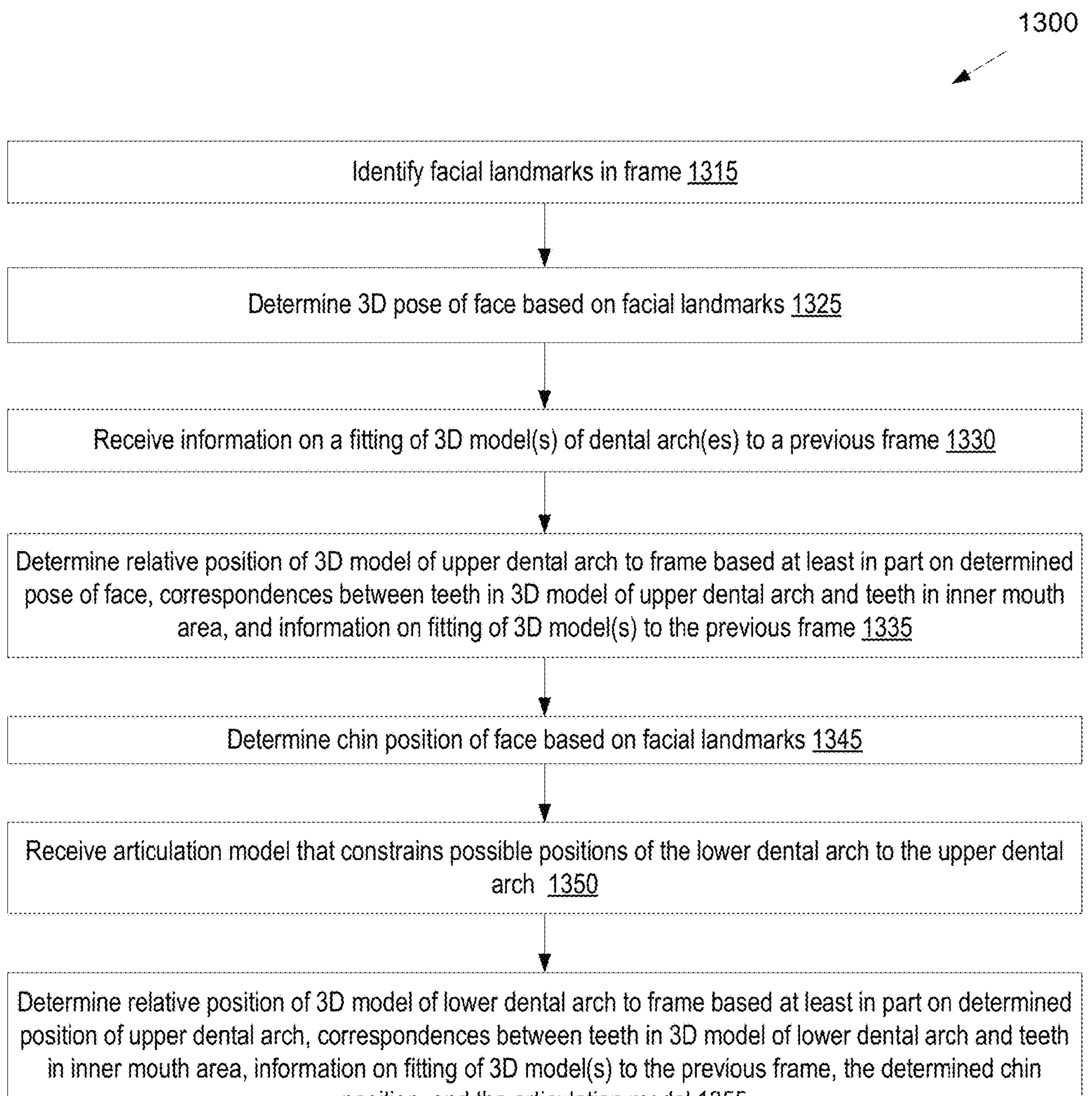
FIG. 13 illustrates a flow diagram for a method of fitting a 3D model of a dental arch to an inner mouth area in a video of a face, in accordance with an embodiment.

FIG. 13 illustrates a flow diagram for a method 1300 of fitting a 3D model of a dental arch to an inner mouth area in a video of a face, in accordance with an embodiment. In one embodiment, method 1300 is performed at block 1225 of method 1200.

At block 1315 of method 1300, processing logic identifies facial landmarks in a frame of a video showing a face of an individual. At block 1325, processing logic determines a pose of the face based on the facial landmarks. At block 1330, processing logic receives a fitting of 3D models of upper and/or lower dental arches to a previous frame of the video. In some embodiments, for a first frame, processing logic applies an initialization step based on an optimization that minimizes the distance between the centers of 2D tooth segmentations and the centers 2D projections of the 3D tooth models.

At block 1335, processing logic determines a relative position of a 3D model of the upper dental arch to the frame based at least in part on the determined pose of the face, determined correspondences between teeth in the 3D model of the upper dental arch and teeth in an inner mouth area of the frame, and information on fitting of the 3D model(s) to the previous frame or frames. The upper dental arch may have a fixed position relative to certain facial features for a given individual. Accordingly, it may be much easier to perform fitting of the 3D model of the upper dental arch to the frame than to perform fitting of the lower dental arch to the frame. As a result, the 3D model of the upper dental arch may first be fit to the frame before the 3D model of the lower dental arch is fit to the frame. The fitting may be performed by minimizing a cost function that includes multiple cost terms, as is described in detail herein above.

At block 1345, processing logic determines a chin position of the face based on the determined facial landmarks. At block 1350, processing logic may receive an articulation model that constrains the possible positions of the lower dental arch to the upper dental arch. At block 1355, processing logic determines a relative position of the 3D model of the lower dental arch to the frame based at least in part on the determined position of the upper dental arch, correspondences between teeth in the 3D model of the lower dental arch and teeth in the inner mouth area of the frame, information on fitting of the 3D models to the previous frame, the determined chin position, and/or the articulation model. The fitting may be performed by minimizing a cost function that includes multiple cost terms, as is described in detail herein above.

The above description has been primarily focused on operations that may be performed to generate a modified version of an input video that shows the estimated future condition of an individual's teeth rather than a current condition of the individual's teeth. Many of the operations include the application of machine learning, which include trained machine learning models that were trained using videos and/or images generated under certain conditions. To produce modified videos having a highest possible quality, it can be useful to ensure that a starting video meets certain quality criteria. For example, it can be useful to ensure that a starting video includes as many conditions as possible that overlap with conditions of videos and/or images that were included in a training dataset used to train the various machine learning models used to generate a modified video.

Capturing videos constrained to specific scenarios is several magnitudes more complicated than for images. Image capturing systems can wait until all constraints are met, and capture an image in the correct moment. For videos this is not possible as it would cut the video into several parts. For example, if two constraints are face angle and motion blur, a subject should follow a defined movement but in a manner that avoids motion blur. The constraints may be contradictory in nature, and it may be very difficult to satisfy both constraints at the same time. However, stopping the recording of a video when one or more constraints stop being met would create a very unfriendly user experience and result in choppy videos that do not flow well.

Generation of a video that meets certain quality criteria is much more difficult than generation of an image that meets quality criteria because the video includes many frames, and a user moves, changes expressions, etc. during capture of the video. Accordingly, even when some frames of a video do satisfy quality criteria, other frames of the video may not satisfy quality criteria. In some embodiments a video capture logic (e.g., video capture logic 212 of FIG. 2) analyses received video and provides guidance on how to improve the video. The video capture logic may perform such analysis and provide such guidance in real time or on-the-fly as a video is being generated in embodiments.

Additionally, even when a video as a whole meets quality criteria, some frames of that video may still fail to meet the quality criteria. In such instances, the video capture logic is able to detect those videos that fail to satisfy quality criteria and determine how to present such frames and/or what to present instead of such frames.

Figure 14:
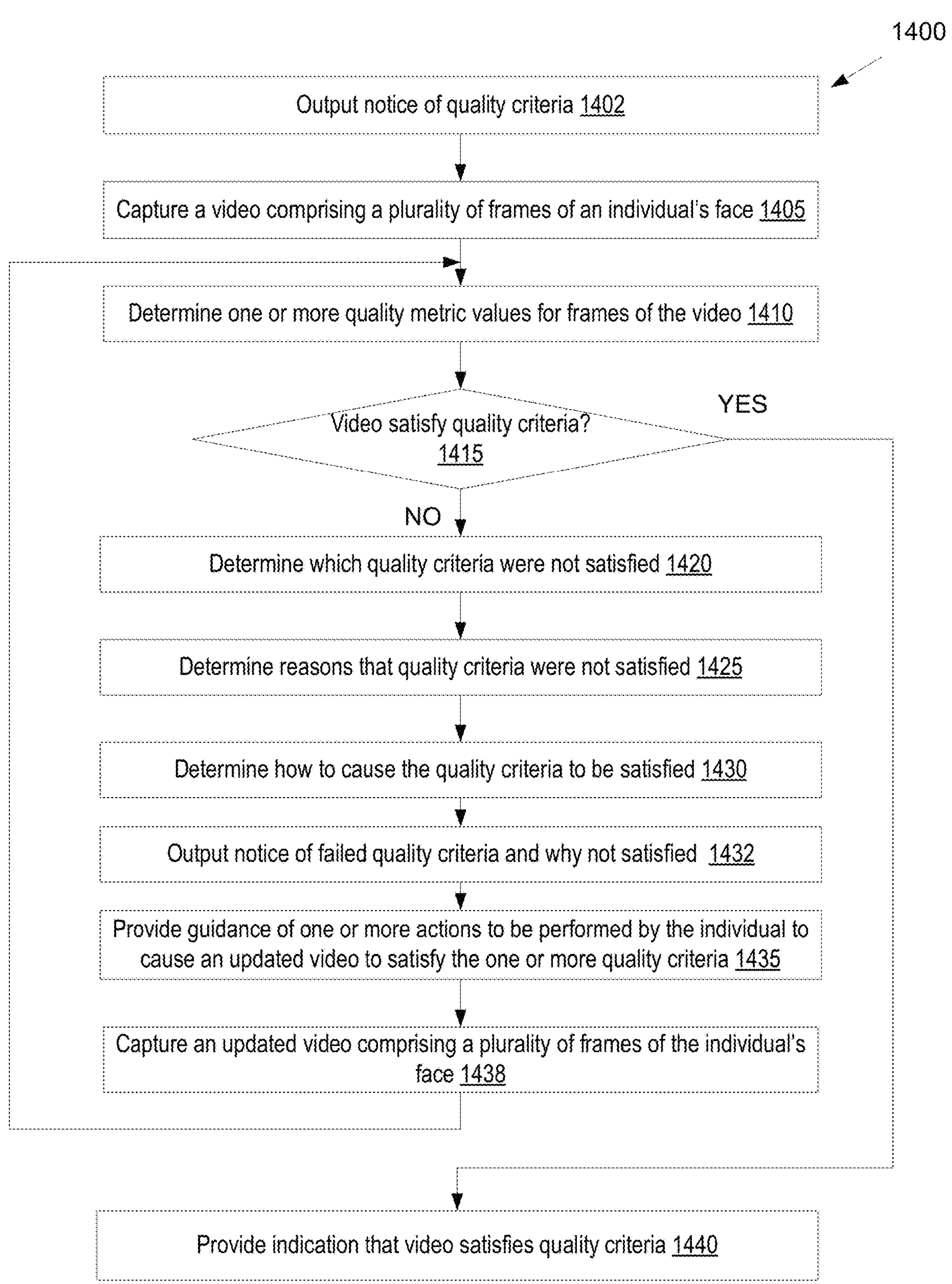
FIG. 14 illustrates a flow diagram for a method of providing guidance for capture of a video of a face, in accordance with an embodiment.

FIG. 14 illustrates a flow diagram for a method 1400 of providing guidance for capture of a video of a face, in accordance with an embodiment. At block 1402 of method 1400, processing logic outputs a notice of one or more quality criteria or constraints that videos should comply with. Examples of such constraints include a head pose constraint, a head movement speed constraint, a head position in frame constraint (e.g., that requires a face to be visible and/or approximately centered in a frame), a camera movement constraint, a camera stability constraint, a camera focus constraint, a mouth position constraint (e.g., for the mouth to be open), a jaw position constraint, a lighting conditions constraint, and so on. The capture constraints may have a characteristics that they are intuitively assessable by non-technical users and/or can be easily explained. For example, prior to capture of a video of a face an example ideal face video may be presented, with a graphical overlay showing one or more constraints and how they are or are not satisfied with each frame of the video. Accordingly, before a video is captured the constraints may be explained to the user by giving examples and clear instructions. Examples of instructions include look towards the camera, open mouth, smile, position head in a target position, and so on.

At block 1405, processing logic captures a video comprising a plurality of frames of an individual's face. At block 1410, processing logic determines one or more quality metric values for frames of the video. The quality metric values may include, for example, a head pose value, a head movement speed value, a head position in frame value, a camera movement value, a camera stability value, a camera focus value, a mouth position value, a jaw position value, a lighting conditions value, and so on. In embodiments, multiple techniques may be used to assess quality metric values for frames of the video.

In one embodiment, frames of the video are input into a trained machine learning model that determines landmarks (e.g., facial landmarks) of the frames, and/or performs face detection. Based on such facial landmarks determined for a single frame or for a sequence of frames, processing logic determines one or more of a head pose, a head movement speed, a head position, a mouth position and jaw position, and so on. Each of these determined properties may then be compared to a constraint or quality criterion or rule. For example, a head pose constraint may require that a head have a head pose that is within a range of head poses. In another example, a head movement speed constraint may require that a head movement speed be below a movement speed threshold.

In one embodiment, an optical flow is computed between frames of the video. The optical flow can then be used to assess frame stability, which is usable to then estimate a camera stability score or value.

In one embodiment, one or more frames of the video are input into a trained machine learning model that outputs a blurriness score for the frame or frames. The trained machine learning model may output, for example, a motion blur value and/or a camera defocus value.

In one embodiment, one or more frames of the video are input into a trained machine learning model that outputs a lighting estimation.

At block 1415, processing logic determines whether the video satisfies one or more quality criteria (also referred to as quality metric criteria and constraints). If all quality criteria are satisfied by the video, the method proceeds to block 1440 and an indication is provided that the video satisfies the quality criteria (and is usable for processing by a video processing pipeline as described above). If one or more quality criteria are not satisfied by the video, or a threshold number of quality criteria are not satisfies by the video, the method continues to block 1420.

At block 1420, processing logic determines which of the quality criteria were not satisfied. At block 1425, processing logic then determines reasons that the quality criteria were not satisfied and/or a degree to which a quality metric value deviates from a quality criterion. At block 1430, processing logic determines how to cause the quality criteria to be satisfied. At block 1432, processing logic outputs a notice of one or more failed quality criteria and why the one or more quality criteria were not satisfied. At block 1435, processing logic may provide guidance of one or more actions to be performed by the individual being imaged to cause an updated video to satisfy the one or more quality criteria.

At block 1438, processing logic may capture an updated video comprising a plurality of frames of the individual's face. The updated video may be captured after the individual has made one or more corrections. The method may then return to block 1410 to begin assessment of the updated video. In one embodiment, processing logic provides live feedback on which constraints are met or not in a continuous fashion to a user capturing a video. In embodiments, the amount of time that it will take for a subject to respond and act after feedback is provided is taken into consideration. Accordingly, in some embodiments feedback to correct one or more issues is provided before quality metric values are outside of bounds of associated quality criteria. In one embodiment, there are upper and lower thresholds for each of the quality criteria. Recommendations may be provided once a lower threshold is passed, and a frame of a video may no longer be usable once an upper threshold is passed in an embodiment.

The provided feedback may include providing an overlay or visualizations that take advantage of color coding, error bars, etc. and/or of providing sound or audio signals. In one example, a legend may be provided showing different constraints with associated values and/or color codes indicating whether or not those constraints are presently being satisfied by a captured video (e.g., which may be a video being captured live). In one embodiment, a green color indicates that a quality metric value is within bounds of an associated constraint, a yellow color indicates that a quality metric value is within bounds of an associated constraint, and a red color indicates that a quality metric value is outside of the bounds of an associated constraint. In one embodiment, constraints are illustrated together with error bars, where a short error bar may indicate that a constraint is satisfied and a longer error bar may indicate an aspect or constraint that an individual should focus on (e.g., that the individual should perform one or more actions to improve). In one embodiment, a louder and/or higher frequency sound is used to indicate that one or more quality criteria are not satisfied, and a softer and/or lower frequency sound is used to indicate that all quality criteria are satisfied or are close to being satisfied.

In some embodiments, processing logic can additionally learn from behavior of a patient. For example, provided instructions may be "turn your head to the left", followed by "turn your head to the right". If the subject moves their head too fast to the left, then the subsequent instructions for turning the head to the right could be "please move your head to the right, but not as fast as you just did".

In some embodiments, for constraints based on the behavior of the patient processing logic can also anticipate a short set of future frames. For example, a current frame and/or one or more previous frames may be input into a generative model (e.g., a GAN), which can output estimated future frames and/or quality metric values for the future frames. Processing logic may determine whether any of the quality metric values for the future frames will fail to satisfy one or more quality criteria. If so, then recommendations may be output for changes for the subject to make even though the current frame might not violate any constraints. In an example, a range of natural acceleration of human head movements may be possible. With that information, instructions can be provided before constraints are close to being broken because the system can anticipate that the patient will not be able to stop a current action before a constraint is violated.

In some embodiments, processing logic does not impose any hard constraints on the video recording to improve usability. One drawback of this approach is that the video that is processed may include parts (e.g., sequences of frames) that do not meet all of the constraints, and will have to be dealt with differently than those parts that do satisfy the constraints.

In some embodiments, processing logic begins processing frames of a captured video using one or more components of the video processing workflow of FIG. 3. One or more of the components in the workflow include trained machine learning models that may output a confidence score that accompanies a primary output (e.g., of detected landmarks, segmentation information, etc.). The confidence score may indicate a confidence of anywhere from 0% confidence to 100% confidence. In embodiments, the confidence score may be used as a heuristic for frame quality.

In some embodiments, one or more discriminator networks (e.g., similar to a discriminator network of a GAN) may be trained to distinguish between training data and test data or live data. Such discriminators can evaluate how close the test or live data is to the training data. If the test data is considered to be different from data in a training set, the ability of trained ML models to operate on the test data is likely to be of a lower quality. Accordingly, such a discriminator may output an indication of whether test data (e.g., current video data) is part of a training dataset, and optionally a confidence of such a determination. If the discriminator outputs an indication that the test data is not part of the training set and with a high confidence, this may be used as a low quality metric score that fails to meet a quality metric criterion.

In some embodiments, classifiers can be trained with good and bad labels to identify a segment of frames with bad predictions directly without any intermediate representation on aspects like head pose. Such a determination may be made based on the assumption that a similar set of input frames always leads to bad results, and other similar input frames lead to good results.

In some embodiments, high inconsistency between predictions of consecutive frames can also help to identify difficult parts in a video. For this, optical flow could be run on the output frames and a consistency value may be calculated from the optical flow. The consistency value may be compared to a consistency threshold. A consistency value that meets or exceeds the consistency threshold may pass an associated quality criterion.

In some embodiments, quality metric values may be determined for each frame of a received video. Additionally, or alternatively, in some embodiments confidence scores are determined for each frame of a received video by processing the video by one or more trained machine learning models of video processing workflow 305. The quality metric values and/or confidence scores may be smoothed between frames in embodiments. The quality metric values and/or confidence scores may then be compared to one or more quality criteria after the smoothing.

In some embodiments, combined quality metric values and/or confidence scores are determined for a sequence of frames of a video. A moving window may be applied to the video to determine whether there are any sequences of frames that together fail to satisfy one or more quality criteria.

In some embodiments, if fewer than a threshold number of frames have bad quality like motion blur (e.g., have one or more quality metric values that fail to satisfy an associated quality criterion), then before and after frames with good quality (e.g., that do satisfy the associated quality criterion) can be used to generate intermediate frames with generative models such as GANs.

In some embodiments, if a small number of frames fail to match the constraints (e.g., fail to satisfy the quality criteria), a frame that did satisfy the quality criteria that was immediately before the frame or frames that failed to satisfy the quality criteria may be shown instead of the frame that failed to satisfy the quality criteria. Accordingly, in some embodiments, a bad frame may be replaced with a nearby good frame, such that the good frame may be used for multiple frames of the video.

In some embodiments, textual messages like "Face angle out of bounds" can be output in the place of frames that failed to satisfy the quality criteria. The textual messages may explain to the user why no processing result is available.

In some embodiments, intermediate quality scores can be used to alpha blend between input and output. This would ensure a smooth transition between processed and unprocessed frames.

Figure 15:
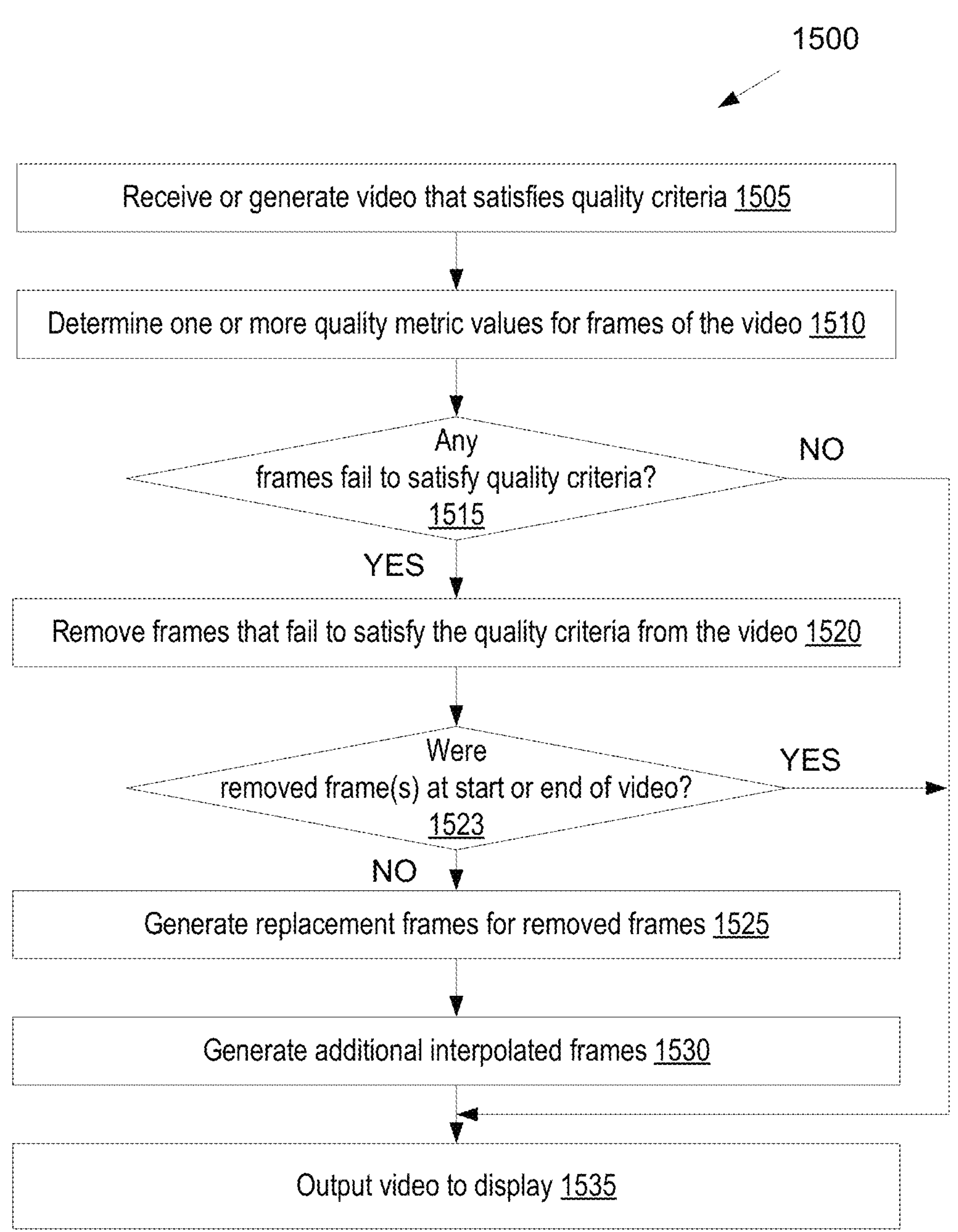
FIG. 15 illustrates a flow diagram for a method of editing a video of a face, in accordance with an embodiment.

FIG. 15 illustrates a flow diagram for a method 1500 of editing a video of a face, in accordance with an embodiment. In some embodiments, method 1500 is performed on a video after the video has been assessed as having sufficient quality (e.g., after processing the video according to method 1400) and before processing the video using video processing workflow 305 of FIG. 3.

At block 1505 of method 1500, processing logic receives or generates a video that satisfies one or more quality criteria. At block 1510, processing logic determines one or more quality metric values for each frame of the video. The quality metric values may be the same quality metric values discussed with relation to method 1400. At block 1515, processing logic determines whether any of the frames of the video fail to satisfy the quality criteria. If no frames fail to satisfy the quality criteria, the method proceeds to block 1535. If any frame fails to satisfy the quality criteria, the method continues to block 1520.

At block 1520, processing logic removes those frames that fail to satisfy the quality criteria. This may include removing a single frame at a portion of the video and/or removing a sequence of frames of the video.

At block 1523, processing logic may determine whether the removed low quality frame or frames were at the beginning or end of the video. If so, then those frames may be cut without replacing the frames since the frames can be cut without a user noticing any skipped frames. If all of the removed frames were at a beginning and/or end of the video then the method proceeds to block 1535. If one or more of the removed frames were between other frames of the video that were not also removed, then the method continues to block 1525.

In some embodiments, processing logic defines a minimum length video and determines if there is a set of frames/part of the video that satisfies the quality criteria. If a set of frames that is at least the minimum length satisfies the quality criteria, then a remainder of the video may be cut, leaving the set of frames that satisfied the quality criteria. The method may then proceed to block 1535. For example, a 30 second video may be recorded. An example minimum length video parameter is 15 seconds. Assume that there are frames that don't meet the criteria at second 19. This is still in the middle, but processing logic can return only seconds 1-18 (>15) and meet a minimum length video. In such an instance, processing logic may then proceed to block 1535.

At block 1525, processing logic generates replacement frames for the removed frames that were not at the beginning or end of the video. This may include inputting frames on either end of the removed frame (e.g., a before frame and an after frame) into a generative model, which may output one or more interpolated frames that replace the removed frame or frames. At block 1530, processing logic may generate one or more additional interpolated frames, such as by inputting a previously interpolated frame and the before or after frame (or two previously interpolated frames) into the generative model to generate one or more additional interpolated frames. This process may be performed, for example, to increase a frame rate of the video and/or to fill in sequences of multiple removed frames.

At block 1535, processing logic outputs the updated video to a display. Additionally, or alternatively, processing logic may input the updated video to video processing pipeline 305 of FIG. 3 for further processing.

Figure 16:
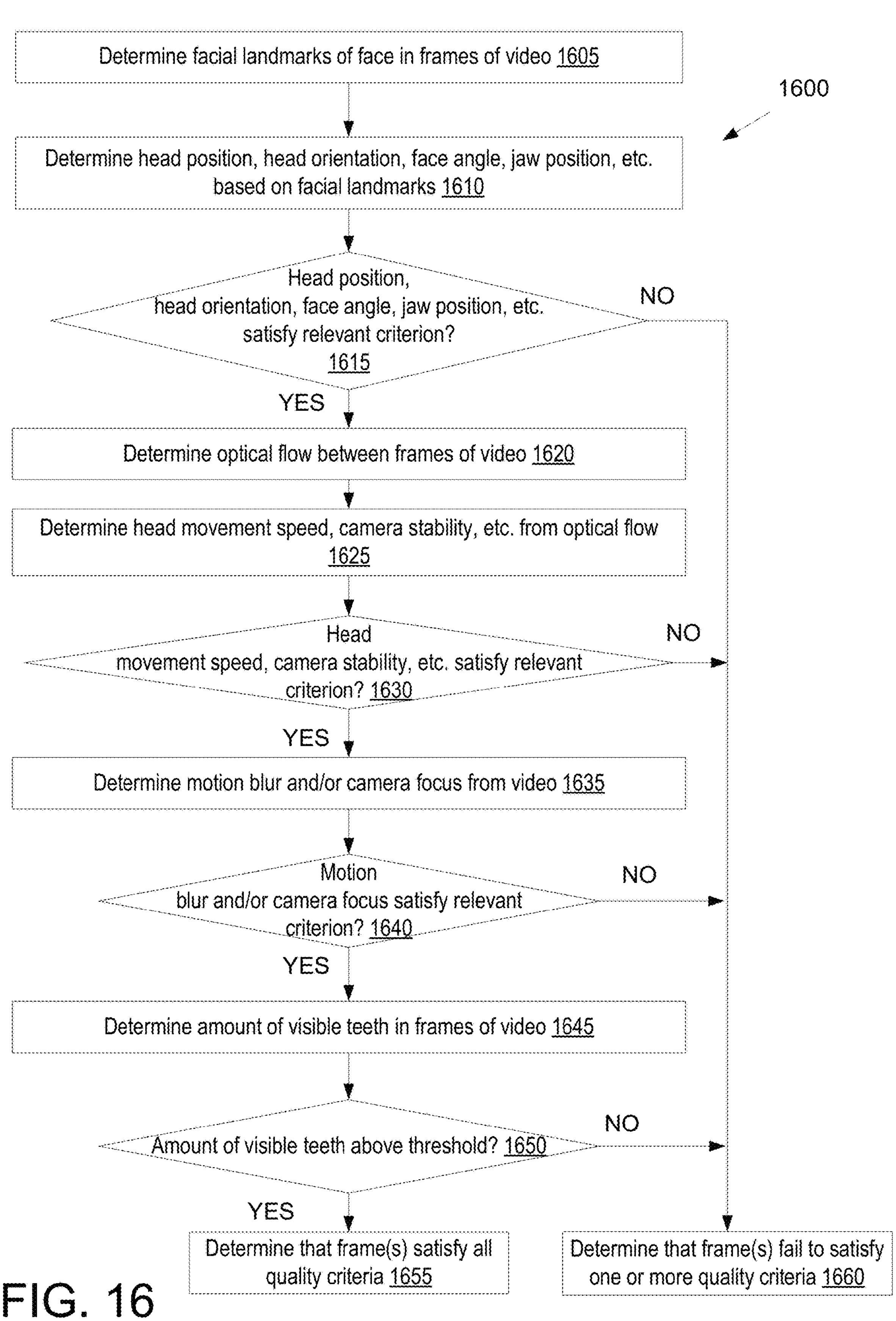
FIG. 16 illustrates a flow diagram for a method of assessing quality of one or more frames of a video of a face, in accordance with an embodiment.

FIG. 16 illustrates a flow diagram for a method 1600 of assessing quality of one or more frames of a video of a face, in accordance with an embodiment. Method 1600 may be performed, for example, at blocks 1410-1415 of method 1400 and/or at blocks 1510-1515 of method 1500 in embodiments.

In one embodiment, at block 1605 processing logic determines facial landmarks in frames of a video, such as by inputting the frames of the video into a trained machine learning model (e.g., a deep neural network) trained to identify facial landmarks in images of faces. At block 1610, processing logic determines multiple quality metric values, such as for a head position, head orientation, face angle, jaw position, etc. based on the facial landmarks. In one embodiment, one or more layers of the trained machine learning model that performs the landmarking determine the head position, head orientation, face angle, jaw position, and so on.

At block 1615, processing logic may determine whether the head position is within bounds of a head position constraint/criterion, whether the head orientation is within bounds of a head orientation constraint/criterion, whether the face angle is within bounds of a face angle constraint/criterion, whether the jaw position is within bounds of a jaw position constraint/criterion, and so on. If the head position, head orientation, face angle, jaw position, etc. satisfy the relevant criteria, then the method may continue to block 1620. If any or optionally a threshold number of the determined quality metric values fail to satisfy the relevant criteria, then at block 1660 processing logic may determine that the frame or frames fail to satisfy one or more quality criteria.

At block 1620, processing logic may determine an optical flow between frames of the video. At block 1625, processing logic may determine head movement speed, camera stability, etc. based on the optical flow.

At block 1630, processing logic may determine whether the head movement speed is within bounds of a head motion speed constraint/criterion, whether the camera stability is within bounds of a camera stability constraint/criterion, and so on. If the head movement speed, camera stability, etc. satisfy the relevant criteria, then the method may continue to block 1635. If any or optionally a threshold number of the determined quality metric values fail to satisfy the relevant criteria, then at block 1660 processing logic may determine that the frame or frames fail to satisfy one or more quality criteria.

At block 1635, processing logic may determine a motion blur and/or camera focus from the video. In one embodiment, the motion blur and/or camera focus are determined by inputting one or more frames into a trained machine learning model that outputs a motion blur score and/or a camera focus score.

At block 1640, processing logic may determine whether the motion blur is within bounds of a motion blur constraint/criterion, whether the camera focus is within bounds of a camera focus constraint/criterion, and so on. If the motion blur, camera focus, etc. satisfy the relevant criteria, then the method may continue to block 1645. If any or optionally a threshold number of the determined quality metric values fail to satisfy the relevant criteria, then at block 1660 processing logic may determine that the frame or frames fail to satisfy one or more quality criteria.

At block 1645, processing logic may determine an amount of visible teeth in one or more frames of the video. The amount of visible teeth in a frame may be determined by inputting the frame into a trained machine learning model that has been trained to identify teeth in images, and determining a size of a region classified as teeth. In one embodiment, an amount of visible teeth is estimated using landmarks determined at block 1605. For example, landmarks for an upper lip and landmarks for a lower lip may be identified, and a distance between the landmarks for the upper lip and the landmarks for the lower lip may be computed. The distance may be used to estimate an amount of visible teeth in the frame. Additionally, the distance may be used to determine a mouth opening value, which may also be another constraint.

If the amount of visible teeth is above a threshold (and/or a distance between upper and lower teeth is above a threshold), then processing logic may determine that a visible teeth criterion is satisfied, and the method may continue to block 1655. Otherwise the method may continue to block 1660.

At block 1655, processing logic determines that one or more processed frames of the video (e.g., all processed frames of the video) satisfy all quality criteria. At block 1660, processing logic determines that one or more processed frames of the video fail to satisfy one or more quality criteria. Note that in embodiments, the quality checks associated with blocks 1630, 1640, 1650, etc. are made for a given frame regardless of whether or not that frame passed one or more previous quality checks. Additionally, the quality checks of blocks 1615, 1630, 1640, 1650 may be performed in a different order or in parallel.

The preceding description has focused primarily on the capture and modification of videos of faces in order to show estimated future conditions of subject's teeth in the videos. However, the techniques and embodiments described with reference to faces and teeth also apply to many other fields and subjects. The same or similar techniques may also be applied to modify videos of other types of subjects to modify a condition of one or more aspects or features of the subjects to show how those aspects or features might appear in the future. For example, a video of a landscape, cityscape, forest, desert, ocean, shorefront, building, etc. may be processed according to described embodiments to replace a current condition of one or more subjects in the video of the landscape, cityscape, forest, desert, ocean, shorefront, building, etc. with an estimated future condition of the one or more subjects. In another example, a current video of a person or face may be modified to show what the person or face might look like if they gained weight, lost weight, aged, suffered from a particular ailment, and so on.

There are at least two options on how to combine video simulation and criteria checking on videos in embodiments described herein. In a first option, processing logic runs a video simulation on a full video, and then selects a part of the simulated video that meets quality criteria. Such an option is described below with reference to FIG. 17. In a second option, a part of a video that meets quality criteria is first selected, and then video simulation is run on the selected part of the video. In some embodiments, option 1 and option 2 are combined. For example, portions of an initial video meeting quality criteria may be selected and processed to generate a simulated video, and then a portion of the simulated video may be selected for showing to a user.

Figure 17:
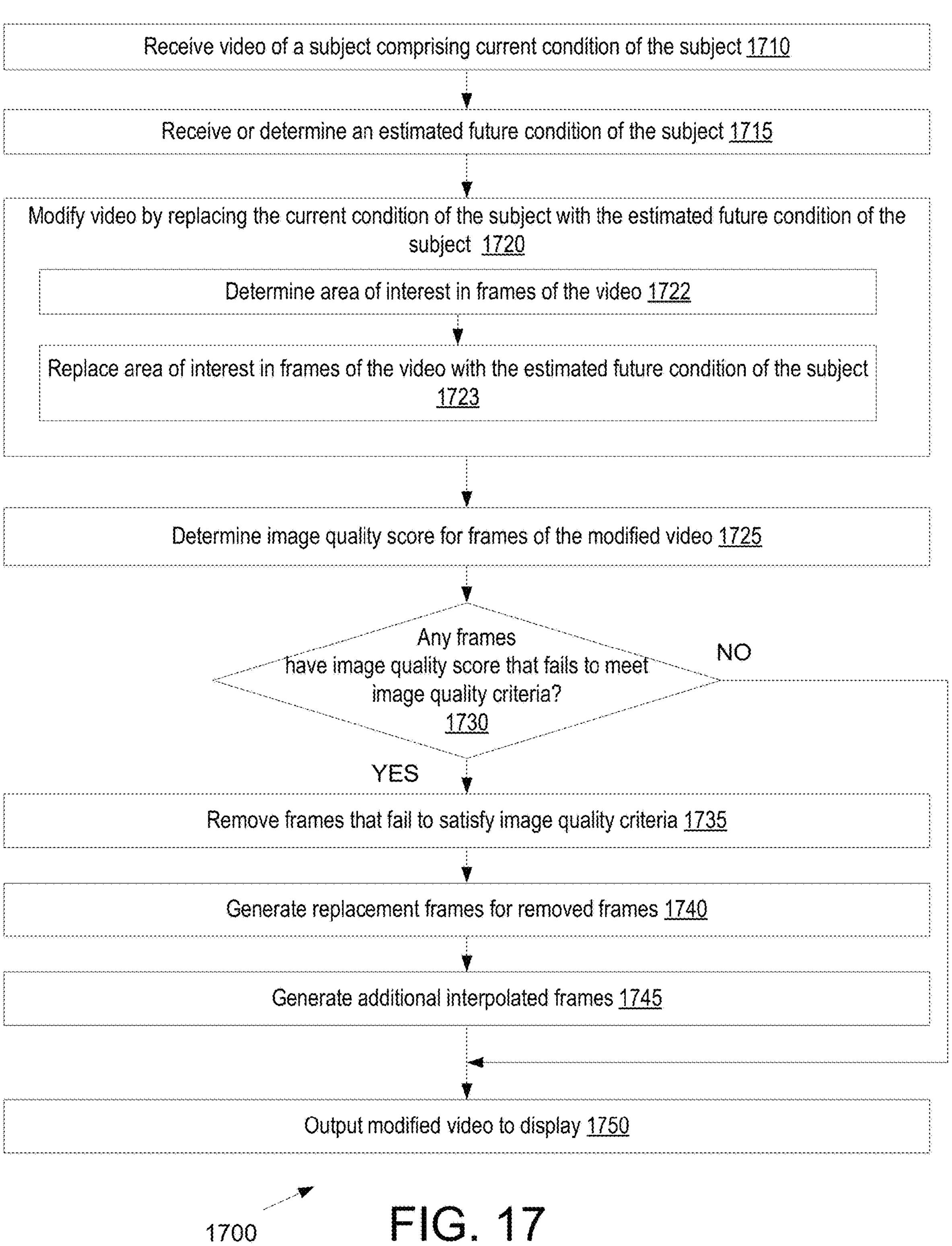
FIG. 17 illustrates a flow diagram for a method of generating a video of a subject with an estimated future condition of the subject, in accordance with an embodiment.

FIG. 17 illustrates a flow diagram for a method 1700 of generating a video of a subject with an estimated future condition of the subject (or an area of interest of the subject), in accordance with an embodiment. At block 1710 of method 1700, processing logic receives a video of a subject comprising a current condition of the subject (e.g., a current condition of an area of interest of the subject). At block 1715, processing logic receives or determines an estimated future condition of the subject (e.g., of the area of interest of the subject). This may include, for example, receiving a 3D model of a current condition of the subject and/or a 3D model of an estimated future condition of the subject.

At block 1720, processing logic modifies the received video by replacing the current condition of the subject with the estimated future condition of the subject. This may include at block 1722 determining an area of interest of the subject in frames of the video, and then replacing the area of interest in each of the frames with the estimated future condition of the area of interest at block 1723. In embodiments, a generative model receives data from a current frame and optionally one or more previous frames and data from the 3D model of the estimated future condition of the subject, and outputs a synthetic or modified version of the current frame in which the original area of interest has been replaced with the estimated future condition of the area of interest.

In one embodiment, at block 1725 processing logic determines an image quality score for frames of the modified video. At block 1730, processing logic determines whether any of the frames have an image quality score that fails to meet an image quality criteria. In one embodiment, processing logic determines whether there are any sequences of consecutive frames in the modified video in which each of the frames of the sequence fails to satisfy the image quality criteria. If one or more frames (or a sequence of frames including at least a threshold number of frames) is identified that fails to meet the image quality criteria, the method may continue to block 1735. If all of the frames meet the image quality criteria (or no sequence of frames including at least a threshold number of frames fails to meet the image quality criteria), the method proceeds to block 1750.

At block 1735, processing logic removes one or more frames (e.g., a sequence of frames) that failed to satisfy the image quality criteria. Removing a sequence of frames may cause the modified video to become jumpy or jerky between some remaining frames. Accordingly, in one embodiment at block 1740 processing logic generates replacement frames for the removed frames. The replacement frames may be generated, for example, by inputting remaining frames before and after the removed frames into a generative model, which may output one or more interpolated intermediate frames. In one embodiment, processing logic determines an optical flow between a pair of frames that includes a first frame that occurs before the removed sequence of frames (or individual frame) and a second frame that occurs after the removed sequence of frames (or individual frame). In one embodiment, the generative model determines optical flows between the first and second frames and uses the optical flows to generate replacement frames that show an intermediate state between the pair of input frames. In one embodiment, the generative model includes a layer that generates a set of features in a feature space for each frame in a pair of frames, and then determines an optical flow between the set of features in the feature space and uses the optical flow in the feature space to generate a synthetic frame or image.

In one embodiment, at block 1745 one or more additional synthetic or interpolated frames may also be generated by the generative model described with reference to block 1740. In one embodiment, processing logic determines, for each pair of sequential frames (which may include a received frame and/or a simulated frame), a similarity score and/or a movement score. Processing logic may then determine whether the similarity score and/or movement score satisfies a stopping criterion. If for any pair of frames a stopping criterion is not met, one or more additional simulated frames are generated.

At block 1750, processing logic outputs a modified video showing the subject with the estimated future condition of the area of interest rather than the current condition of the dental site. The frames in the modified video may be temporally stable and consistent.

Figure 18:
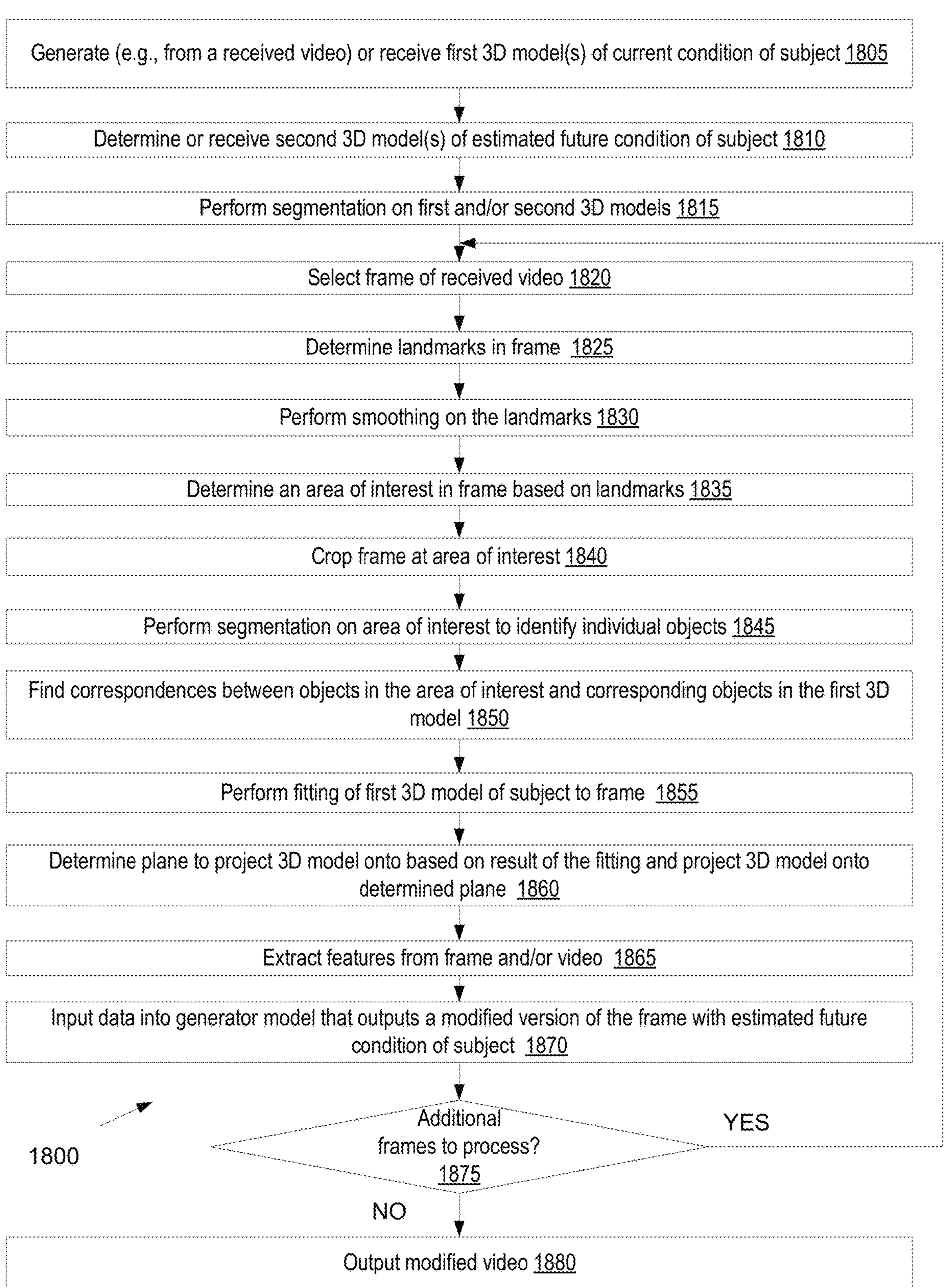
FIG. 18 illustrates a flow diagram for a method of generating a video of a subject with an estimated future condition of the subject, in accordance with an embodiment.

FIG. 18 illustrates a flow diagram for a method 1800 of generating a video of a subject with an estimated future condition of the subject, in accordance with an embodiment. Method 1800 may be performed, for example, at block 1720 of method 1700. At block 1805 of method 1800, processing logic may generate or receive a first 3D model of a current condition of a subject. The first 3D models may be generated, for example, based on generating 3D images of the subject, such as with the use of stereo camera, structured light projection, and/or other 3D imaging techniques.

At block 1810, processing logic determines or receives second 3D models of the subject showing an estimated future condition of the subject (e.g., an estimated future condition of one or more areas of interest of the subject).

At block 1815, processing logic performs segmentation on the first and/or second 3D models. The segmentation may be performed, for example, by inputting the 3D models or projections of the 3D models onto a 2D plane into a trained machine learning model trained to perform segmentation.

At block 1820, processing logic selects a frame from a received video of the subject. At block 1825, processing logic processes the selected frame determine landmarks in the frame. In one embodiment, a trained machine learning model is used to determine the landmarks. In one embodiment, at block 1830 processing logic performs smoothing on the landmarks. Smoothing may be performed to improve continuity of landmarks between frames of the video. In one embodiment, determined landmarks from a previous frame are input into a trained machine learning model as well as the current frame for the determination of landmarks in the current frame.

At block 1835, processing logic determines an area of interest of the subject based on the landmarks. In one embodiment, the frame and/or landmarks are input into a trained machine learning model, which outputs a mask identifying, for each pixel in the frame, whether or not that pixel is a part of the area of interest. In one embodiment, the area of interest is determined based on the landmarks without use of a further machine learning model.

At block 1840, processing logic may crop the frame at the determined area of interest. At block 1845, processing logic performs segmentation of the area of interest (e.g., of the cropped frame that includes only the area of interest) to identify objects within the area of interest. In embodiments, the segmentation is performed by a trained machine learning model. The segmentation may result in the generation of one or more masks that provide useful information for generation of a synthetic image that will show an estimated future condition of an area of interest of a subject together with a remainder of a frame of a video.

At block 1850, processing logic finds correspondences between the segmented objects in the area of interest and the segmented objects in the first 3D model. At block 1855, processing logic performs fitting of the first 3D model of the subject to the frame based on the determined correspondences. The fitting may be performed to minimize one or more cost terms of a cost function, as described in greater detail above. A result of the fitting may be a position and orientation of the first 3D model relative to the frame that is a best fit (e.g., a 6D parameter that indicates rotation about three axes and translation along three axes).

At block 1860, processing logic determines a plane to project the second 3D model onto based on a result of the fitting. Processing logic then projects the second 3D model onto the determined plane, resulting in a sketch in 2D showing the contours of the objects in the area of interest from the second 3D model (e.g., the estimated future condition of the area of interest from the same camera perspective as in the frame). A 3D virtual model showing the estimated future condition of area of interest may be oriented such that the mapping of the 3D virtual model into the 2D plane results in a simulated 2D sketch of the area of interest from a same perspective from which the frame was taken.

At block 1865, processing logic extracts one or more features of the frame. Such extracted features may include, for example, a color map including colors of the objects in the area of interest without any contours of the objects. In one embodiment, each object is identified (e.g., using the segmentation information of the cropped frame), and color information is determined separately for each object. For example, an average color may be determined for each object and applied to an appropriate region occupied by the respective object. The average color for an object may be determined, for example, based on Gaussian smoothing the color information for each of the pixels that represents that object.

In some embodiments, optical flow is determined between the estimated future condition of the object or subject for the current frame and a previously generated frame (that also includes the estimated future condition of the object or subject). The optical flow may be determined in the image space or in a feature space.

At block 1870, processing logic inputs data into a generative model that then outputs a modified version of the current frame with the estimated future condition of the area of interest for the subject. The input data may include, for example, the current frame, one or more generated or synthetic previous frames, a mask of the area of interest for the current frame, a determined optical flow, a color map, a normals map, a sketch of the estimated future condition of the subject and/or area of interest (e.g., objects in the area of interest), and so on. A representation of the area of interest and/or subject in the new simulated frame may be based on the sketch of the estimated future condition of the subject/area of interest and a color of the subject/area of interest may be based on the color map.

At block 1875, processing logic determines whether there are additional frames of the video to process. If there are additional frames to process, then the method returns to block 1820 and a next frame is selected. If there are no further frames to process, the method proceeds to block 1880 and a modified video showing the estimated future condition of the subject/area of interest is output.

FIG. 19 illustrates a flow diagram for a method 1900 of generating images and/or video having one or more subjects with altered dentition using a video or image editing application or service, in accordance with an embodiment. Method 1900 may be performed, for example, by a processing device executing a video or image editing application on a client device. Method 1900 may also be performed by a service executing on a server machine or cloud-based infrastructure. Embodiments have largely been described with reference to generating modified videos. However, many of the techniques described herein may also be used to generate modified images. The generation of modified images is much simpler than the generation of modified videos. Accordingly, many of the operations described herein with reference to generating modified videos may be omitted in the generation of modified images.

In one embodiment, at block 1910 of method 1900 processing logic receives one or more images (e.g., frames of a video) comprising a face of an individual. The images or frames may include a face of an individual showing a current condition of a dental site (e.g., teeth) of the individual. The images or frames may be of the face, or may be of a greater scene that also includes the individual. In an example, a received video may be a movie that is to undergo post production to modify the dentition of one or more characters in and/or actors for the movie. A received video or image may also be, for example, a home video or personal image that may be altered for an individual, such as for uploading to a social media site. In one embodiment, at block 1912 processing logic receives 3D models of the upper and/or lower dental arch of the individual. Alternatively, processing logic may generate such 3D models based on received intraoral scans and/or images (e.g., of smiles of the individual). In some cases, the 3D models may be generated from the images or frames received at block 1910.

If method 1900 is performed by a dentition alteration service, then the 3D models, images and/or frames (e.g., video) may be received from a remote device over a network connection. If method 1900 is performed by an image or video editing application executing on a computing device, then the 3D models, images and/or frames may be read from storage of the computing device or may be received from a remote device.

At block 1915, processing logic receives or determines an altered condition of the dental site. The altered condition of the dental site may be an estimated future condition of the dental site (e.g., after performance of orthodontic or prosthodontic treatment, or after failure to address one or more dental conditions) or some other altered condition of the dental site. Altered conditions of the dental site may include deliberate changes to the dental site that are not based on reality, any treatment, or any lack of treatment. For example, altered conditions may be to apply buck teeth the dental site, to apply a degraded state of the teeth, to file down the teeth to points, to replace the teeth with vampire teeth, to replace the teeth with tusks, to replace the teeth with shark teeth or monstrous teeth, to add caries to teeth, to remove teeth, to add rotting to teeth, to change a coloration of teeth, to crack or chip teeth, to apply malocclusion to teeth, and so on.

In one embodiment, processing logic provides a user interface for altering a dental site. For example, processing logic load the received or generated 3D models of the upper and/or lower dental arches and present the 3D models in the user interface. A user may then select individual teeth or groups of teeth and may move the one or more selected teeth (e.g., by dragging a mouse), may rotate the one or more selected teeth, may change one or more properties of the one or more selected teeth (e.g., changing a size, shape, color, presence of dental conditions such as caries, cracks, wear, stains, etc.), or perform other alterations to the selected one or more teeth. A user may also select to remove one or more selected teeth.

In one embodiment, at block 1920 processing logic provides a palette of options for modifications to the dental site (e.g., to the one or more dental arches) in the user interface. At block 1925 processing logic may receive selection of one or more modification to the dental site. At block 1930, processing logic may generate an altered condition of the dental site based on applying the selected one or more modifications to the dental site.

In one embodiment, a drop down menu may include options for making global modifications to teeth without a need for the user to manually adjust the teeth. For example, a user may select to replace the teeth with the teeth of a selected type of animal (e.g., cat, dog, bat, shark, cow, walrus, etc.) or fantastical creature (e.g., vampire, ogre, orc, dragon, etc.). A user may alternatively or additionally select to globally modify the teeth by adding generic tooth rotting, caries, gum inflammation, edentulous dental arches, and so on. Responsive to user inputs selecting how to modify the teeth at the dental site (e.g., on the dental arches), processing logic may determine an altered state of the dental site and present the altered state on a display for user approval. Responsive to receiving approval of the altered dental site, the method may proceed to block 1935.

In one embodiment, a local video or image editing application is used on a client device to generate an altered condition of the dental site, and the altered condition of the dental site (e.g., 3D models of an altered state of an individual's upper and/or lower dental arches) is provided to an image or video editing service along with a video or image. In one embodiment, a client device interacts with a remote image or video editing service to update the dental site.

At block 1935, processing logic modifies the images and/or video by replacing the current condition of the dental site with the altered condition of the dental site. The modification of the images/video may be performed in the same manner described above in embodiments. In one embodiment, at block 1940 processing logic determines an inner mouth area in frames of the received video (or images), and at block 1945 processing logic replaces the inner mouth area in the frames of the received video (or images) with the altered condition of the dental site.

Once the altered image or video is generated, it may be stored, transmitted to a client device (e.g., if method 1900 is performed by a service executing on a server), output to a display, and so on.

In some embodiments, method 1900 is performed as part of, or as a service for, a video chat application or service. For example, any participant of a video chat meeting may choose to have their teeth altered, such as to correct their teeth or make any other desired alterations to their teeth. During the video chat meeting, processing logic may receive a stream of frames or images generated by a camera of the participant, may modify the received images as described, and may then provide the modified images to a video streaming service for distribution to other participants or may directly stream the modified images to the other participants (and optionally back to the participant whose dentition is being altered). This same functionality may also apply to avatars of participants. For example, avatars of participants may be generated based on an appearance of the participants, and the dentition for the avatars may be altered in the manner described herein.

In some embodiments, method 1900 is performed in a clinical setting to generate clinically-accurate post-treatment images and/or video of a patient's dentition. In other embodiments, method 1900 is performed in a non-clinical setting (e.g., for movie post production, for end users of image and/or video editing software, for an image or video uploaded to a social media site, and so on). For such non-clinical settings, the 3D models of the current condition of the individual's dental arches may be generated using consumer grade intraoral scanners rather than medical grade intraoral scanners. Alternatively, for non-clinical settings the 3D models may be generated from 2D images as earlier described.

In some embodiments, method 1900 is performed as a service at a cost. Accordingly, a user may request to modify a video or image, and the service may determine a cost based, for example, on a size of the video or image, an estimated amount of time or resources to modify the video or image, and so on. A user may then be presented with payment options, and may pay for generation of the modified video or image. Subsequently, method 1900 may be performed. In embodiments, impression data (e.g., 3D models of current and/or altered versions of dental arches of an individual) may be stored and re-used for new videos or photos taken or generated at a later time.

Method 1900 may be applied, for example, for use cases of modifying television, modifying videos, modifying movies, modifying 3D video (e.g., for augmented reality (AR) and/or virtual reality (VR) representations), and so on. For example, directors, art directors, creative directors, etc. for movies or videos or photos, etc. production may want to change the dentition of actors or people that shall appear in such a production. In embodiments, method 1900 or other methods and/or techniques described herein may be applied to change the dentition of the one or more actors, people, etc. and cause that change to apply uniformly across the frames of the video or movie. This gives production companies more choices, for example, in selecting actors without caring about their dentition. Method 1900 may additionally or alternatively be applied for the editing of public and/or private images and/or videos, for a smile, aesthetic, facial and/or makeup editing system, and so on.

In treatment planning software, the position of the jaw pair (e.g., the 3D models of the upper and lower dental arches) is manually controlled by a user. 3D controls for viewing the 3D models is not intuitive, and can be cumbersome and difficult to use. In embodiments, viewing of 3D models of a patient's jaw pair may be controlled based on selection of images and/or video frames. Additionally, selection and viewing of images and/or video frames may be controlled based on user manipulation of the 3D models of the dental arches. For example, a user may select a single frame that causes an orientation or pose of 3D models of both an upper and lower dental arch to be updated to match the orientation or pose of the patient's jaws in the selected image. In another example, a user may select a first frame or image that causes an orientation or pose of a 3D model of an upper dental arch to be updated to match the orientation of the upper jaw in the first frame or image, and may select a second frame or image that causes an orientation or pose of a 3D model of a lower dental arch to be updated to match the orientation of the lower jaw in the second frame or image.

Figure 20:
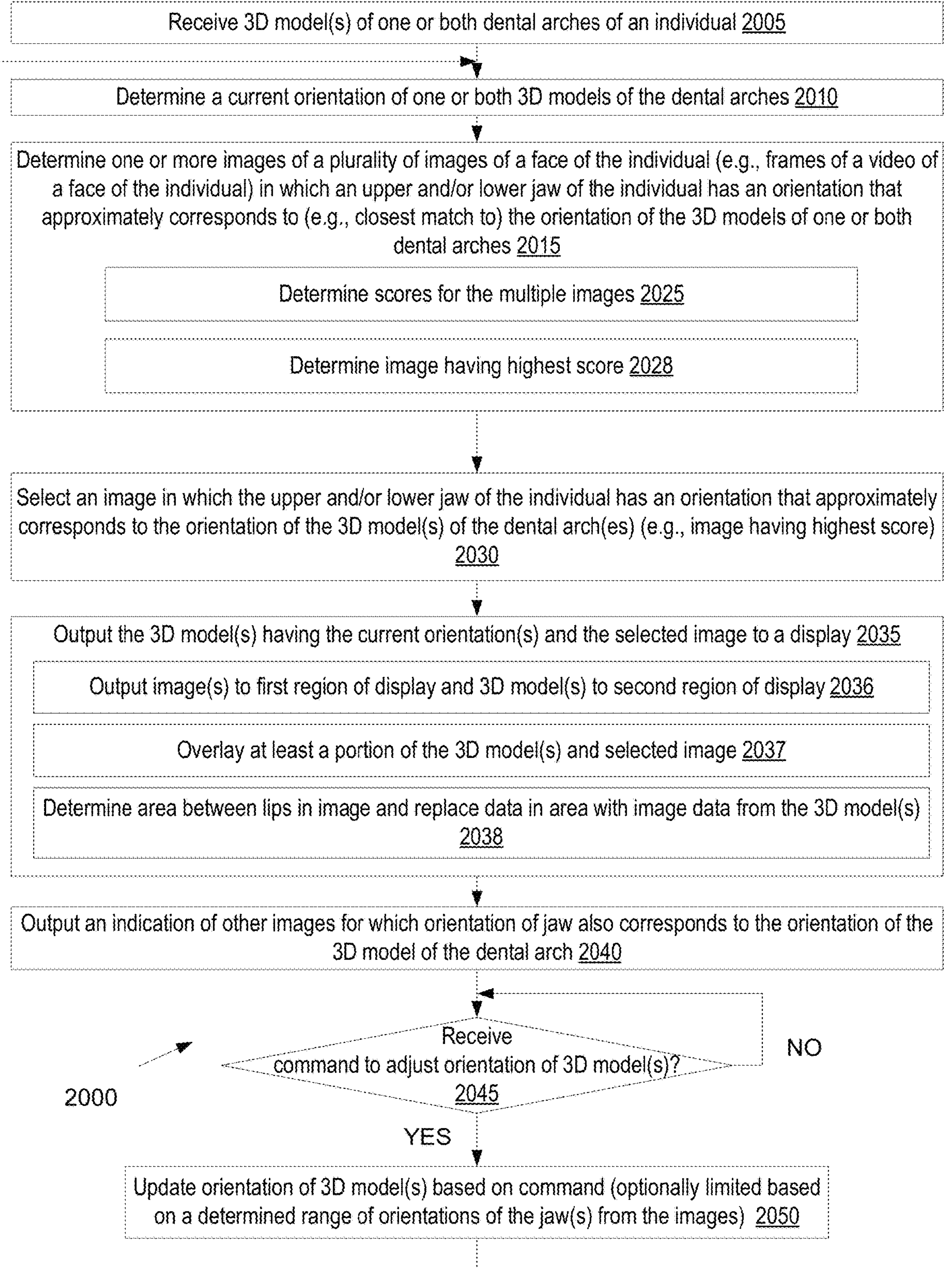
FIG. 20 illustrates a flow diagram for a method of selecting an image or frame of a video comprising a face of an individual based on an orientation of one or more 3D models of one or more dental arches, in accordance with an embodiment.

FIG. 20 illustrates a flow diagram for a method 2000 of selecting an image or frame of a video comprising a face of an individual based on an orientation of one or more 3D models of one or more dental arches, in accordance with an embodiment. Method 2000 may be performed by a processing logic that may comprise hardware (e.g., circuitry, dedicated logic, programmable logic, microcode, etc.), software (e.g., instructions run on a processing device), or a combination thereof. Various embodiments may be performed by a computing device 205 as described with reference to FIG. 2 and/or by a computing device 2200 as shown in FIG. 22.

At block 2005 of method 2000, processing logic receives a 3D model of a patient's upper dental arch and/or a 3D model of the patient's lower dental arch. At block 2010, processing logic determines a current orientation of one or more 3D models of the dental arches. The orientation may be determined, for example, as one or more angles between a vector normal to a plane of a display in which the 3D model(s) are shown and a vector extending from a front of the dental arch(es). In one embodiment, a first orientation is determined for the 3D model of the upper dental arch and a second orientation is determined for the 3D model of the lower dental arch. For example, the bite relation between the upper and lower dental arch may be adjusted, causing the relative orientations of the 3D models for the upper and lower dental arches to change.

At block 2015, processing logic determines one or more images of a plurality of images of a face of the individual (e.g., frames of a video of a face of the individual) in which an upper and/or lower jaw (also referred to an upper and/or lower dental arches) of the individual has an orientation that approximately corresponds to (e.g., is a closest match to) the orientation of the 3D models of one or both dental arches. In embodiments, processing logic may determine the orientations of the patient's upper and/or lower jaws in each image or frame in a pool of available images or frames of a video. Such orientations of the upper and lower jaws in images/frames may be determined by processing the images/frames to determine facial landmarks of the individual's face as described above. Properties such as head position, head orientation, face angle, upper jaw position, upper jaw orientation, upper jaw angle, lower jaw position, lower jaw orientation, lower jaw angle, etc. may be determined based on the facial landmarks. The orientations of the upper and/or lower jaw for each of the images may be compared to the orientations of the 3D model of the upper and/or lower dental arches. One or more matching scores may be determined for each comparison of the orientation of one or both jaws in an image and the orientation of the 3D model(s) at block 2025. An image (e.g., frame of a video) having a highest matching score may then be identified.

In an example, processing logic may determine for at least two frames of a video that the jaw has an orientation that approximately corresponds to the orientation of a 3D model of a dental arch (e.g., that have equivalent matchings scores of about a 90% match, above a 95% match, above a 99% match, etc.). Processing logic may further determine a time stamp of a previously selected frame of the video (e.g., for which the orientation of the jaw matched a previous orientation of the 3D model). Processing logic may then select from the at least two frames a frame having a time stamp that is closest to the timestamp associated with the previous selected frame.

In some embodiments, additional criteria may also be used to determine scores for images. For example, images may be scored based on parameters such as lighting conditions, facial expression, level of blurriness, time offset between the frame of a video and a previously selected frame of the video, and/or other criteria in addition to difference in orientation of the jaws between the image and the 3D model(s). For example, higher scores may be assigned to images having a greater average scene brightness or intensity, to images having a lower level of blurriness, and/or to frames having a smaller time offset as compared to a time of a previously selected frame. In some embodiments, these secondary criteria are used to select between images or frames that otherwise have approximately equivalent matching scores based on angle or orientation.

At block 2030, processing logic selects an image in which the upper and/or lower jaw of the individual has an orientation that approximately corresponds to the orientation(s) of the 3D model(s) of the upper and/or lower dental arches. This may include selecting the image (e.g., video frame) having the highest determined score.

In some instances, there may be no image for which the orientation of the upper and/or lower jaws match the orientation of the 3D models of the upper and/or lower dental arches. In such instances, a closest match may be selected. Alternatively, in some instances processing logic may generate a synthetic image corresponding to the current orientation of the 3D models of the upper and/or lower dental arches, and the synthetic image may be selected. In embodiments, a generative model may be used to generate a synthetic image. Examples of generative models that may be used include a generative adversarial network (GAN), a neural radiance field (Nerf), an image diffuser, a 3D gaussian splatting model, a variational autoencoder, or a large language model. A user may select whether or not to use synthetic images in embodiments. In some embodiments, processing logic determines whether any image has a matching score that is above a matching threshold. If no image has a matching score above the matching threshold, then a synthetic image may be generated.

The generation of a synthetic image may be performed using any of the techniques described hereinabove, such as by a generative model and/or by performing interpolation between two existing images. For example, processing logic may identify a first image in which the upper jaw of the individual has a first orientation and a second image in which the upper jaw of the individual has a second orientation, and perform interpolation between the first and second image to generate a new image in which the orientation of the upper jaw approximately matches the orientation of the 3D model of the upper dental arch.

At block 2035, processing logic outputs the 3D models having the current orientation(s) and the selected image to a display. In one embodiment, at block 2036 the image is output to a first region of the display and the 3D models are output to a second region of the display. In one embodiment, at block 2037 at least a portion of the 3D models is overlaid with the selected image. This may include overlaying the image over the 3D models, but showing the 3D image with some level of transparency so that the 3D models are still visible. This may alternatively include overlaying the 3D models over the image, but showing the 3D models with some level of transparency so that the underlying image is still visible. In either case, the mouth region of the individual may be determined in the image as previously described, and may be registered with the 3D model so that the 3D model is properly positioned relative to the image. In another embodiment, processing logic may determine the mouth region in the image, crop the mouth region, then update the mouth region by filling it in with a portion of the 3D model(s).

In some instances, there may be multiple images that have a similar matching score to the 3D models of the upper and/or lower dental arches. In such instances, processing logic may provide some visual indication or mark to identify those other images that were not selected but that had similar matching scores to the selected image. A user may then select on any of those other images (e.g., from thumbnails of the images or from highlighted points on a scroll bar or time bar indicating time stamps of those images in a video), responsive to which the newly selected image may be shown (e.g., may replace the previously selected image).

In some embodiments, processing logic divides a video into a plurality of time segments, where each time segment comprises a sequence of frames in which the upper and/or lower jaw of the individual has an orientation that deviates by less than a threshold amount (e.g., frames in which the jaw orientation deviates by less than 1 degree). Alternatively, or additionally, time segments may be divided based on time. For example, each time segment may contain all of the frames within a respective time interval (e.g., a first time segment for 0-10 seconds, a second time segment for 11-20 seconds, and so on). The multiple time segments may then be displayed. For example, the different time segments may be shown in a progress bar of the video. A user may select a time segment. Processing logic may receive the selection, determine an orientation of the upper and/or lower jaw in the time segment, and update an orientation of the 3D model of the dental arch to match the orientation of the jaw in the selected time segment. A similar sequence of operations is described below with reference to FIG. 21.

At block 2045, processing logic may receive a command to adjust an orientation of one or both 3D models of the dental arches. If no such command is received, the method may return to block 2045. If a command to adjust the orientation of the 3D model of the upper and/or lower dental arch is received, the method continues to block 2050.

At block 2050, processing logic updates an orientation of one both 3D models of the dental arches based on the command. In some embodiments, processing logic may have processed each of the available images (e.g., all of the frames of a video), and determined one or more orientation or angle extremes (e.g., rotational angle extremes about one or more axes) based on the orientations of the upper and/or lower jaws in the images. In some embodiments, processing logic may restrict the possible orientations that a user may update the 3D models to based on the determined extremes. This may ensure that there will be an image having a high matching score to any selected orientation of the upper and/or lower dental arches. Responsive to updating the orientation of the 3D model or models of the upper and/or lower dental arches, the method may return to block 2010 and the operations of blocks 2010-2045 may be repeated.

Figure 21:
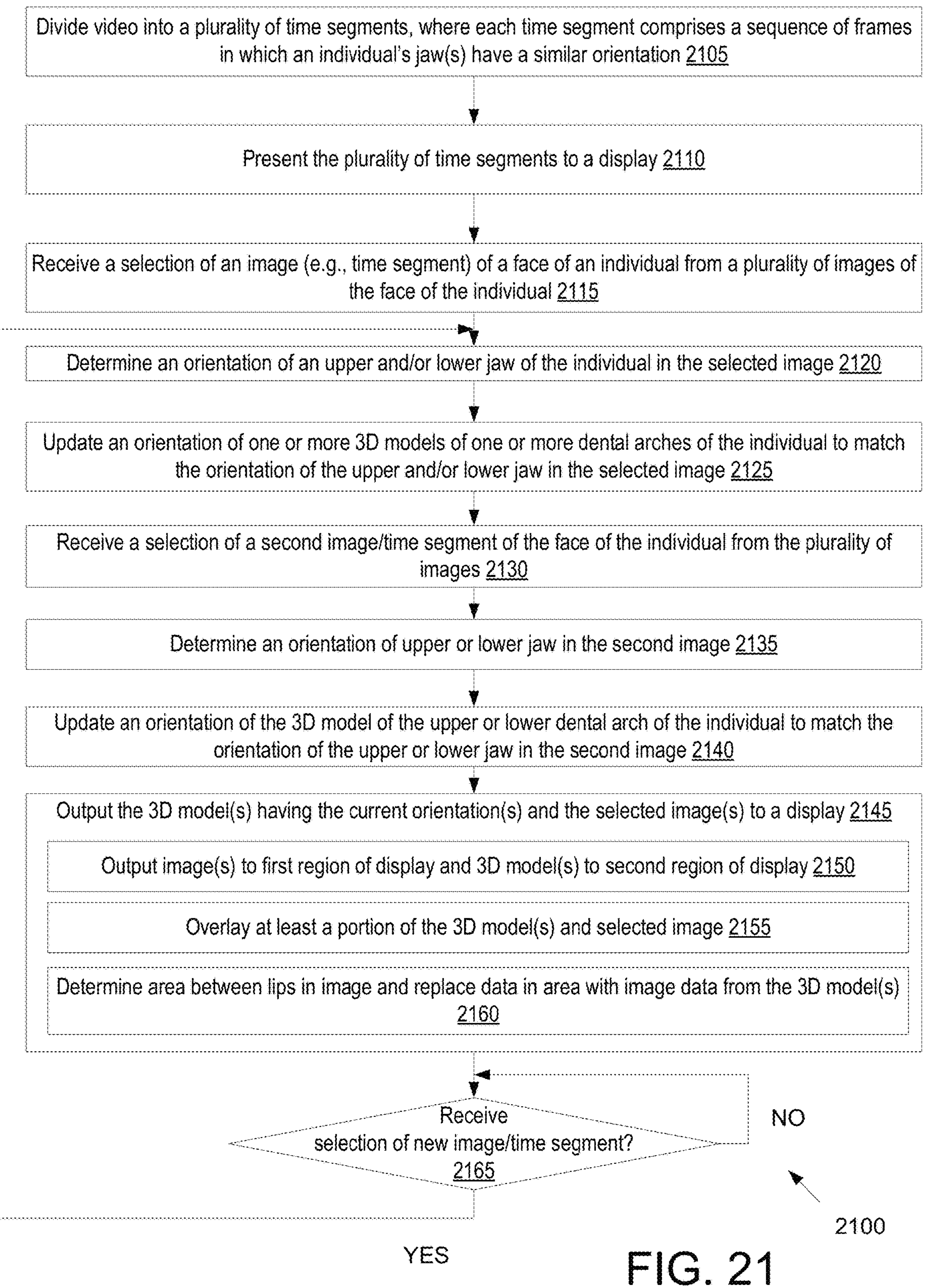
FIG. 21 illustrates a flow diagram for a method of adjusting an orientation of one or more 3D models of one or more dental arches based on a selected image or frame of a video comprising a face of an individual, in accordance with an embodiment.

FIG. 21 illustrates a flow diagram for a method 2100 of adjusting an orientation of one or more 3D models of one or more dental arches based on a selected image or frame of a video comprising a face of an individual, in accordance with an embodiment. Method 2100 may be performed by a processing logic that may comprise hardware (e.g., circuitry, dedicated logic, programmable logic, microcode, etc.), software (e.g., instructions run on a processing device), or a combination thereof. Various embodiments may be performed by a computing device 205 as described with reference to FIG. 2 and/or by a computing device 2200 as shown in FIG. 22.

In some embodiments, at block 2105 of method 2100 processing logic divides a video into a plurality of time segments, where each time segment comprises a sequence of frames in which an individual's upper and/or lower jaw have a similar orientation. In such an embodiment, different time segments may have different lengths. For example, one time segment may be 5 seconds long and another time segment may be 10 seconds long. Alternatively, or additionally, the video may be divided into time segments based on a time interval (e.g., a time segment may be generated for every 10 seconds of the video, for every 5 seconds of the video, etc.). In other embodiments, time segments may not be implemented, and each frame is treated separately. For example, individual frames of a video may be selected rather than time segments. In another example, as a video plays, 3D mesh or model orientations of the upper and/or lower dental arches update continuously in accordance with the orientations of the upper and/or lower jaw in the individual frames of the video. At block 2110, the different time segments may be presented to a display. For example, a time slider for a movie may be output, and the various time segments may be shown in the time slider.

At block 2115, processing logic receives a selection of an image (e.g., a video frame) of a face of an individual from a plurality of available images. This may include receiving a selection of a frame of a video. For example, a user may watch or scroll through a video showing a face of an individual until the face (or an upper and/or lower jaw of the face) has a desired viewing angle (e.g., orientation). For example, a user, may select a point on a time slider for a video, and the video frame at the selected point on the time slider may be selected. In some cases, a user may select a time segment (e.g., by clicking on the time segment from the time slider for a video) rather than selecting an individual image or frame. Responsive to receiving a selection of a time segment, processing logic may select a frame representative of the time segment. The selected frame may be a frame in the middle of the time segment, a frame from the time segment having a highest score, or a frame that meets some other criterion.

At block 2120, processing logic determines an orientation (e.g., viewing angle) of an upper dental arch or jaw, a lower dental arch or jaw, or both an upper dental arch and a lower dental arch in the selected image or frame. At block 2125, processing logic updates an orientation of a 3D model of an upper dental arch based on the orientation of the upper jaw in the selected image, updates an orientation of a 3D model of a lower dental arch based on the orientation of the lower jaw in the selected image, updates the orientation of the 3D models of both the upper and lower dental arch based on the orientation of the upper jaw in the image, updates the orientation of the 3D models of both the and lower dental arch based on the orientation of the lower jaw in the image, or updates the orientation of the 3D model of the upper dental arch based on the orientation of the upper jaw in the image and updates the orientation of the 3D model of the lower dental arch based on the orientation of the lower jaw in the image. In embodiments, a user may select which 3D models they want to update based on the selected image and/or whether to update the orientations of the 3D models based on the orientation of the upper and/or lower jaw in the image. In embodiments, processing logic may provide an option to automatically update the orientations of one or both 3D models of the dental arches based on the selected image. Processing logic may also provide an option to update the orientation (e.g., viewing angle) of the 3D model or models responsive to the user pressing a button or otherwise actively providing an instruction to do so.

In some embodiments, processing logic may additionally control a position (e.g., center or view position) of one or both 3D models of dental arches, zoom settings (e.g., view size) of one or both 3D models, etc. based on a selected image. For example, the 3D models may be scaled based on the size of the individual's jaw in the image.

In an embodiment, at block 2130 processing logic receives a selection of a second image or time segment of the face of the individual. At block 2135, processing logic determines an orientation of the upper and/or lower jaw of the individual in the newly selected image. At block 2140, processing logic may update an orientation of the 3D model of the upper dental arch and/or an orientation of the 3D model of the lower dental arch to match the orientation of the upper and/or lower jaw in the selected first image.

In an example, for blocks 2115, 2120 and 2125, a user may have selected to update an orientation of just the upper dental arch, and the orientation of the 3D model for the upper dental arch may be updated based on the selected image. Then for blocks 2130, 2135 and 2140 a user may have selected to update an orientation of just the lower dental arch, and the orientation of the 3D model for the lower dental arch may be updated based on the selected second image.

In an example, processing logic may provide an option to keep one jaw/dental arch fixed on the screen, and may only apply a relative movement to the other jaw based on a selected image. This may enable a doctor or patient to focus on a specific jaw for a 3D scene fixed on a screen and observe how the other jaw moves relative to the fixed jaw. For example, processing logic may provide functionality of a virtual articulator model or jaw motion device, where a movement trajectory is dictated by the selected images.

At block 2145, processing logic outputs the 3D models having the current orientation(s) and the selected image to a display. In one embodiment, at block 2150 the image is output to a first region of the display and the 3D models are output to a second region of the display. In one embodiment, at block 2155 at least a portion of the 3D models is overlaid with the selected image. This may include overlaying the image over the 3D models, but showing the 3D image with some level of transparency so that the 3D models are still visible. This may alternatively include overlaying the 3D models over the image, but showing the 3D models with some level of transparency so that the underlying image is still visible. In either case, the mouth region of the individual may be determined in the image as previously described, and may be registered with the 3D model so that the 3D model is properly positioned relative to the image. In another embodiment, processing logic may determine the mouth region in the image, crop the mouth region, then update the mouth region by filling it in with a portion of the 3D model(s). In some embodiments, processing logic determines other frames of a video in which the orientation (e.g., camera angle) for the upper and/or lower jaw match or approximately match the orientation for the upper and/or lower jaw in the selected frame. Processing logic may then output indications of the other similar frames, such as at points on a time slider for a video. In embodiments, a user may scroll through the different similar frames and/or quickly select one of the similar frames.

At block 2165, processing logic may determine whether a selection of a new image or time segment has been received. If no new image or time segment has been received, the method may repeat block 2165. If a new image (e.g., frame of a video) or time segment is received, the method may return to block 2120 or 2135 for continued processing. This may include playing a video, and continuously updating the orientations of the 3d models for the upper and/or lower dental arches based on the frames of the video as the video plays.

In embodiments, method 2000 and 2100 may be used together by, for example, treatment planning logic 220 and/or dentition viewing logic 222. Accordingly, a user interface may enable a user to update image/frame selection based on manipulating 3D models of dental arches, and may additionally enable a user to manipulate 3D models of dental arches based on selection of images/frames. The operations of methods 2000 and 2100 may be performed online or in real time during development of a treatment plan. This allows users to use the input video as an additional asset in designing treatment plans.

FIG. 22 illustrates a diagrammatic representation of a machine in the example form of a computing device 2200 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In one embodiment, the computing device 2200 corresponds to computing device 205 of FIG. 2.

The example computing device 2200 includes a processing device 2202, a main memory 2204 (e.g., read-only memory (ROM), flash memory, dynamic random access memory (DRAM) such as synchronous DRAM (SDRAM), etc.), a static memory 2206 (e.g., flash memory, static random access memory (SRAM), etc.), and a secondary memory (e.g., a data storage device 2228), which communicate with each other via a bus 2208.

Processing device 2202 represents one or more general-purpose processors such as a microprocessor, central processing unit, or the like. More particularly, the processing device 2202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 2202 may also be one or more special-purpose processing devices such as an application specific integrated circuit (ASIC), a field programmable gate array (FPGA), a digital signal processor (DSP), network processor, or the like. Processing device 2202 is configured to execute the processing logic (instructions 2226) for performing operations and steps discussed herein.

The computing device 2200 may further include a network interface device 2222 for communicating with a network 2264. The computing device 2200 also may include a video display unit 2210 (e.g., a liquid crystal display (LCD) or a cathode ray tube (CRT)), an alphanumeric input device 2212 (e.g., a keyboard), a cursor control device 2214 (e.g., a mouse), and a signal generation device 2220 (e.g., a speaker).

The data storage device 2228 may include a machine-readable storage medium (or more specifically a non-transitory computer-readable storage medium) 2224 on which is stored one or more sets of instructions 2226 embodying any one or more of the methodologies or functions described herein, such as instructions for a video processing logic 208, video capture logic 212, dentition viewing logic 220, dental adaptation logic 214, treatment planning logic 220, and/or video/image editing logic 224. A non-transitory storage medium refers to a storage medium other than a carrier wave. The instructions 2226 may also reside, completely or at least partially, within the main memory 2204 and/or within the processing device 2202 during execution thereof by the computing device 2200, the main memory 2204 and the processing device 2202 also constituting computer-readable storage media.

The computer-readable storage medium 2224 may also be used to store video processing logic 208, video capture logic 212, dentition viewing logic 220, dental adaptation logic 214, treatment planning logic 220, and/or video/image editing logic 224. The computer readable storage medium 2224 may also store a software library containing methods for video processing logic 208, a video capture logic 212, dentition viewing logic 220, dental adaptation logic 214, treatment planning logic 220, and/or video/image editing logic 224. While the computer-readable storage medium 2224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A system comprising:

a memory; and a processor operatively coupled to the memory, the processor to:

receive a video comprising a face of an individual, the video comprising a current condition of a dental site of the individual;

receive or determine an altered condition of the dental site; and modify the video by replacing the current condition of the dental site with the altered condition of the dental site in the video, wherein modifying the video comprises:

determining an inner mouth area of the face in at least one frame of the video;

performing segmentation on the inner mouth area of the at least one frame using one of the following techniques:

a) inputting the inner mouth area of the at least one frame and inner mouth areas of one or more previous frames of the video into a trained machine learning model that segments the inner mouth area into a plurality of individual teeth, or b) determining an optical flow between the at least one frame and the one or more previous frames, and inputting the inner mouth area of the at least one frame and the optical flow into the trained machine learning model, wherein the trained machine learning model segments the inner mouth area of the at least one frame into the plurality of individual teeth in a manner that is temporally consistent with the one or more previous frames; and replacing initial data for the inner mouth area of the face with replacement data determined from the altered condition of the dental site.

2. The system of claim 1, wherein the dental site comprises one or more teeth, and wherein the one or more teeth in the modified video are different from the one or more teeth in an original version of the video and are temporally stable and consistent between frames of the modified video.

3. The system of claim 1, wherein the processor is further to:

identify one or more frames of the modified video that fail to satisfy one or more image quality criteria; and remove the one or more frames of the modified video that failed to satisfy the one or more image quality criteria.

4. The system of claim 3, wherein the processor is further to:

generate replacement frames for the removed one or more frames of the modified video.

5. The system of claim 1, wherein the altered condition of the dental site comprises an estimated future condition of the dental site, wherein the dental site comprises one or more teeth, and wherein determining the estimated future condition of the dental site comprises:

generating or receiving a first three-dimensional (3D) model of a dental arch comprising the current condition of the one or more teeth; and generating or receiving a second 3D model of the dental arch comprising a post-treatment condition of the one or more teeth, the second 3D model having been generated based on modifying the first 3D model of the dental arch, wherein the post-treatment condition of the one or more teeth corresponds to the estimated future condition of the one or more teeth.

6. The system of claim 1, wherein receiving the video of the face of the individual comprises capturing the video using one or more image sensors while the individual views a display, and wherein the processor is further to:

output the modified video to the display while the individual views the display.

7. The system of claim 1, wherein determining the inner mouth area for the at least one frame comprises:

inputting the at least one frame into a trained machine learning model, wherein the trained machine learning model outputs a position of the inner mouth area for the at least one frame.

8. The system of claim 1, wherein the processor is further to perform the following prior to determining the inner mouth area:

determine a plurality of landmarks for a plurality of frames of the video using a trained machine learning model, wherein the at least one frame is one of the plurality of frames of the video; and perform smoothing of the plurality of landmarks between the plurality of frames, wherein the inner mouth area is determined based on the plurality of landmarks.

9. The system of claim 1, wherein performing the segmentation of the at least one frame comprises inputting the inner mouth area of the at least one frame and inner mouth areas of the one or more previous frames into the trained machine learning model.

10. The system of claim 1, wherein the processor is to:

determine the optical flow between the at least one frame and the one or more previous frames;

wherein performing the segmentation of the at least one frame comprises inputting the inner mouth area of the at least one frame and the optical flow into the trained machine learning model.

11. The system of claim 1, wherein the processor is further to:

determine color information for the inner mouth area in the at least one frame;

determine contours of the altered condition of the dental site; and input at least one of the color information, the determined contours, the at least one frame or information on the inner mouth area into a generative model, wherein the generative model outputs an altered version of the at least one frame.

12. The system of claim 1, wherein modifying the video comprises performing the following for at least one frame of the video:

determining an area of interest corresponding to a dental condition in the at least one frame; and replacing initial data for the area of interest with replacement data determined from the altered condition of the dental site.

13. The system of claim 1, wherein the video comprises a plurality of frames, and wherein modifying the video comprises performing the following for one or more frames of the plurality of frames:

inputting data from the one or more frames and the altered condition of the dental site into a trained generative model, wherein the trained generative model outputs a modified version of the one or more frames.

14. The system of claim 1, wherein the processor is further to:

receive a three-dimensional (3D) model of the dental site generated based on intraoral scanning of an oral cavity of the individual;

determine the altered condition based on modifying the 3D model of the dental site; and for each frame of the video, project the modified 3D model of the dental site onto a plane associated with the frame of the video.

15. A non-transitory computer readable medium comprising instructions that, when executed by a processing device, cause the processing device to perform operations comprising:

receiving a video comprising a face of an individual, the video comprising a current condition of dentition of the individual;

receiving or determining an altered condition of the dentition; and modifying the video by replacing the current condition of the dentition with the altered condition of the dentition in the video, wherein modifying the video comprises:

determining an inner mouth area of the face in at least one frame of the video;

performing segmentation on the inner mouth area of the at least one frame using one of the following techniques:

a) inputting the inner mouth area of the at least one frame and inner mouth areas of one or more previous frames of the video into a trained machine learning model that segments the inner mouth area into a plurality of individual teeth, or b) determining an optical flow between the at least one frame and the one or more previous frames, and inputting the inner mouth area of the at least one frame and the optical flow into the trained machine learning model, wherein the trained machine learning model segments the inner mouth area of the at least one frame into the plurality of individual teeth in a manner that is temporally consistent with the one or more previous frames; and replacing initial data for the inner mouth area of the face with replacement data determined from the altered condition of the dentition.

16. The non-transitory computer readable medium of claim 15, wherein the altered condition of the dentition in the modified video is temporally stable and consistent between frames of the modified video.

17. The non-transitory computer readable medium of claim 15, the operations further comprising:

identifying one or more frames of the modified video that fail to satisfy one or more image quality criteria;

removing the one or more frames of the modified video that failed to satisfy the one or more image quality criteria; and generating replacement frames for the removed one or more frames of the modified video.

18. The non-transitory computer readable medium of claim 15, wherein the altered condition of the dentition comprises an estimated future condition of the dentition, and wherein determining the estimated future condition of the dentition comprises:

generating or receiving a first three-dimensional (3D) model of a dental arch comprising the current condition of the dentition; and generating or receiving a second 3D model of the dental arch comprising a post-treatment condition of the dentition, the second 3D model having been generated based on modifying the first 3D model of the dental arch, wherein the post-treatment condition of the dentition corresponds to the estimated future condition of the dentition.

19. The non-transitory computer readable medium of claim 15, wherein modifying the video comprises performing the following for at least one frame of the video:

determining an inner mouth area of the face in the at least one frame; and replacing initial data for the inner mouth area of the face with replacement data determined from the altered condition of the dentition.

20. A method comprising:

receiving a video comprising a face of an individual, the video comprising a current condition of one or more teeth of the individual;

receiving or determining an altered condition of the one or more teeth; and modifying the video by replacing the current condition of the one or more teeth with the altered condition of the one or more teeth in the video, wherein modifying the video comprises:

determining an inner mouth area of the face in at least one frame of the video;

performing segmentation on the inner mouth area of the at least one frame using one of the following techniques:

a) inputting the inner mouth area of the at least one frame and inner mouth areas of one or more previous frames of the video into a trained machine learning model that segments the inner mouth area into a plurality of individual teeth, or b) determining an optical flow between the at least one frame and the one or more previous frames, and inputting the inner mouth area of the at least one frame and the optical flow into the trained machine learning model, wherein the trained machine learning model segments the inner mouth area of the at least one frame into the plurality of individual teeth in a manner that is temporally consistent with the one or more previous frames; and replacing initial data for the inner mouth area of the face with replacement data determined from the altered condition of the one or more teeth.

* * * * *